US012682790B2

(12) United States Patent
Hirayama et al.

(10) Patent No.: US 12,682,790 B2
(45) Date of Patent: Jul. 14, 2026

(54) OFFLINE TEACHING DEVICE AND OFFLINE TEACHING METHOD

(71) Applicant: Panasonic Intellectual Property Management Co., Ltd., Osaka (JP)

(72) Inventors: Masaya Hirayama, Osaka (JP); Yoshiyuki Okazaki, Shiga (JP); Katsuaki Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 228 days.

(21) Appl. No.: 18/737,293

(22) Filed: Jun. 7, 2024

(65) Prior Publication Data

US 2024/0331575 A1 Oct. 3, 2024

Related U.S. Application Data

(63) Continuation of application No. PCT/JP2022/040276, filed on Oct. 27, 2022.

(30) Foreign Application Priority Data

Dec. 8, 2021 (JP) ................................. 2021-199683

(51) Int. Cl.
*G09B 25/02* (2006.01)
*G09B 5/02* (2006.01)

(52) U.S. Cl.
CPC .............. *G09B 25/02* (2013.01); *G09B 5/02* (2013.01)

(58) Field of Classification Search
CPC . E02F 9/265; E02F 9/2041; E02F 9/24; E02F 9/205; E02F 9/20; E02F 9/2054; E02F 9/262
See application file for complete search history.

(56) References Cited

U.S. PATENT DOCUMENTS 5,552,575 A 9/1996 Doumanidis
2006/0212170 A1 9/2006 Nagatsuka et al.
(Continued)

FOREIGN PATENT DOCUMENTS

JP 7-104831 4/1995
JP 2006-247677 9/2006
(Continued)

OTHER PUBLICATIONS

International Search Report issued Jan. 17, 2023 in International Application No. PCT/JP2022/040276.
(Continued)

*Primary Examiner* — Wade Miles
*Assistant Examiner* — James Brian Chin
(74) *Attorney, Agent, or Firm* — Wenderoth, Lind & Ponack, L.L.P.

(57) ABSTRACT

An offline teaching device includes an acquisition unit that acquires position information of a plurality of welding lines of a workpiece and a scanning range of a sensor, a generation unit that generates a plurality of three-dimensional regions to be scanned, and a control unit that disposes the plurality of welding lines and the plurality of three-dimensional regions in a virtual space and highlights an overlapping region of each of the plurality of three-dimensional regions. The overlapping region is deleted, a new auxiliary screen in which the plurality of welding lines and at least one three-dimensional region after the deletion of the overlapping region are disposed in a virtual space is generated, and a teaching program for scanning the at least one three-dimensional region is created and output.

8 Claims, 21 Drawing Sheets

(56)          References Cited

U.S. PATENT DOCUMENTS

| 2017/0087717 A1 | 3/2017 | Hirayama et al. |
| 2018/0275673 A1 | 9/2018 | Loosararian et al. |

FOREIGN PATENT DOCUMENTS

| JP | 2008-20993 | 1/2008 |
| JP | 2021-59012 | 4/2021 |
| WO | 2016/021130 | 2/2016 |

OTHER PUBLICATIONS

Extended European Search Report issued Feb. 17, 2025 in corresponding European Patent Application No. 22903912.8.

<EFFECTIVE SCANNING REGION: MOVEMENT PROCESS>

<EFFECTIVE SCANNING REGION: ROTATION PROCESS>

OFFLINE TEACHING DEVICE AND OFFLINE TEACHING METHOD

CROSS-REFERENCE TO RELATED APPLICATIONS

The present application is a continuation application of PCT/JP2022/040276 that claims priority to Japanese Patent Application No. 2021-199683 filed on Dec. 8, 2021, the entire content of which is incorporated herein by reference.

TECHNICAL FIELD

The present disclosure relates to an offline teaching device and an offline teaching method.

BACKGROUND ART

WO2016/021130 discloses an offline teaching device that displays, in a model diagram, an operation trajectory of a robot when a teaching program is executed and displays a part of a plurality of position detection commands and a part of a plurality of welding commands. The offline teaching device includes a display unit that displays the teaching program and the model diagram, a storage unit that stores commands constituting the teaching program and model data of the model diagram, and a control unit that controls the display unit and the storage unit. The teaching program includes a position detection program including the plurality of position detection commands and a welding program including the plurality of welding commands. Here, the commands constituting the teaching program, the position detection program, and the welding program are each created by an operator.

SUMMARY OF INVENTION

The present disclosure provides an offline teaching device and an offline teaching method that support creation of a scanning operation teaching program performed by an operator.

The present disclosure provides an offline teaching device, and the offline teaching device includes: an input unit capable of acquiring an operator operation; an acquisition unit configured to acquire position information of a plurality of welding lines of a workpiece produced by welding and a scanning range of a sensor that scans an appearance shape of a weld bead formed on the workpiece; a generation unit configured to generate a plurality of three-dimensional regions to be scanned by the sensor, based on the acquired position information of the plurality of welding lines and the scanning range; and a control unit configured to generate and output an auxiliary screen in which the plurality of welding lines and the plurality of three-dimensional regions are disposed in a virtual space and an overlapping region of each of the plurality of three-dimensional regions is highlighted. The generation unit deletes the overlapping region based on the operator operation, and the control unit generates and outputs a new auxiliary screen in which the plurality of welding lines and at least one three-dimensional region after the deletion of the overlapping region are disposed in the virtual space, and creates and outputs a teaching program for causing a robot that drives the sensor to scan the at least one three-dimensional region, based on the operator operation.

The present disclosure provides an offline teaching method performed by an offline teaching device including one or more computers communicably connected to an input device capable of receiving an operator operation, and the offline teaching method includes: acquiring position information of a plurality of welding lines of a workpiece produced by welding and a scanning range of a sensor that scans an appearance shape of a weld bead formed on the workpiece; generating a plurality of three-dimensional regions to be scanned by the sensor, based on the acquired position information of the plurality of welding lines and the scanning range; generating and outputting an auxiliary screen in which the plurality of welding lines and the plurality of three-dimensional regions are disposed in a virtual space and an overlapping region of each of the plurality of three-dimensional regions is highlighted; deleting the overlapping region based on the operator operation; generating and outputting a new auxiliary screen in which the plurality of welding lines and at least one three-dimensional region after the deletion of the overlapping region are disposed in the virtual space; and creating and outputting a teaching program for causing a robot that drives the sensor to scan the at least one three-dimensional region, based on the operator operation.

The present disclosure provides an offline teaching method performed by an operator operating an input device and using an offline teaching device including one or more computers communicably connected to the input device, and the offline teaching method includes: inputting, to the computer, position information of a plurality of welding lines of a workpiece produced by welding and a scanning range of a sensor that scans an appearance shape of a weld bead formed on the workpiece; inputting, to the computer, the overlapping region to be deleted on an auxiliary screen in which the plurality of welding lines and a three-dimensional region scanned by the sensor are disposed in a virtual space and an overlapping region of each of the plurality of three-dimensional regions is highlighted; and creating a teaching program for causing a robot that drives the sensor to scan at least one three-dimensional region after the deletion of the input overlapping region indicated by a new auxiliary screen in which the plurality of welding lines and the at least one three-dimensional region are disposed in the virtual space.

According to the present disclosure, it is possible to support creation of a scanning operation teaching program performed by an operator.

BRIEF DESCRIPTION OF DRAWINGS

FIG. 8 is a diagram illustrating an example of statistical information and effective scanning regions on teaching auxiliary screens.

FIG. 16 is a diagram illustrating a combination process example 2 of effective scanning regions.

Figure 1:
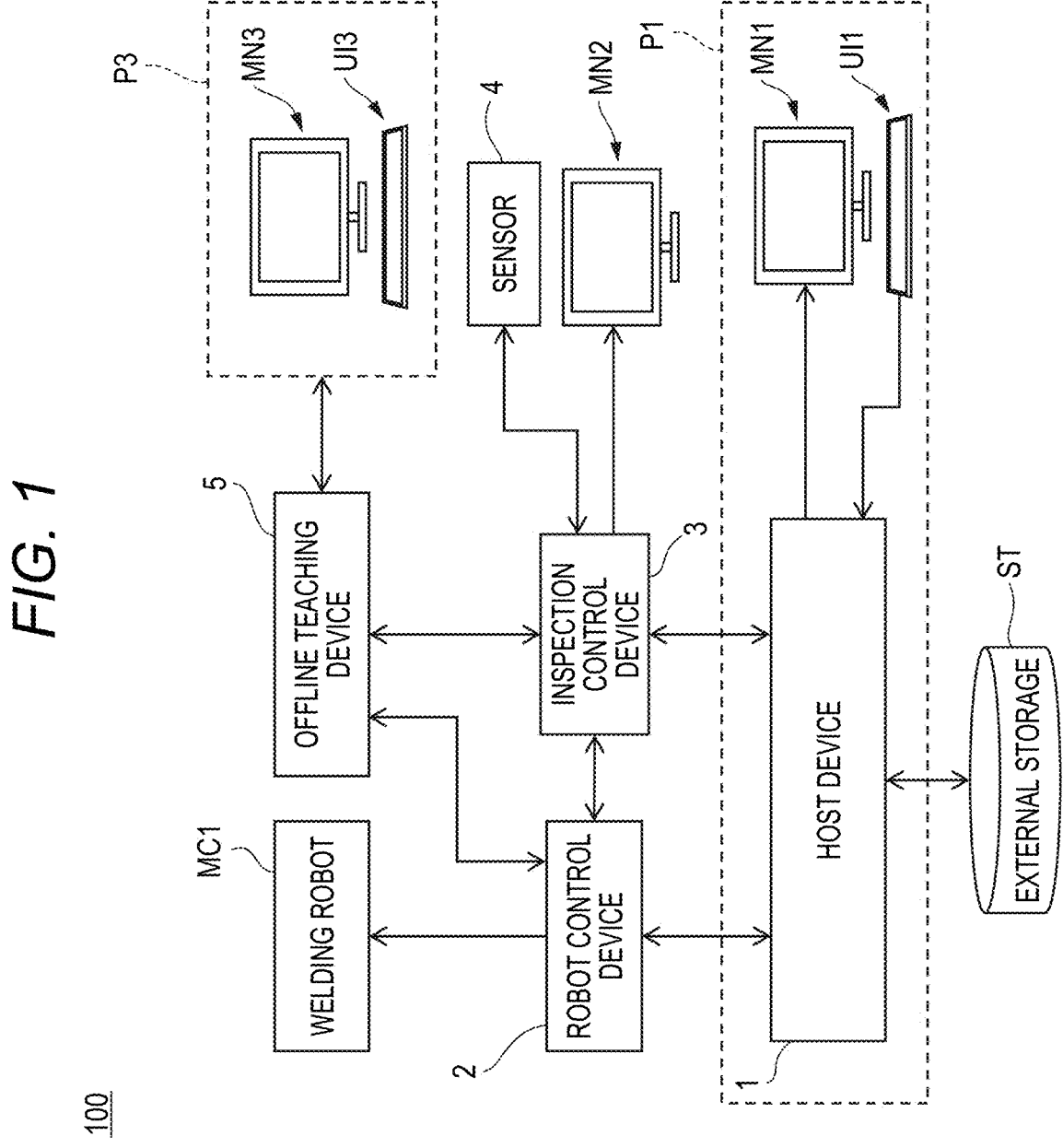
FIG. 1 is a schematic diagram illustrating a system configuration example of a welding system according to Embodiment 1.

DESCRIPTION OF EMBODIMENTS (Background of Present Disclosure)

A device configuration capable of constructing a virtual production facility using an offline teaching device as in WO2016/021130 is known in the art. Such an offline teaching device can simultaneously display a part of the position detection commands corresponding to an operation trajectory of a welding robot and a part of welding commands, thereby making it easy for an operator to specify an editing portion at the time of creating a teaching program and supporting improvement on the creation efficiency and the accuracy of the created program.

In addition, in recent years, automation of appearance inspection, which is a quality verification method for a welding part (that is, a weld bead), has been performed. The appearance inspection is executed by a welding robot or an inspection robot including a sensor capable of measuring a three-dimensional shape of a weld bead by scanning a workpiece with a laser beam. In the automation of the appearance inspection, teaching work for executing the appearance inspection using the sensor is performed by teaching a scanning range using a device that is visually recognizable by an operator with a weak output of a laser pointer or the like. However, since a scannable range of the sensor is not visualized during the teaching work, the operator cannot know whether the taught scanning range is located within the actual scannable range of the sensor. Therefore, in a case where a teaching program created based on the teaching work described above is used, the sensor may be not capable of reading the taught scanning range.

Unlike a welding operation teaching program created to be able to weld one welding part with respect to one welding line requiring welding, in order to shorten an appearance inspection time or the like, an appearance inspection teaching program may be created to be able to collectively scan appearance shapes of a plurality of welding parts (that is, one welding line) in one scan portion or created to be able to scan an appearance shape of one welding part (a welding line) divided at each of a plurality of scan portions. When each of two or more welding parts is scanned in the appearance inspection, the appearance inspection teaching program may be created with a scanning order of the welding parts different from a welding order in which the welding is executed. Further, in the appearance inspection teaching program, for example, when the sensor collectively scans a plurality of welding parts at one scan portion or scans an appearance shape of one welding part (a welding line) divided at each of the plurality of scan portions, the sensor may scan the welding part at a sensor angle different from a welding torch angle during a welding operation. Accordingly, in order to create an appearance inspection teaching program using an offline teaching device, the operations of a welding robot or an inspection robot to be created may be different, and an operator who creates an appearance inspection teaching program is required to have a higher skill to create the teaching program.

In addition, there is an offline teaching device that teaches a scan portion in a virtual space. The offline teaching device visualizes a scannable range at a predetermined position in a horizontal direction (on an XY plane) to visualize the scan portion taught by an operator and the scannable range by the sensor, and supports the teaching work for executing the appearance inspection performed by the operator. However, it is difficult to visualize a three-dimensional scannable range (region), and when the appearance inspection is executed using a teaching program created using such an offline teaching device, there is a possibility that an appearance inspection target cannot be scanned in the taught scanning range.

Accordingly, there is a demand for a technique of visualizing a three-dimensional shape of a scan portion, a posture of the inspection robot during a scanning operation, and the like, and creating an appearance inspection teaching program capable of more efficiently executing the appearance inspection.

In each of the following embodiments, an example of an offline teaching device and an offline teaching method that support creation of a scanning operation teaching program performed by an operator will be described.

Hereinafter, embodiments specifically disclosing an offline teaching device and an offline teaching method according to the present disclosure will be described in detail with reference to the drawings as appropriate. However, unnecessarily detailed descriptions may be omitted. For example, the detailed descriptions of well-known matters and the redundant description of substantially the same configuration may be omitted. This is to avoid unnecessary redundancy of the following descriptions and to facilitate understanding of those skilled in the art. The accompanying drawings and the following descriptions are provided for those skilled in the art to fully understand the present disclosure and are not intended to limit the subject matters described in the claims.

Hereinafter, an object (for example, metal) subject to main welding is defined as an "original workpiece", and an object produced (manufactured) by the main welding is defined as a "workpiece". The "workpiece" is not limited to a workpiece produced by the main welding executed once, and may be a composite workpiece produced by the main welding executed two or more times. In addition, a step of producing a workpiece by joining an original workpiece and another original workpiece to each other by a welding robot is defined as "main welding".

(Configuration of Welding System)

FIG. 1 is a schematic diagram illustrating a system configuration example of the welding system 100 according to Embodiment 1. The welding system 100 is a configuration including a host device 1 connected to an external storage ST, an input interface UI1, and a monitor MN1, a robot control device 2, an inspection control device 3, a sensor 4, an offline teaching device 5, a monitor MN3, an input device UI3, a welding robot MC1, and a monitor MN2. In FIG. 1, the sensor 4 is illustrated as a separate body from the welding robot MC1, but may be provided integrally with the welding robot MC1 (see FIG. 2). The monitor MN2 is not an essential component and may be omitted.

The host device 1 integrally controls start and completion of main welding executed by the welding robot MC1 via the robot control device 2. For example, the host device 1 reads out, from the external storage ST, welding-related information input or set in advance by an operator (for example, a welding operator or a system administrator. The same applies hereinafter), generates a main welding execution command including contents of the welding-related information by using the welding-related information, and transmits the main welding execution command to the corresponding robot control device 2. When the main welding executed by the welding robot MC1 is completed, the host device 1 receives, from the robot control device 2, a main welding completion report indicating that the main welding executed by the welding robot MC1 is completed, updates to a status indicating that the corresponding main welding is completed, and records the status in the external storage ST.

The main welding execution command described above is not limited to being generated by the host device 1, and may be generated by, for example, an operation panel of a facility (for example, a programmable logic controller (PLC)) in a factory or the like where the main welding is executed, or an operation panel of the robot control device 2 (for example, the teach pendant). The teach pendant is a device for operating the welding robot MC1 connected to the robot control device 2.

The host device 1 collectively controls the start and completion of bead appearance inspection using the robot control device 2, the inspection control device 3, and the sensor 4. For example, upon receiving the main welding completion report from the robot control device 2, the host device 1 generates a bead appearance inspection execution command of the workpiece produced by the welding robot MC1 and transmits the generated execution command to each of the robot control device 2 and the inspection control device 3. When the bead appearance inspection is completed, the host device 1 receives, from the inspection control device 3, an appearance inspection report indicating that the bead appearance inspection is completed, updates to a status indicating that the corresponding bead appearance inspection is completed, and records the status in the external storage ST.

Here, the welding-related information is information indicating contents of the main welding executed by the welding robot MC1, and is created in advance for each step of the main welding and is registered in the external storage ST. The welding-related information includes, for example, the number of original workpieces used in the main welding, workpiece information including an ID of the original workpiece used in the main welding, lot information, a name, and a welding part of the original workpiece (for example, information on a welding line and position information on the welding line), a scheduled execution date on which the main welding is executed, the number of original workpieces to be produced, and various welding conditions during the main welding. The welding-related information is not limited to the data on the items described above, and may further include information such as a welding operation teaching program and a scanning operation teaching program that have already been created (refer to the following description), and welding operation setting information, scanning operation setting information, and the like used to create the teaching programs.

In addition, the welding condition includes, for example, a material and a thickness of the original workpiece, a material and a wire diameter of a welding wire 301, a type of shielding gas, a flow rate of the shielding gas, a set average value of a welding current, a set average value of a welding voltage, a feeding speed and a feeding amount of the welding wire 301, the number of times of welding, and welding time. Further, in addition to the above, the welding condition may include, for example, information indicating a type of the main welding (for example, TIG welding, MAG welding, and pulse welding), a moving speed and a moving time of a manipulator 200.

Based on the main welding execution command transmitted from the host device 1, the robot control device 2 causes the welding robot MC1 to start execution of the main welding using an original workpiece designated by the execution command. The welding-related information described above is not limited to being managed by the host device 1 with reference to the external storage ST, and may be managed by, for example, the robot control device 2. In this case, since the robot control device 2 can know a state in which the main welding is completed, an actual execution date may be managed instead of the scheduled execution date, on which a welding step is scheduled to be executed, in the welding-related information. Although a type of the main welding is not limited in the present specification, in order to make the description easy to understand, a step of joining a plurality of original workpieces to produce one workpiece will be described as an example.

The host device 1 is separately connected to the monitor MN1, the input interface UI1, and the external storage ST so as to allow data input to and output from therebetween, and is further connected to the robot control device 2 so as to allow data communication therebetween. The host device 1 may be a terminal device P1 that integrally includes the monitor MN1 and the input interface UI1, and may further integrally include the external storage ST. In this case, the terminal device PI is a personal computer (PC) that is used by the operator before the main welding is executed. The terminal device PI is not limited to the PC described above, and may be a computer device having a communication function, such as a smartphone or a tablet terminal.

The monitor MN1 may be formed using a display device such as a liquid crystal display (LCD) or an organic electroluminescence (EL). The monitor MN1 may display, for example, a screen showing a notification indicating that the main welding is completed or a notification indicating that the bead appearance inspection is completed, which is output from the host device 1. In addition, a speaker (not illustrated) may be connected to the host device 1 instead of the monitor MN1 or together with the monitor MN1, and the host device 1 may output, via the speaker, a sound of a content indicating that the main welding is completed or a content indicating that the bead appearance inspection is completed.

The input interface UI1 is an operator interface that detects an input operation of the operator and outputs the input operation to the host device 1, and may be formed using, for example, a mouse, a keyboard, or a touch panel. The input interface UI1 receives, for example, an input operation when the operator creates the welding-related information or an input operation when the main welding execution command is transmitted to the robot control device 2.

The external storage ST is formed using, for example, a hard disk drive or a solid state drive. The external storage ST stores, for example, data of the welding-related information created for each main welding, a status (a production status) of a workpiece Wk produced by the main welding, and workpiece information of the workpiece Wk (see above). The external storage ST may store, for each welding line, a welding operation teaching program and a scanning operation teaching program that are created by the offline teaching device 5. The welding operation teaching program and the scanning operation teaching program will be described later.

The robot control device 2 is connected to the host device 1, the inspection control device 3, and the offline teaching device 5 so as to allow data communication therebetween, and is connected to the welding robot MC1 so as to allow data communication therebetween. Upon receiving the main welding execution command transmitted from the host device 1, the robot control device 2 creates a main welding program based on a welding operation teaching program corresponding to the execution command, and controls the welding robot MC1 to execute the main welding. When the completion of the main welding is detected, the robot control device 2 generates a main welding completion report indicating that the main welding is completed, and notifies the host device 1 of the main welding completion report. Accordingly, the host device 1 can appropriately detect the completion of the main welding by the robot control device 2. A method of detecting the completion of the main welding by the robot control device 2 may be, for example, a method of determining completion of the main welding based on a signal indicating the completion of the main welding from a sensor (not illustrated) provided in a wire feeding device 300, or may be a known method, and contents of the method of detecting the completion of the main welding are not limited.

The welding robot MC1 is connected to the robot control device 2 so as to allow data communication therebetween. The welding robot MC1 executes the main welding commanded from the host device 1 under control of the corresponding robot control device 2. In addition, the welding robot MC1 moves the sensor 4 based on the scanning operation teaching program, thereby executing the bead appearance inspection commanded from the host device 1.

The inspection control device 3 is connected to the host device 1, the robot control device 2, the sensor 4, and the offline teaching device 5 so as to allow data communication therebetween. Upon receiving the bead appearance inspection execution command transmitted from the host device 1, the inspection control device 3 executes, in cooperation with the sensor 4, the bead appearance inspection on a welding part (that is, a weld bead) of the workpiece Wk produced by the welding robot MC1 (for example, inspection on whether the weld bead formed on the workpiece satisfies a predetermined welding standard) in accordance with the scanning operation teaching program for the corresponding workpiece Wk. As a result of the scanning operation, the inspection control device 3 uses input data (for example, point cloud data capable of specifying a three-dimensional shape of the weld bead) related to a shape of the weld bead acquired by the sensor 4 to execute the bead appearance inspection based on comparison between the input data related to the shape of the weld bead and master data of a non-defective workpiece predetermined for each workpiece. The bead appearance inspection executed by the welding robot MC1 in Embodiment 1 is not limited to the appearance inspection on the weld bead, and may be an inspection including the appearance inspection on the weld bead and another appearance inspection (for example, presence or absence of component attachment to the workpiece Wk). Accordingly, the operator can more efficiently utilize the effective scanning region of the sensor 4 and simultaneously perform the appearance inspections having different purposes based on an appearance inspection result. In addition, the effective scanning region referred to herein indicates a three-dimensional region in which the sensor 4 can read the appearance shape by scanning.

The inspection control device 3 executes the bead appearance inspection, generates an appearance inspection report including an inspection determination result of the bead appearance inspection and a notification indicating that the bead appearance inspection is completed, transmits the appearance inspection report to the host device 1, and outputs the appearance inspection report to the monitor MN2. When the inspection control device 3 determines that a defect is detected in the bead appearance inspection of the workpiece, the inspection control device 3 generates an appearance inspection report including an appearance inspection result including information on a defective section for repair welding of the defect, and transmits the appearance inspection report to the host device 1 and the robot control device 2. In addition, when the inspection control device 3 determines that a defect is detected by the bead appearance inspection of the workpiece, the inspection control device 3 creates, by using the appearance inspection result including the information on the defective section, a repair welding program for executing correction such as repair on a defective portion. The inspection control device 3 transmits, to the host device 1 or the robot control device 2, the repair welding program and the appearance inspection result in association with each other.

The sensor 4 is connected to the inspection control device 3 so as to allow data communication therebetween. The sensor 4 is attached to the welding robot MC1, and executes three-dimensional scanning of the workpiece Wk, a stage (not illustrated) on which the workpiece Wk is placed, a jig, and the like in accordance with driving of the manipulator 200 based on control of the robot control device 2. The sensor 4 acquires three-dimensional shape data (for example, point cloud data) capable of specifying three-dimensional shape data or the like of the workpiece Wk placed on the stage in accordance with the driving of the manipulator 200 based on control of the robot control device 2, and transmits the three-dimensional shape data to the inspection control device 3.

The monitor MN2 may be formed using a display device such as an LED or an organic EL. The monitor MN2 displays, for example, a screen showing a notification indicating that the bead appearance inspection is completed or the notification and a bead appearance inspection result, which are output from the inspection control device 3. In addition, a speaker (not illustrated) may be connected to the inspection control device 3 instead of the monitor MN2 or together with the monitor MN2, and the inspection control device 3 may output, via the speaker, a sound indicating a content of the notification indicating that the appearance inspection is completed or the notification and the result of the bead appearance inspection.

The offline teaching device 5 is connected to the robot control device 2, the inspection control device 3, the monitor MN3, and the input device UI3 so as to allow data communication therebetween. The offline teaching device 5 stores, as setting information, the position information of the welding line for each workpiece Wk for which a teaching program is to be created or has been created. In addition, the offline teaching device 5 constructs a virtual production facility (for example, a virtual welding robot, a virtual workpiece, a virtual stage, or a virtual jig) in a three-dimensional space (a virtual space), and creates a welding operation teaching program and a scanning operation teaching program for the workpiece Wk based on a control command and various kinds of data transmitted from the input device UI3 (for example, input data related to a shape of a weld bead or the workpiece Wk, data of a 3D model, or position information of a welding line), various kinds of data output from the robot control device 2 or the inspection control device 3 (for example, input data related to a shape of a weld bead or the workpiece Wk, data of a 3D model, or position information of a welding line), or the like. The offline teaching device 5 transmits the created welding operation teaching program and scanning operation teaching program to the robot control device 2. The created scanning operation teaching program may be transmitted not only to the robot control device 2 but also to the inspection control device 3. In addition, the offline teaching device 5 stores the created welding operation teaching program and scanning operation teaching program for each workpiece Wk.

The offline teaching device 5 constructs a virtual production facility (a virtual welding robot VMC1 in the example illustrated in FIG. 3) in a three-dimensional space (a virtual space) based on the position information of the welding line, generates a teaching auxiliary image (see FIGS. 6 to 8) in which welding lines WS11 and WS12, effective scanning regions scanned by the sensor 4, and the like are superimposed, transmits the generated teaching auxiliary image to the monitor MN3, and displays the teaching auxiliary image.

Here, the position information of the welding line is information indicating a position of a welding line formed in the workpiece Wk. The position information of the welding line includes at least position information of two endpoints corresponding to a start position or an end position of the main welding indicated by the welding line.

Here, the welding operation teaching program is a program that is created based on the welding line and that causes the welding robot MC1 to execute the main welding. The welding operation teaching program is created including information on a position, a distance, and an angle (posture) of a welding torch 400 for executing various operations (for example, approach, retraction, avoidance, and welding) for subjecting the main welding to the workpiece Wk using the welding torch 400, and information on welding conditions and the like.

In addition, the scanning operation teaching program referred to herein is a program that is created based on the welding line and that causes the welding robot MC1 to execute the appearance inspection on at least one weld bead or the workpiece Wk created by the main welding. The scanning operation teaching program is created including information on a position, a distance, and an angle (posture) of the sensor 4 for executing various operations (for example, approach, retraction, avoidance, and scanning) for executing the appearance inspection on the created weld bead, the workpiece Wk, and the like using the sensor 4.

The monitor MN3 may be formed using a display device such as an LCD or an organic EL. The monitor MN3 displays a teaching auxiliary screen transmitted from the offline teaching device 5. In addition, the monitor MN3 displays an image in which the operation trajectory of the sensor 4 or the operation trajectory of the welding torch 400 is superimposed on the image of the virtual production facility transmitted from the offline teaching device 5.

The input device UI3 is an operator interface that detects an input operation of the operator and outputs the input operation to the host device 1, and may be formed using, for example, a mouse, a keyboard, or a touch panel. The input device UI3 receives input operations of welding line position information, welding setting information, scanning setting information, a 3D model, and the like of the workpiece Wk used for creating the scanning operation teaching program and the welding operation teaching program, input operations of the created scanning operation teaching program and welding operation teaching program, and the like. Here, the monitor MN3 and the input device UI3 as referred herein may be an integrally formed terminal device P3 (for example, a PC, a notebook PC, or a tablet terminal).

Figure 2:
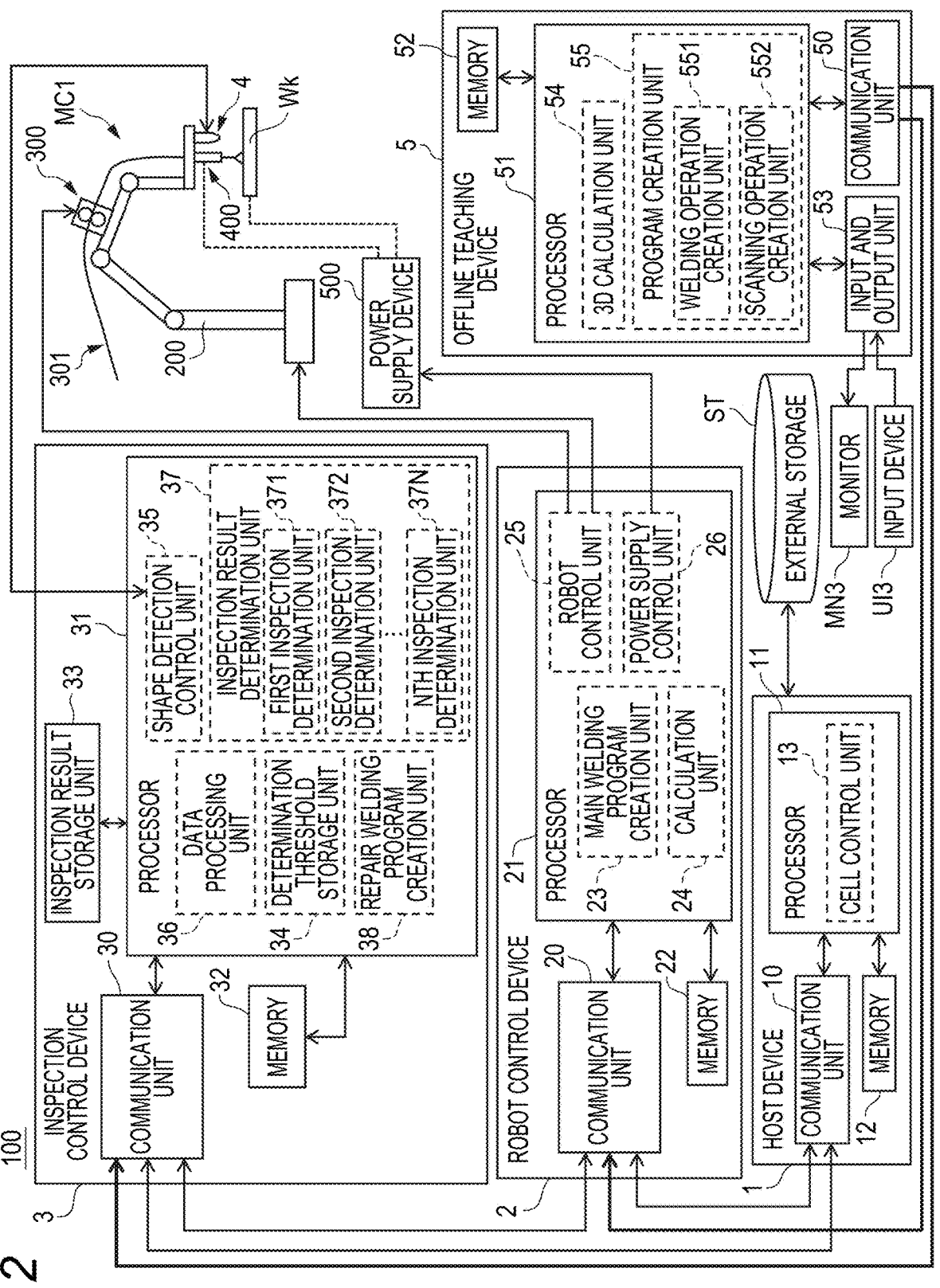
FIG. 2 is a diagram illustrating an internal configuration example of an inspection control device, a robot control device, a host device, and an offline teaching device according to Embodiment 1.

FIG. 2 is a diagram illustrating an internal configuration example of the inspection control device 3, the robot control device 2, the host device 1, and the offline teaching device 5 according to Embodiment 1. In order to make the description easy to understand, illustration of the monitor MN1 and MN2 and the input interface UI1 is omitted in FIG. 2. The workpiece Wk illustrated in FIG. 2 is a workpiece to be subjected to the bead appearance inspection. The workpiece Wk may be a workpiece produced by the main welding, or a so-called repair workpiece that is repaired one or more times by repair welding. In addition, although the welding robot MC1 illustrated in FIG. 2 is a configuration including the sensor 4, the sensor 4 10 may be included in another robot (for example, an inspection robot for executing the appearance inspection or a repair welding robot for executing the repair welding).

Under the control of the robot control device 2, the welding robot MC1 executes a main welding step based on the welding operation teaching program using the welding torch 400, a bead appearance inspection step based on the scanning operation teaching program 15 using the sensor 4, and the like. In addition, the welding robot MC1 may scan an appearance of the workpiece Wk using the sensor 4 in order to acquire the position information of the weld bead formed on the workpiece Wk and an appearance shape of the workpiece Wk used to create the welding operation teaching program and the scanning operation teaching program. The welding robot MC1 executes, for example, arc welding in the main welding 20 step. The welding robot MC1 may execute welding (for example, laser welding and gas welding) other than the arc welding. In this case, although not illustrated, a laser head, instead of the welding torch 400, may be connected to a laser oscillator via an optical fiber. The welding robot MC1 is a configuration including at least the manipulator 200, the wire feeding device 300, the welding wire 301, and the welding torch 400.

The manipulator 200 includes an articulated arm, and moves each arm based on a control signal from a robot control unit 25 of the robot control device 2. Accordingly, the manipulator 200 can change a positional relation (for example, an angle of the welding torch 400 relative to the workpiece Wk) between the workpiece Wk and the welding torch 400 and a positional relation between the workpiece Wk and the sensor 4 by driving the arm.

The wire feeding device 300 controls the feeding speed of the welding wire 301 based on the control signal transmitted from the robot control device 2. The wire feeding device 300 may include a sensor (not illustrated) that can detect a remaining amount of the welding wire 301. Based on an output of the sensor, the robot control device 2 can detect that the main welding step is completed.

The welding wire 301 is held by the welding torch 400. When electric power is supplied from a power supply device 500 to the welding torch 400, an arc is generated between a distal end of the welding wire 301 and the workpiece Wk, and the arc welding is executed. Illustration and description of a configuration and the like for supplying shielding gas to the welding torch 400 are omitted for the convenience of description.

The host device 1 generates execution commands for various steps of the main welding or the bead appearance inspection by using the welding-related information input or set in advance by the operator, and transmits the execution commands to the robot control device 2. As described above, when the sensor 4 is integrally attached to the welding robot MC1, the bead appearance inspection execution command is transmitted to both the robot control device 2 and the inspection control device 3. The host device 1 includes at least a communication unit 10, a processor 11, and a memory 12.

The communication unit 10 is separately connected to the robot control device 2 and the external storage ST so as to allow data communication therebetween. The communication unit 10 transmits, to the robot control device 2, the execution commands for various steps of the main welding or the bead appearance inspection generated by the processor 11. The communication unit 10 receives the main welding completion report and the appearance inspection report that are transmitted from the robot control device 2, and outputs the main welding completion report and the appearance inspection report to the processor 11. The main welding execution command may include, for example, a control signal for controlling each of the manipulator 200, the wire feeding device 300, and the power supply device 500 that are included in the welding robot MC1.

The processor 11 is formed by using, for example, a central processing unit (CPU) or a field programmable gate array (FPGA), and executes various processes and controls in cooperation with the memory 12. Specifically, the processor 11 implements functions of a cell control unit 13 by referring to a program stored in the memory 12 and executing the program.

The memory 12 includes, for example, a random access memory (RAM) as a work memory used when a process of the processor 11 is executed, and a read only memory (ROM) that stores a program defining the process of the processor 11. Data generated or acquired by the processor 11 is temporarily stored in the RAM. The program defining the process of the processor 11 is written into the ROM. In addition, the memory 12 separately stores the data of the welding-related information read out from the external storage ST, the status of the workpiece, and data of the workpiece information of the workpiece Wk (see below) transmitted from the robot control device 2.

The cell control unit 13 generates, based on the welding-related information stored in the external storage ST, an execution command for executing the main welding, the bead appearance inspection on the workpiece Wk, appearance scanning of the workpiece Wk, or the repair welding. In addition, the cell control unit 13 creates a main welding program at the time of main welding, an appearance inspection program related to driving of the welding robot MC1 at the time of bead appearance inspection on the workpiece Wk, or an appearance scanning program related to driving of the welding robot MC1 at the time of appearance scanning based on the welding-related information stored in the external storage ST and the welding operation teaching program and the scanning operation teaching program that are created by the offline teaching device 5 and transmitted from the robot control device 2. Further, the cell control unit 13 creates an execution command for the created programs. The appearance inspection program and the appearance scanning program may be created for each workpiece Wk in advance and stored in the external storage ST. In this case, the cell control unit 13 reads out and acquires various programs from the external storage ST. The cell control unit 13 may generate different execution commands for various steps of the main welding to be executed by the welding robot MC1. The execution commands for the main welding appearance inspection and the appearance scanning that are generated by the cell control unit 13 are transmitted to the corresponding robot control device 2 or each of the robot control device 2 and the inspection control device 3 via the communication unit 10.

The robot control device 2 refers to a corresponding program based on the execution command for the main welding, the bead appearance inspection, or the appearance scanning transmitted from the host device 1. The robot control device 2 controls the welding robot MC1 (for example, the sensor 4, the manipulator 200, the wire feeding device 300, and the power supply device 500) based on the referred program. The robot control device 2 is a configuration including at least a communication unit 20, a processor 21, and a memory 22.

The communication unit 20 is connected to the host device 1, the inspection control device 3, the welding robot MC1, and the offline teaching device 5 so as to allow data communication therebetween. Although illustration is simplified in FIG. 2, data is transmitted and received between the robot control unit 25 and the manipulator 200, between the robot control unit 25 and the wire feeding device 300, and between a power supply control unit 26 and the power supply device 500 via the communication unit 20. The communication unit 20A receives the execution command for the main welding or the bead appearance inspection transmitted from the host device 1. The communication unit 20 receives the position information of the welding line, the welding operation teaching program, and the scanning operation teaching program that are transmitted from the offline teaching device 5. The communication unit 20 transmits the workpiece information of the workpiece Wk produced by the main welding to the host device 1.

Here, the workpiece information not only includes an ID of the workpiece Wk but also includes at least an ID, a name, and a welding part of an original workpiece used in the main welding, and a welding condition at the time of executing the main welding.

The processor 21 is formed using, for example, a CPU or an FPGA, and executes various processes and controls in cooperation with the memory 22. Specifically, the processor 21 implements functions of a main welding program creation unit 23, the robot control unit 25, and the power supply control unit 26 by referring to a program stored in the memory 22 and executing the program. In addition, the processor 21 executes, based on a main welding program generated by the main welding program creation unit 23, calculation on a parameter for controlling the welding robot MC1 (specifically, each of the manipulator 200, the wire feeding device 300, and the power supply device 500) controlled by the robot control unit 25.

The memory 22 includes, for example, a RAM as a work memory used when a process of the processor 21 is executed, and a ROM that stores a program defining the process of the processor 21. Data generated or acquired by the processor 21 is temporarily stored in the RAM. The program defining the process of the processor 21 is written into the ROM. In addition, the memory 22 stores data of the execution command for the main welding or the bead appearance inspection transmitted from the host device 1, and the welding-related information in which the workpiece information of the workpiece Wk produced by the main welding and the position information of the welding line are associated with each other. The welding-related information including the workpiece information of the workpiece Wk to which the welding operation teaching program and the scanning operation teaching program are transmitted from the offline teaching device 5 may include the welding operation teaching program and the scanning operation teaching program, position information of a welding line used to create the welding operation teaching program and the scanning operation teaching program, the welding operation setting information, and the scanning operation setting information.

The main welding program creation unit 23 creates a main welding program for the main welding to be executed by the welding robot MC1, based on the main welding execution command transmitted from the host device 1 via the communication unit 20, by using the workpiece information on each of the plurality of original workpieces included in the execution command (for example, an ID, a name, and a workpiece coordinate system of a workpiece, information on an original workpiece, and welding line position information) and the welding operation teaching program associated with the workpiece information. The main welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the main welding. The main welding program may be stored in the processor 21 or may be stored in the RAM of the memory 22.

The calculation unit 24 performs various calculations. For example, the calculation unit 24 executes, based on the welding program generated by the main welding program creation unit 23, calculation on a parameter or the like for controlling the welding robot MC1 (specifically, each of the manipulator 200, the wire feeding device 300, and the power supply device 500) controlled by the robot control unit 25.

The robot control unit 25 generates a control signal for driving the welding robot MC1 (specifically, the sensor 4, each of the manipulator 200, the wire feeding device 300, and the power supply device 500) based on the main welding program generated by the main welding program creation unit 23. The robot control unit 25 transmits the generated control signal to the welding robot MC1.

In addition, the robot control unit 25 drives each of the manipulator 200 and the sensor 4 of the welding robot MC1 based on the appearance inspection program created using the scanning operation teaching program. Accordingly, the sensor 4 attached to the welding robot MC1 can move along with the operation of the welding robot MC1, scan the weld bead of the workpiece Wk to acquire input data related to the shape of the weld bead (for example, point cloud data capable of specifying the three-dimensional shape of the weld bead), and partially scan the workpiece Wk to acquire input data related to a partial shape of the workpiece Wk corresponding to other appearance inspection portions (for example, point cloud data capable of specifying the three-dimensional shape of the workpiece Wk corresponding to the other appearance inspection portions).

The power supply control unit 26 drives the power supply device 500 based on a calculation result of the main welding program generated by the main welding program creation unit 23.

The inspection control device 3 controls, based on the bead appearance inspection execution command transmitted from the host device 1, a process of the bead appearance inspection on the workpiece Wk produced by the main welding executed by the welding robot MC1 or the workpiece Wk repaired by the repair welding executed one or more times. The bead appearance inspection is, for example, an inspection of whether a weld bead formed in the workpiece Wk satisfies a predetermined welding standard (for example, a welding quality standard required by each of the operators), and is formed by the inspection determination described above. The inspection control device 3 determines (inspects) whether an appearance shape of the weld bead formed in the workpiece Wk satisfies the predetermined welding standard based on the input data (for example, point cloud data capable of specifying a three-dimensional shape of the weld bead) related to the shape of the weld bead acquired by the sensor 4. In addition, the inspection control device 3 transmits the input data related to the shape of the weld bead or the workpiece Wk acquired by the sensor 4 to the offline teaching device 5. The inspection control device 3 includes at least a communication unit 30, a processor 31, a memory 32, and an inspection result storage unit 33.

The communication unit 30 is connected to the host device 1, the robot control device 2, the sensor 4, and the offline teaching device 5 so as to allow data communication therebetween. Although illustration is simplified in FIG. 2, data is transmitted and received between a shape detection control unit 35 and the sensor 4 via the communication unit 30. The communication unit 30 receives the bead appearance inspection execution command transmitted from the host device 1. The communication unit 30 transmits an inspection determination result of the bead appearance inspection using the sensor 4 to the host device 1, and transmits three-dimensional shape data of the weld bead acquired by the sensor 4 to the offline teaching device 5.

The processor 31 is formed using, for example, a CPU or an FPGA, and executes various processes and controls in cooperation with the memory 32. Specifically, the processor 31 functionally implements a determination threshold storage unit 34, the shape detection control unit 35, a data processing unit 36, an inspection result determination unit 37, and a repair welding program creation unit 38 by referring to a program stored in the memory 32 and executing the program.

The memory 32 includes, for example, a RAM serving as a work memory used when a process of the processor 31 is executed, and a ROM that stores a program defining the process of the processor 31. Data generated or acquired by the processor 31 is temporarily stored in the RAM. The program defining the process of the processor 31 is written into the ROM. In addition, the memory 32 may store the scanning operation teaching program transmitted from the offline teaching device 5 and the workpiece information in association with each other.

The inspection result storage unit 33 is formed using, for example, a hard disk or a solid state drive. The inspection result storage unit 33 stores data indicating a result of the bead appearance inspection on the welding part of the workpiece Wk (for example, a workpiece or a repair workpiece) as an example of the data generated or acquired by the processor 31. The data indicating the result of the bead appearance inspection is generated by, for example, the inspection result determination unit 37 (specifically, any of a first inspection determination unit 371, a second inspection determination unit 372 to an Nth inspection determination unit 37N included in the inspection result determination unit 37).

The determination threshold storage unit 34 is formed by, for example, a cache memory provided in the processor 31, is set in advance by an operator operation, and stores information on thresholds (for example, a threshold set for each type of welding failure) corresponding to the welding part and the bead appearance inspection process of each of the first inspection determination unit 371, . . . , the Nth inspection determination unit 37N included in the inspection result determination unit 37. The thresholds are, for example, an allowable range of a positional deviation of the weld bead, thresholds of a length, a height, and a width of the weld bead, and thresholds of a perforation, a pit, an undercut, and a sputtering. The determination threshold storage unit 34 may store, as the thresholds during the bead appearance inspection after repair welding, an allowable range that satisfies a minimum welding standard (quality) required by a customer or the like (for example, a minimum allowable value or a maximum allowable value). The thresholds are used in a process of determining whether inspection results created by the first inspection determination unit 371 and the second inspection determination unit 372 to the Nth inspection determination unit 37N included in the inspection result determination unit 37 are acceptable for the bead appearance inspection. Further, the determination threshold storage unit 34 may store an upper limit value of the number of times of bead appearance inspections for each welding part. Accordingly, when the number of times at the time of correcting a defective portion by the repair welding exceeds a predetermined upper limit value of the number of times, the inspection control device 3 determines that the correction on the defective portion by automatic repair welding by the welding robot MC1 is difficult or impossible, and can prevent a decrease in an operation rate of the welding system 100.

The shape detection control unit 35 acquires input data (for example, point cloud data capable of specifying the three-dimensional shape of the weld bead) related to the shape of the weld bead acquired and transmitted by the sensor 4 based on the bead appearance inspection execution command for the welding part of the workpiece Wk (for example, the workpiece or the repair workpiece) transmitted from the host device 1. In addition, the shape detection control unit 35 acquires the input data (for example, point cloud data capable of specifying the three-dimensional shape of the workpiece Wk) related to the shape of the workpiece Wk acquired and transmitted by the sensor 4 based on the appearance scanning execution command for the workpiece Wk transmitted from the host device 1. Specifically, when the sensor 4 reaches a position where the weld bead or the workpiece Wk can be imaged (in other words, a position where the three-dimensional shape of the welding part or the workpiece Wk can be detected) in accordance with the driving of the manipulator 200 by the robot control device 2 described above, the shape detection control unit 35 causes the sensor 4 to emit, for example, a laser beam to acquire the input data related to the shape of the weld bead or the workpiece Wk. Upon receiving the input data (see above) acquired by the sensor 4, the shape detection control unit 35 transmits the input data to the data processing unit 36.

When the input data (see description above) related to the shape of the weld bead is received from the shape detection control unit 35, the data processing unit 36 converts the input data into a data format suitable for first inspection determination by the inspection result determination unit 37, and converts the input data into a data format suitable for each of second inspection determination, . . . , Nth inspection determination by the inspection result determination unit 37. The conversion of the data format may include correction processing of removing unnecessary point cloud data (for example, noise) included in the input data (that is, point cloud data) as so-called preprocessing, and the above preprocessing may be omitted for the first inspection determination. The data processing unit 36 generates image data indicating the three-dimensional shape of the weld bead by setting a data format suitable for the first inspection determination and executing a statistical process on the input shape data, for example. The data processing unit 36 may execute edge enhancement correction in which a peripheral portion of the weld bead is enhanced in order to enhance the position and the shape of the weld bead as data for the first inspection determination. The data processing unit 36 may count the number of times the bead appearance inspection is executed for each welding failure portion, and determine that it is difficult or impossible to correct the welding failure portion by automatic repair welding in a case where a welding inspection result is not favorable even when the number of times of the bead appearance inspection exceeds the number of times stored in advance in the memory 32. In this case, the inspection result determination unit 37 generates an alert screen including a position of the welding failure portion and a type of the welding failure (for example, a perforation, a pit, an undercut, a sputtering, or a protrusion), and transmits the generated alert screen to the host device 1 via the communication unit 30. The alert screen transmitted to the host device 1 is displayed on the monitor MN1. The alert screen may be displayed on the monitor MN2.

The data processing unit 36 uses the threshold for bead appearance inspection stored in the determination threshold storage unit 34 to execute the bead appearance inspection based on comparison between the input data related to the shape of the weld bead acquired by the sensor 4 and the master data of a non-defective workpiece predetermined for each workpiece. The data processing unit 36 creates an appearance inspection report including a defect determination result as an inspection determination result (that is, information indicating presence or absence of a defect that requires repair welding) and information regarding a defective section for each defective portion and stores the appearance inspection report in the inspection result storage unit 33, and transmits the appearance inspection report to the host device 1 or the robot control device 2 via the communication unit 30. When the data processing unit 36 determines that there is no defective portion that requires repair welding in the workpiece Wk to be inspected, the data processing unit 36 creates an appearance inspection report including an inspection determination result indicating that the inspection result passes the bead appearance inspection and stores the appearance inspection report in the inspection result storage unit 33, and transmits the appearance inspection report to the host device 1 via the communication unit 30.

In addition, when the input data (see description above) related to the shape of the workpiece Wk is acquired from the shape detection control unit 35, the data processing unit 36 converts the input data into a data format suitable for the calculation process executed by the offline teaching device 5. The conversion of the data format may include, as a so-called preprocess, a correction process of removing unnecessary point cloud data (for example, noise) included in the input data (that is, point cloud data), or may be a process of generating a 3D model of the workpiece Wk. In addition, the data processing unit 36 may execute edge enhancement correction in which the position and the shape of the workpiece Wk are enhanced and the peripheral portion of the workpiece Wk is enhanced. The data processing unit 36 transmits the input data related to the shape of the workpiece Wk after conversion to the offline teaching device 5 via the communication unit 30.

The inspection result determination unit 37 may execute a total of N (N is an integer of 2 or more) types of bead appearance inspection (for example, each of the first inspection determination and the second inspection determination described above). Specifically, the inspection result determination unit 37 includes the first inspection determination unit 371 and the second inspection determination unit 372 to the Nth inspection determination unit 37N. Although the description will be made assuming that N=2 in order to facilitate understanding of the description in FIG. 2, the same applies to an integer of N=3 or more.

The first inspection determination unit 371 executes the first inspection determination (that is, the bead appearance inspection based on comparison between the input data related to the shape of the weld bead acquired by the sensor 4 and the master data of the non-defective workpiece predetermined for each workpiece), and inspects shape reliability of the weld bead (for example, whether the weld bead is along a straight or curved welding line), a bead crack, and a bead positional deviation. The first inspection determination unit 371 executes comparison (so-called image process) between the master data of the non-defective workpiece and the data (for example, image data generated based on the point cloud data) subjected to the data conversion by the data processing unit 36 for the first inspection determination. Therefore, the first inspection determination unit 371 can inspect the shape reliability of the weld bead, the bead crack, and the bead positional deviation with high accuracy. The first inspection determination unit 371 calculates an inspection score indicating an inspection result of the shape reliability of the weld bead, the bead crack, and the bead positional deviation, and creates a calculated value of the inspection score as a first inspection result. Further, the first inspection determination unit 371 compares the created first inspection result with a threshold for the first inspection result stored in the memory 32. The first inspection determination unit 371 outputs the first inspection result including information on a comparison result (that is, whether the acquired first inspection result is acceptable or unacceptable for the bead appearance inspection) to the second inspection determination unit 372 to the Nth inspection determination unit 37N.

The second inspection determination unit 372 to the Nth inspection determination unit 37N respectively execute the second inspection determination (that is, the bead appearance inspection of forming neural networks based on (N−1) types of artificial intelligence and determining presence or absence of a welding failure based on AI targeting the input data related to the shape of the weld bead acquired by the sensor 4 or the input data after preprocessing the input data by the data processing unit 36), and inspect presence or absence of the perforation, pit, undercut, sputtering, and protrusion of the weld bead. The perforation, pit, undercut, sputtering, and protrusion of the weld bead are merely exemplified, and the defect type inspected by the Nth inspection determination unit 37N is not limited thereto. When it is determined that the welding failure of the corresponding type is detected, each of the second inspection determination unit 372 to the Nth inspection determination unit 37N specifies the position of the weld bead at which the welding failure is detected. Each of the second inspection determination unit 372 to the Nth inspection determination unit 37N determines presence or absence of a welding failure using a learning model (AI) obtained in advance by a learning process for each type of welding failure or each group of types of welding failure. Accordingly, each of the second inspection determination unit 372 to the Nth inspection determination unit 37N can inspect, for example, the presence or absence of the perforation, pit, undercut, sputtering, and protrusion of the weld bead with high accuracy. Each of the second inspection determination unit 372 to the Nth inspection determination unit 37N does not execute the inspection on the shape reliability of the weld bead, the bead crack, and the bead positional deviation executed by the first inspection determination unit 371. The second inspection determination unit 372 to the Nth inspection determination unit 37N calculate an inspection result (in other words, an inspection score indicating an occurrence probability) of the perforation, pit, undercut, sputtering, and protrusion of the weld bead, and create a calculated value of the inspection score as a second inspection determination result.

The inspection result determination unit 37 may determine whether the repair welding by the welding robot MC1 is possible (in other words, whether the repair welding by the welding robot MC1 is favorable or manual repair welding is favorable) based on the inspection result (inspection score) included in the first inspection result or the second inspection result described above, and output a determination result included in the appearance inspection report described above.

The repair welding program creation unit 38 creates a repair welding program for the workpiece Wk to be executed by the welding robot MC1 by using the appearance inspection report of the workpiece Wk by the data processing unit 36. The repair welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the repair welding. The generated repair welding program may be stored in the processor 31, may be stored in the RAM of the memory 32, or may be transmitted to the host device 1 or the robot control device 2 via the communication unit 30 in association with the appearance inspection report.

The repair welding program creation unit 38 creates a repair welding program of the workpiece Wk (for example, a workpiece or a repair workpiece) to be executed by the welding robot MC1 using the appearance inspection report of the workpiece Wk (for example, a workpiece or a repair workpiece) by the inspection result determination unit 37 and the workpiece information (for example, information such as coordinates indicating a position of a detection point of a welding failure of the workpiece or the repair workpiece). The repair welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the repair welding. The generated repair welding program may be stored in the processor 31 or in the RAM in the memory 32.

The sensor 4 is, for example, a three-dimensional shape sensor, is attached to a distal end of the welding robot MC1, and acquires a plurality of pieces of point cloud data capable of specifying a shape of the workpiece Wk or a welding part on the workpiece Wk. The sensor 4 generates point cloud data capable of specifying the three-dimensional shape of the welding part based on the acquired point cloud data, and transmits the point cloud data to the inspection control device 3. When the sensor 4 is not attached to the distal end of the welding robot MC1 and is disposed separately from the welding robot MC1, the sensor 4 may include a laser light source (not illustrated) configured to scan the workpiece Wk or a welding part on the workpiece Wk (for example, a workpiece or a repair workpiece) based on the position information of the workpiece Wk or the welding part transmitted from the inspection control device 3, and a camera (not illustrated) that is disposed in a manner of capable of imaging an imaging region including a periphery of the workpiece Wk or the welding part and that images a reflection trajectory (that is, a shape line of the welding part) of reflected laser light among laser light emitted onto the workpiece Wk or the welding part. In this case, the sensor 4 transmits, to the inspection control device 3, the shape data of the workpiece Wk or the welding part (in other words, the image data of the workpiece Wk or the weld bead) based on the laser light imaged by the camera. The camera described above includes at least a lens (not illustrated) and an image sensor (not illustrated). The image sensor is, for example, a solid-state imaging device such as a charge coupled device (CCD) or a complementary metal oxide semi-conductor (CMOS), and converts an optical image formed on an imaging surface into an electrical signal.

The offline teaching device 5 is connected to the robot control device 2, the inspection control device 3, the monitor MN3, and the input device UI3 so as to allow data communication therebetween. The offline teaching device 5 creates a scanning operation teaching program of the workpiece Wk based on the position information of the welding line transmitted from the input device UI3. The offline teaching device 5 may create a teaching program of the workpiece Wk based on various kinds of data transmitted from the input device UI3 such as the position information of the welding line, the welding operation setting information, and the scanning operation setting information. The offline teaching device 5 includes a communication unit 50, a processor 51, a memory 52, and an input and output unit 53.

Although the offline teaching device 5 according to Embodiment 1 is described as an example in which the welding operation teaching program and the scanning operation teaching program are created, the creation of the welding operation teaching program is not essential and may be omitted. The offline teaching device 5 includes the sensor 4, and may be capable of creating a scanning operation teaching program for a robot capable of executing a scanning operation (that is, bead appearance inspection) by the sensor 4.

The communication unit 50 is connected to the robot control device 2, the inspection control device 3, the input device UI3, and the monitor MN3 so as to allow data communication therebetween. The communication unit 50 transmits, to the robot control device 2, the created welding operation teaching program and the created scanning operation teaching program and various kinds of data (for example, welding line position information, welding operation setting information, scanning operation setting information, and workpiece information on the workpiece Wk) used for creating the welding operation teaching program and the scanning operation teaching program in association with each other.

The processor 51 is formed using, for example, a CPU or an FPGA, and executes various processes and controls in cooperation with the memory 52. Specifically, the processor 51 implements functions of a 3D calculation unit 54 and a program creation unit 55 by referring to the program, a learning model, and the like stored in the memory 52 and executing the program.

The memory 52 includes, for example, a RAM as a work memory used when a process of the processor 51 is executed, and a ROM that stores a program defining the process of the processor 51. Data generated or acquired by the processor 51 is temporarily stored in the RAM. The program defining the process of the processor 51 is written into the ROM. In addition, the memory 52 stores the welding operation teaching program, the scanning operation teaching program, and the workpiece information, which are created by the program creation unit 55, in association with one another. The memory 52 may store a learning model and learning data for creating the welding operation teaching program and the scanning operation teaching program.

The learning model includes a storage device including one of a semiconductor memory such as a RAM and a ROM and a storage device such as a solid state drive (SSD) and a hard disk drive (HDD).

The learning model stores, for example, learning data for generating each of a welding operation teaching program and a scanning operation teaching program executed by the processor 51, editing information based on an operator operation at the time of creating each of the welding operation teaching program and the scanning operation teaching program created in the past, setting information, and the like.

The learning model automatically generates a welding operation or a scanning operation (that is, an operation trajectory, a scanning section, an effective scanning region, and the like of the sensor 4) based on the welding operation setting information. The learning model may generate training data (learning data) for generating each of a welding operation teaching program and a scanning operation teaching program based on editing information, setting information, and the like based on an operator operation at the time of creating each of the welding operation teaching program and the scanning operation teaching program created in the past.

The learning for generating training data may be executed using one or more statistical classification techniques. Examples of the statistical classification technique include, for example, linear classifiers, support vector machines, quadratic classifiers, kernel estimation, decision trees, artificial neural networks, Bayesian techniques and/or networks, hidden Markov models, binary classifiers, multiclass classifiers, a clustering technique, a random forest technique, a logistic regression technique, a linear regression technique, and a gradient boosting technique. However, the statistical classification technique to be used is not limited thereto.

The input and output unit 53 as an example of an input unit and an acquisition unit acquires the execution command, the 3D model of the workpiece Wk, the welding operation setting information, and the scanning operation setting information, which are transmitted from the input device UI3, and the position information of the welding line transmitted from the robot control device 2, the inspection control device 3, or the input device UI3, and outputs the acquired information to the processor 51. In addition, the input and output unit 53 transmits, to the monitor MN3, an image in which the operation trajectory of the sensor 4 or the operation trajectory of the welding torch 400 is superimposed on an image of a virtual production facility (for example, a virtual welding robot, a virtual workpiece, or a virtual stage) generated by the 3D calculation unit 54 and an image of a virtual production facility transmitted from the offline teaching device 5.

The 3D calculation unit 54 as an example of a generation unit virtually constructs a production facility necessary for executing the main welding step or the appearance inspection step of the workpiece Wk based on, for example, the input data (that is, data of a three-dimensional shape) related to the shape of the workpiece Wk or the weld bead, data of the 3D model of the workpiece Wk, the workpiece information of the workpiece Wk, and data related to a production facility (for example, position information of a stage, position information of a jig, or the robot information or the position information of the welding robot MC1). The 3D calculation unit 54 converts the data of the virtually constructed production facility into image data, outputs the image data to the input and output unit 53, and displays the image data on the monitor MN3.

In addition, the 3D calculation unit 54 generates a teaching auxiliary screen (image data) in which position information of at least one welding line and an effective scanning region of the sensor 4 that scans the welding line are superimposed on a virtual production facility in a virtual space. When the welding operation teaching program created by the program creation unit 55 can be acquired, the 3D calculation unit 54 may generate a teaching auxiliary screen (image data) in which one or more teaching points included in the welding operation teaching program, the operation trajectory of the welding torch 400 (specifically, an auxiliary scanning section, a welding section, and the like), and the like are virtually superimposed on the production facility.

The 3D calculation unit 54 generates a teaching auxiliary screen (image data) in which one or more teaching points included in the scanning operation teaching program created by the program creation unit 55, the operation trajectory of the sensor 4 (specifically, an operation trajectory indicating various operations such as an approach operation, a retraction operation, and an avoidance operation, an auxiliary scanning section, a scanning section, and the like), and the like are virtually superimposed on the production facility. The 3D calculation unit 54 converts, into image data, data of a virtual production facility on which data included in various teaching programs is superimposed, outputs the image data to the input and output unit 53, and displays the image data on the monitor MN3. The 3D calculation unit 54 may generate a teaching auxiliary screen (image data) in which teaching points of the welding operation or the scanning operation, an operation trajectory (specifically, an auxiliary scanning section, a welding section, a scanning section, and the like) of the welding torch 400 or the sensor 4, and the like are collectively superimposed on a virtual production facility based on each of the welding operation teaching program and the scanning operation teaching program, various kinds of data related to the production facility, the position information of the welding line, and the like.

The program creation unit 55 as an example of a control unit and a calculation unit creates a welding operation teaching program and a scanning operation teaching program based on the position information of the welding line (for example, the data of the 3D model of the workpiece Wk, the input data related to the shape of the workpiece Wk or the weld bead, and coordinate information of a start point and an end point of the welding line), the welding operation setting information, the scanning operation setting information, and the like. In addition, the program creation unit 55 may create a welding operation teaching program and a scanning operation teaching program using various kinds of input information, the learning model stored in the memory 52, an algorithm such as a mathematical programming method, and the like. The program creation unit 55 includes a welding operation creation unit 551 and a scanning operation creation unit 552.

The welding operation creation unit 551 creates a welding operation teaching program for executing the main welding step on the workpiece Wk based on the input position information of the welding line and the welding operation setting information. Here, the welding operation setting information may be various welding conditions of the main welding, a group of various parameters necessary for the welding operation such as retreat positions of the welding torch 400 before the start of welding and after the end of welding.

The scanning operation creation unit 552 creates a scanning operation teaching program for executing an appearance inspection step on the weld bead or another appearance inspection portion generated on the workpiece Wk based on the input position information of at least the welding line. The scanning operation creation unit 552 may create a scanning operation teaching program for executing an appearance inspection step on the weld bead or another appearance inspection portion generated on the workpiece Wk based on the input operation trajectory of the welding operation, the 3D model, one or more effective scanning regions disposed on the 3D model, the scanning operation setting information, and the like.

In addition, the scanning operation setting information referred to herein may be a group of various parameters necessary for the scanning operation on the weld bead or other appearance inspection targets such as a distance between the sensor 4 and the workpiece Wk, information of the sensor 4 (for example, an effective scanning range AR0 (see FIG. 3) or an effective scanning region AR1 (see FIG. 4)), a measuring range, approach information (for example, information of an approach start position and an approach end position or instruction information for commanding an approach), a scanning run-up (idle running) section, a scanning section, retraction information (for example, information of a retraction start position and a retraction end position, or instruction information for commanding retraction), avoidance information (for example, information of an avoidance start position and an avoidance end position, position information of an original workpiece or a jig which is an obstacle to be avoided).

Here, an acquisition example of the position information of the welding line will be described. It is needless to say that an example of acquiring the position information of the welding line described below is merely an example, and is not limited thereto.

The offline teaching device 5 acquires the welding operation teaching program of the workpiece Wk, the main welding program, information on the operation trajectory of the welding operation, and the like transmitted from the robot control device 2 or the terminal device P3. Position information of the welding line of the workpiece Wk included in these programs or information is acquired.

The offline teaching device 5 may acquire the position information of the welding line from welding line data associated with the 3D model of the workpiece Wk transmitted from the terminal device P3 based on the 3D model. When the welding line data is not associated with the 3D model of the workpiece Wk transmitted from the terminal device P3, the offline teaching device 5 may acquire the position information of the welding line based on a three-dimensional shape of the 3D model. For example, the offline teaching device 5 acquires, as the position information of the welding line, an intersection point at which surfaces of two or more original workpieces constituting the workpiece Wk intersect with each other or a contact point at which the surfaces of the two or more original workpieces come into contact with each other based on surface shapes of the two or more original workpieces.

The offline teaching device 5 may acquire the position information of the welding line based on scan data (for example, mesh data) acquired by scanning a weld bead formed on the workpiece Wk or the workpiece Wk by the sensor 4. The offline teaching device 5 may acquire the position information of the welding line by teaching using a teach pendant (not illustrated).

Figure 3:
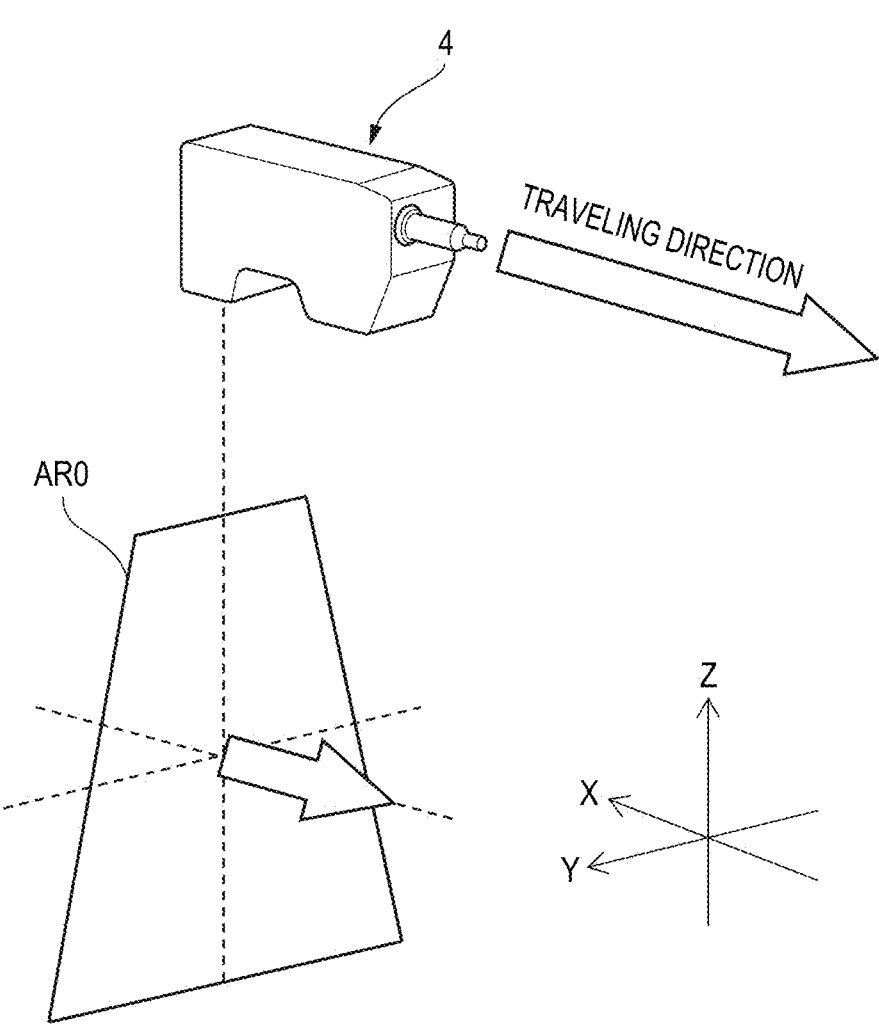
FIG. 3 is a view illustrating an example of an effective scanning range of a sensor.
Figure 4:
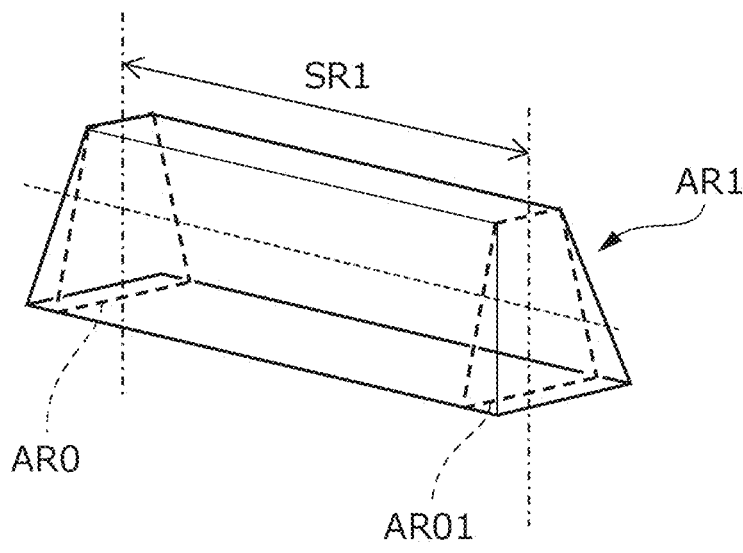
FIG. 4 is a view illustrating an example of an effective scanning region of the sensor.

Here, effective scanning regions of the sensor 4 will be described with reference to FIGS. 3 and 4. FIG. 3 is a view illustrating an example of the effective scanning range AR0 of the sensor. FIG. 4 is a view illustrating an example of the effective scanning region AR1 of the sensor 4. It is needless to say that each of the effective scanning range AR0 illustrated in FIG. 3 and the effective scanning region AR1 illustrated in FIG. 4 is merely an example, and is not limited thereto.

The effective scanning range AR0 illustrated in FIG. 3 is a range in which the sensor 4 can scan a three-dimensional shape of an object (for example, a weld bead or the like, which is a bead appearance inspection target) on a YZ plane. The sensor 4 is moved in a traveling direction by driving of the manipulator 200 of the welding robot MC1 to scan and acquire the three-dimensional shape of the object located in the effective scanning region AR1 illustrated in FIG. 4.

The offline teaching device 5 acquires the position information of the welding line of the workpiece Wk, which is to be created by the scanning operation teaching program, information related to the production facility, and information on the effective scanning range AR0 of the sensor 4 (for example, three-dimensional information such as distance information between the sensor 4 and the effective scanning range AR0 and range information of the effective scanning range AR0). The offline teaching device 5 generates the effective scanning region AR1 for scanning the welding line, based on the acquired position information of the welding line and the effective scanning range AR0 of the sensor 4. Specifically, the offline teaching device 5 extends the effective scanning range AR0 in any position direction, partially includes position information of at least one welding line, and generates the effective scanning region AR1 which is readable by the sensor 4 and is scanned. In the example illustrated in FIG. 4, the effective scanning range AR0 indicates that a region from the effective scanning range AR0 to the effective scanning range AR01 extended by the scanning section SR1 in the $-X$ direction by the sensor 4 can be read.

A generation process of the effective scanning region AR1 may be executed based on an operator operation. The offline teaching device 5 may receive an editing operation such as copying, deletion, partial deletion, movement, and rotation to the generated effective scanning region AR1, or may receive an editing operation such as adjustment of a length of the scanning section SR1 of the effective scanning region AR1. An editing process of the effective scanning region AR1 will be described later.

The offline teaching device 5 may acquire, from each of the robot control device 2, the inspection control device 3, and the input device UI3, a welding operation of the workpiece Wk which is to be created by a new scanning operation teaching program, data of the 3D model, and the like.

Figure 5:
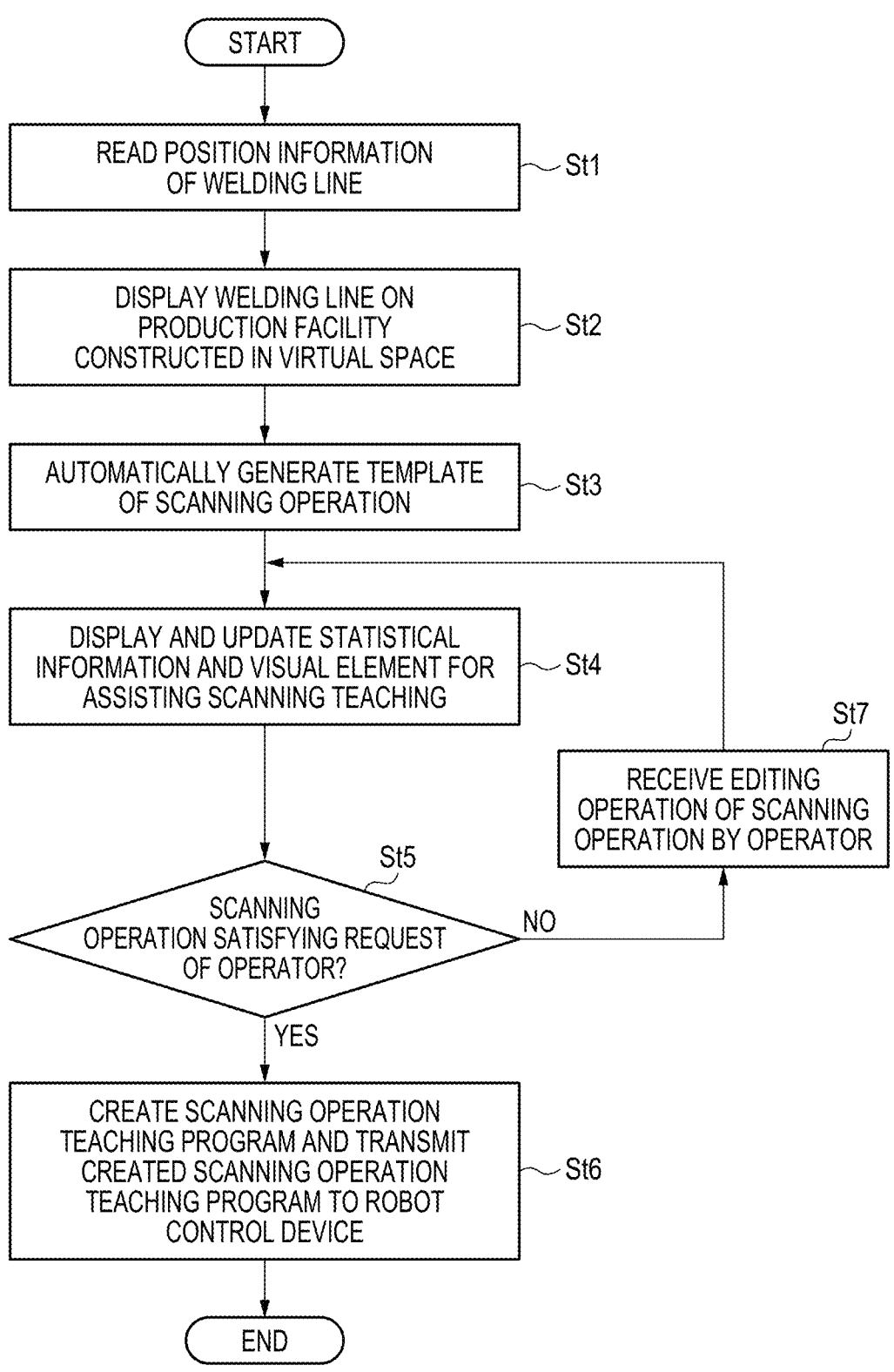
FIG. 5 is a flowchart illustrating an operation procedure example of the offline teaching device according to Embodiment 1.

Next, an operation procedure of the offline teaching device 5 according to Embodiment 1 will be described with reference to FIG. 5. FIG. 5 is a flowchart illustrating an operation procedure example of the offline teaching device 5 according to Embodiment 1.

The offline teaching device 5 acquires and reads the position information of the welding line of the workpiece Wk transmitted from an operator operation or the robot control device 2 (St1).

The offline teaching device 5 may acquire the position information of the welding line from the welding line data associated with the 3D model of the workpiece Wk transmitted from the terminal device P3 based on the 3D model. When the welding line data is not associated with the 3D model of the workpiece Wk transmitted from the terminal device P3, the offline teaching device 5 may acquire the position information of the welding line based on the three-dimensional shape of the 3D model. For example, the offline teaching device 5 may acquire, as the position information of the welding line, an intersection point at which surfaces of two or more original workpieces constituting the workpiece Wk intersect with each other or a contact point at which the surfaces of the two or more original workpieces come into contact with each other based on the surface shapes of the two or more original workpieces. The information acquired in step St1 may be information including the position information of the welding line, and may be information such as the welding operation setting information or the scanning operation setting information.

The offline teaching device 5 acquires information related to a production facility (for example, position information of the production facility, information of a coordinate system, and the like) transmitted from the operator operation or the robot control device 2, constructs, in a virtual space (a three-dimensional space), a production facility (for example, a welding robot, an inspection robot, a jig, the workpiece Wk, or a stage) that performs an appearance inspection of the workpiece Wk in the virtual space, and displays a welding line on the constructed production facility (St2).

Accordingly, the offline teaching device 5 allows the operator to visually confirm a positional relation between the production facility (for example, a welding robot, an inspection robot, a stage, or a jig) or the workpiece Wk and the welding line in two dimensions (plane) or three dimensions (three-dimensional).

The offline teaching device 5 automatically generates a template of a scanning operation (for example, a scanning section, an operation trajectory of the sensor 4 corresponding to the scanning section, and various operations (for example, idle running, approach, retraction, avoidance, and scan) at the time of scanning a weld bead) using the position information of the welding line, the welding operation teaching program, or the like (St3).

For example, the offline teaching device 5 creates a scanning section connecting a start point (an endpoint) and an end point (an endpoint) of a welding section based on the position information of one welding line. In addition, the offline teaching device 5 sets an angle of the sensor 4 that scans the created scanning section to the same angle as the welding torch 400 based on the welding operation teaching program, sets a weld bead formed corresponding to each welding line to a scannable angle based on a position of the production facility, a position and shape of the workpiece Wk, and the like, and sets information on a position, a distance, and an angle (a posture) of the sensor 4 for executing various operations (for example, approach, retraction, avoidance, and scan) at the time of scanning a weld bead based on information set in advance (for example, a minimum idle running distance). When two or more scanning sections are created, the offline teaching device 5 sets the operation trajectory of the welding torch 400 or a welding order of the welding lines to be the same as a scanning order and a scanning direction (an operation trajectory of the sensor 4) in which each of the scanning sections is scanned. It is needless to say that the setting example described above is merely an example, and is not limited thereto.

Based on the generated template of the scanning operation, the offline teaching device 5 visualizes an effective scanning region, a scanning region, and an auxiliary scanning region of the sensor 4, an overlapping region where the scanning regions overlap each other, which are taught by a scanning operation teaching program created using the template of the scanning operation, an operation trajectory of the sensor 4, and the like, and generates a teaching auxiliary screen in which statistical information and visual elements for assisting the scan teaching work using the offline teaching device 5 by the operator are updated (St4). The offline teaching device 5 outputs and displays the generated teaching auxiliary screen on the monitor MN3.

The visual element referred to herein is an image of a virtual production facility (for example, a welding robot, an inspection robot, a stage, or a jig), the workpiece Wk, a welding line, an effective scanning region, or the like, and is an image in which a positional relation between the production facility, the workpiece Wk, or the welding line and the effective scanning region is visualized in a virtual space (a three-dimensional space).

Figure 7:
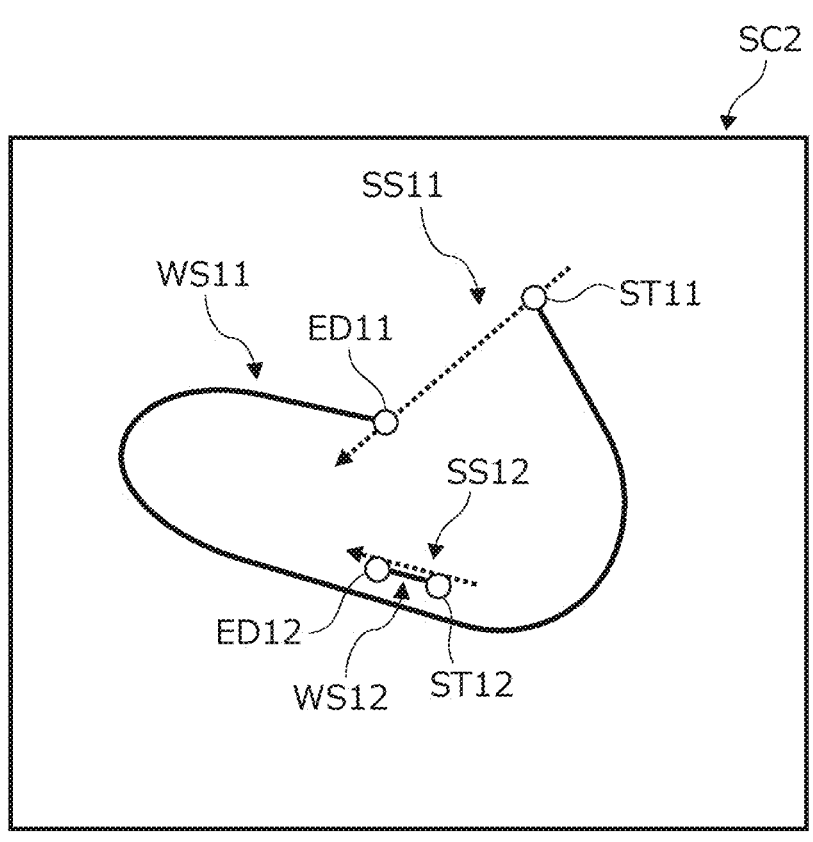
FIG. 7 is a diagram illustrating a display example of welding lines and scanning sections on a teaching auxiliary screen.

The offline teaching device 5 generates a teaching auxiliary screen in which a positional relation between the welding lines WS11 and WS12 and the scanning sections SS11 and SS12 illustrated in FIG. 7, a positional relation between the welding lines WS11 and WS12 and the effective scanning regions AR11 and AR12 indicated by arrows indicating scanning operation trajectories (scanning operation directions) and displayed in the plane illustrated in FIG.

8, a positional relation between the welding line WS12 and the effective scanning region AR12 stereoscopically illustrated, and the like are visualized in a virtual space (a three-dimensional space). Accordingly, when the scanning operation teaching program is created using the generated template of the scanning operation, the operator can confirm whether an appearance of a weld bead formed corresponding to a welding line in each effective scanning region can be inspected, whether there is a collision or interference between the production facility or the workpiece Wk and the sensor 4, and the like.

The statistical information referred to here is information related to various operations (for example, idle running, approach, retraction, avoidance, and scan) of the sensor 4 when the scanning operation is executed in accordance with the scanning operation teaching program, and is, for example, a scan time when all weld beads are scanned, or an idle running time of approach, retraction, avoidance, or the like. The idle running time referred to here is a time other than the time of execution of scanning, and may include a non-scan time such as a standby time.

The offline teaching device 5 generates teaching auxiliary screens SC3 and SC4 including statistical information STA1 (see FIG. 8) including, for example, a scan time "4.35 seconds" for scanning the scanning sections SS11 and SS12 illustrated in FIG. 7 and an idle running time "2.06 seconds" which is a movement time for moving in the idle running sections (not illustrated) of the scanning sections SS11 and SS12. Accordingly, when the scanning operation teaching program is created using the generated template of the scanning operation, the operator can use the statistical information as an index of productivity.

The offline teaching device 5 determines whether a current scanning operation (that is, the setting of a scanning section, an effective scanning region, and the like) visualized on the teaching auxiliary screen is a scanning operation satisfying a request of the operator (St5).

In the process of step St5, when the offline teaching device 5 acquires a control command indicating a selection (pressing) operation of a creation button of the scanning operation teaching program transmitted from the input device UI3, the offline teaching device 5 determines that the scanning operation is the scanning operation satisfying the request of the operator (St5, YES), and creates a scanning operation teaching program for causing the sensor 4 to scan the effective scanning region and the scanning region indicated by the teaching auxiliary screen currently displayed on the monitor MN3 (St6). The offline teaching device 5 transmits the created scanning operation teaching program and the workpiece ID in association with each other to the robot control device 2 (St6).

On the other hand, in the process of step St5, when the offline teaching device 5 acquires a control command indicating a selection (pressing) operation of an editing or correction button of the scanning operation teaching program transmitted from the input device UI3, the offline teaching device 5 determines that the scanning operation is not the scanning operation satisfying the request of the operator (St5, NO), and receives an operator operation related to the scanning operation (for example, an editing operation of the effective scanning region, and copying, deletion, partial deletion, movement, rotation, division, combination, and the like of the effective scanning region) (St7). A generation process of the scanning operation based on the operator operation performed here will be described later.

After the process of step St7, the offline teaching device 5 visualizes an effective scanning region, a scanning section, and the like scanned by the scanning operation teaching program created using a scanning operation edited by the operator operation based on the scanning operation, regenerates a teaching auxiliary screen in which the statistical information and the visual elements for assisting the scan teaching work using the offline teaching device 5 by the operator are updated, and displays the teaching auxiliary screen on the monitor MN3 (St4).

As described above, the offline teaching device 5 according to Embodiment 1 can more efficiently support the teaching of a scanning operation and the creation of a scanning operation teaching program by an operator by visualizing the scanning operation for a welding line in a virtual space (a three-dimensional space). Since the offline teaching device 5 visualizes the welding line and the effective scanning region, it is possible to confirm at a glance whether all welding lines are included in an effective scanning region. Since the offline teaching device 5 visualizes the workpiece Wk and the scanning operation in the production facility and the virtual space, it is possible to confirm at a glance whether interference or collision occurs between the production facility, the workpiece Wk, and the sensor 4 during the scanning operation.

Figure 6:
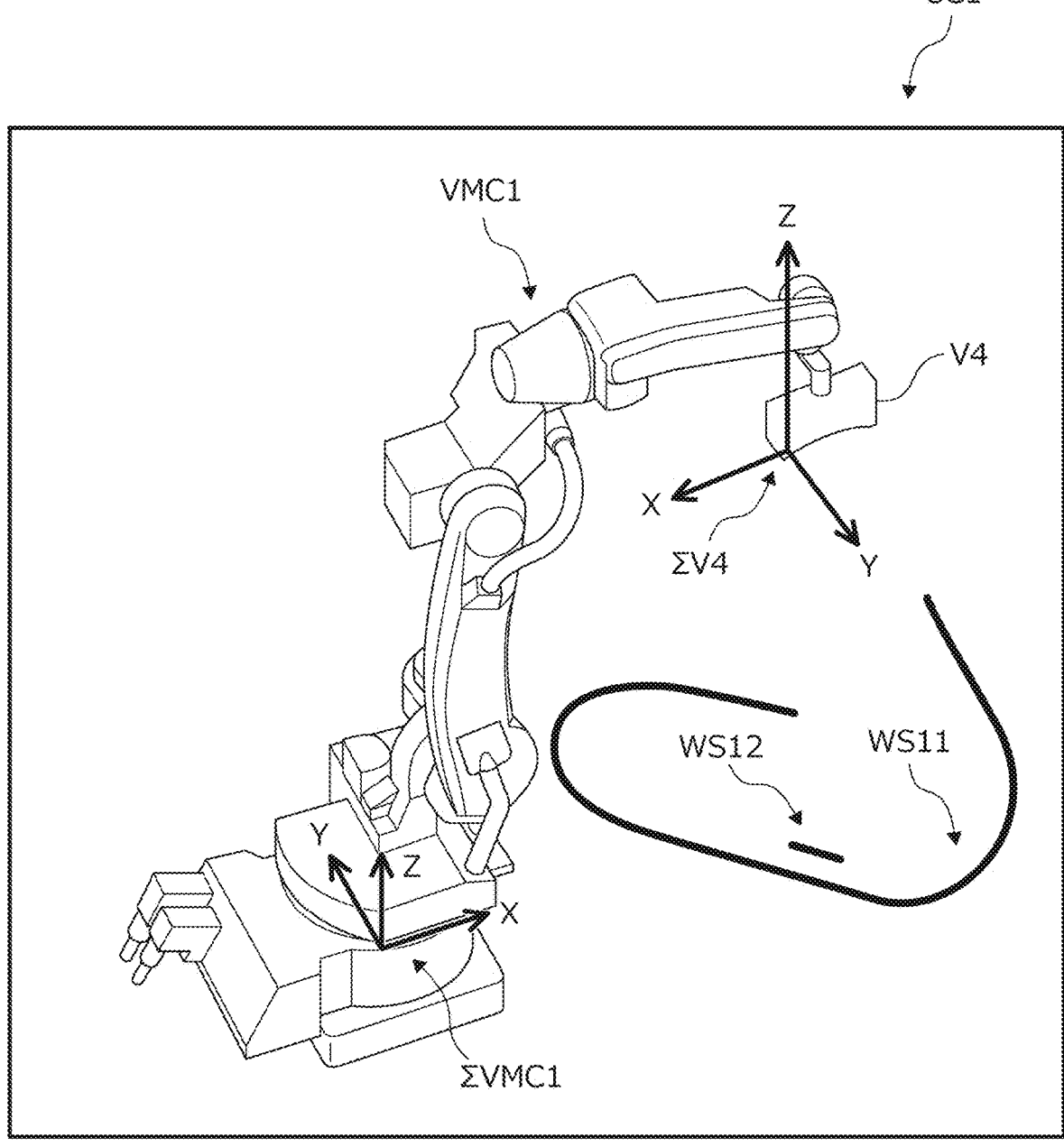
FIG. 6 is a diagram illustrating a display example of a production facility and welding lines on a teaching auxiliary screen.

Next, a teaching auxiliary screen SC1 generated in the process of step St2 will be described with reference to FIG. 6. FIG. 6 is a diagram illustrating a display example of a production facility and the welding lines WS11 and WS12 on the teaching auxiliary screen SC1. In the teaching auxiliary screen SC1 illustrated in FIG. 6, illustration of other production facilities such as the workpiece Wk, a jig, and a stage is omitted, and it is needless to say that the teaching auxiliary screen SC1 is not limited thereto.

The teaching auxiliary screen SC1 is a screen for visualizing a positional relation between the welding robot MC1 which is a production facility, the workpiece Wk which is an appearance inspection target, and the welding line in a virtual space (a three-dimensional space), and is generated by the 3D calculation unit 54 in the offline teaching device 5, and is output to and displayed on the monitor MN2. The teaching auxiliary screen SC1 illustrated in FIG. 6 constructs the virtual welding robot VMC1 which is a production facility corresponding to the welding robot MC1 in a virtual space, and displays each of two welding lines WS11 and WS12 welded by the virtual welding robot VMC1 (that is, the welding robot MC1) based on the position information of the welding line.

In the virtual welding robot VMC1, a virtual sensor V4 corresponding to the sensor 4 is constructed at a distal end of a robot arm. The virtual robot coordinate system EVMC1 is a coordinate system of the virtual welding robot VMC1 and is a coordinate system based on the welding robot MC1. The virtual sensor coordinate system EV4 is a coordinate system of the virtual sensor V4 and is a coordinate system based on the sensor 4.

Next, a teaching auxiliary screen SC2 generated in the process of step St3 will be described with reference to FIG. 7. FIG. 7 is a diagram illustrating a display example of the welding lines WS11 and WS12 and the scanning sections SS11 and SS12 on the teaching auxiliary screen SC2. In the teaching auxiliary screen SC2, in order to facilitate understanding of the description of the two welding lines WS11 and WS12 and the scanning sections SS11 and SS12 automatically generated corresponding to the two welding lines WS11 and WS12, respectively, only a main part is cut out, and illustration of the virtual welding robot VMC1 is omitted. It is needless to say that the teaching auxiliary screen SC2 illustrated in FIG. 7 is merely an example and is not limited thereto.

The welding line WS11 is a welding line for welding from a start point ST11 to an end point ED11. The welding line WS12 is a welding line for welding from a start point ST12 to an end point ED12.

The scanning section SS11 is a scanning section for scanning the welding line WS11, and is generated by the scanning operation creation unit 552 based on position information of the welding line WS11. The scanning section SS11 illustrated in FIG. 7 is a section including an endpoint (the start point ST11) of the welding line WS11 and an endpoint (the end point ED11) of the welding line WS11. An arrow indicated by the scanning section SS1 indicates an operation trajectory of the sensor 4, and indicates that the sensor 4 moves from the endpoint (the start point ST11) of the welding line WS11 to the endpoint (the end point ED11) of the welding line WS11 and scans a weld bead.

The scanning section SS12 is a scanning section for scanning the welding line WS12, and is generated by the scanning operation creation unit 552 based on position information of the welding line WS12. The scanning section SS12 illustrated in FIG. 7 is a section in which an endpoint (the start point ST12) of the welding line WS12 and an endpoint (the end point ED12) of the welding line WS12 are included in an effective scanning region, and is a section in which the sensor 4 moves from the endpoint (the start point ST12) of the welding line WS12 to the endpoint (the end point ED12) of the welding line WS12 and scans a weld bead.

Figure 8:
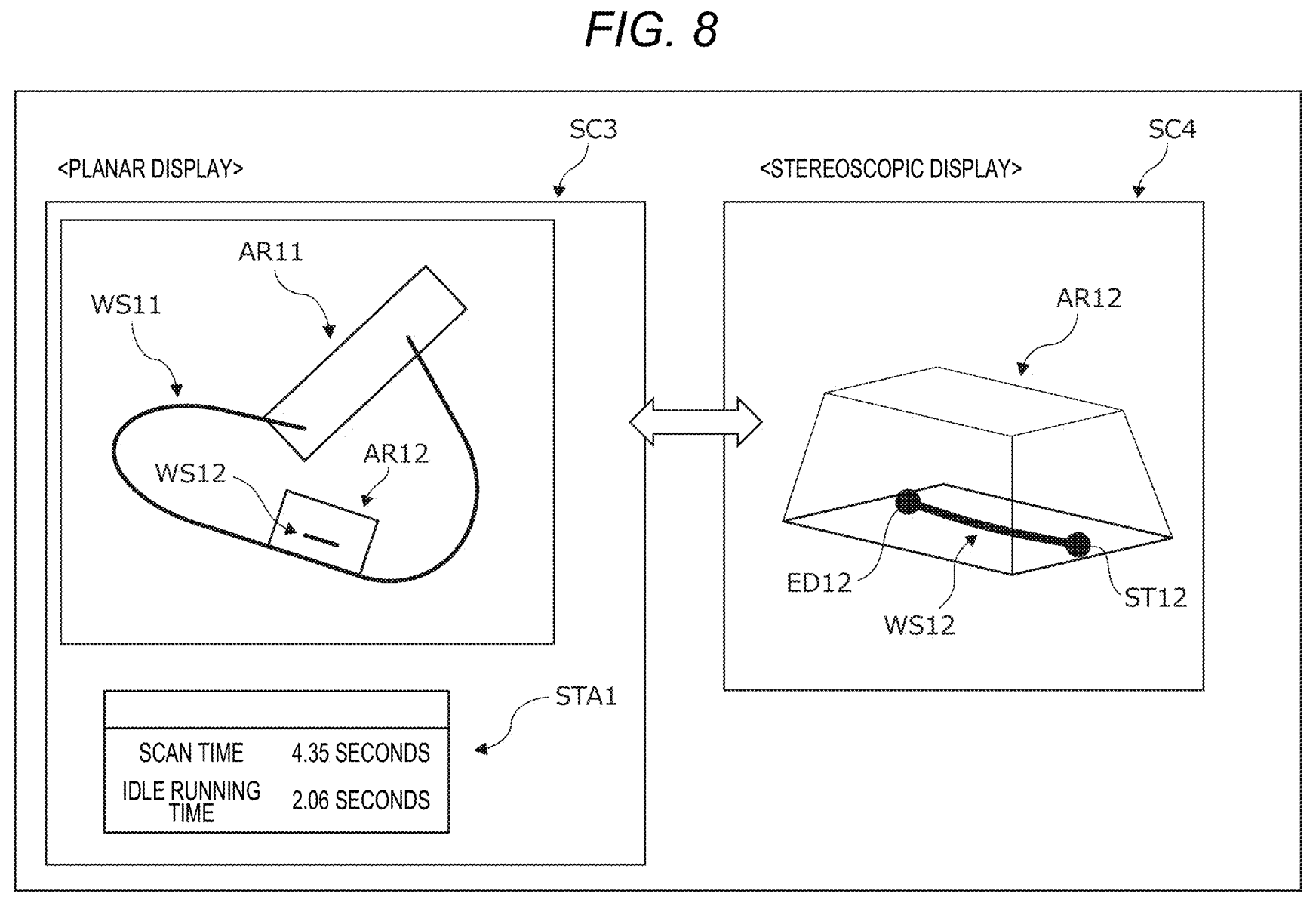

Next, the teaching auxiliary screen SC3 generated in the process of step St4 will be described with reference to FIG. 8. FIG. 8 is a diagram illustrating an example of the statistical information STA1 and effective scanning regions on the teaching auxiliary screens SC3 and SC4. In the teaching auxiliary screen described below, in order to make the description easy to understand, welding lines and effective scanning regions of the sensor 4 are illustrated, and illustration of a production facility and the like is omitted. It is needless to say that the teaching auxiliary screens SC3 and SC4 illustrated in FIG. 8 are merely examples, and are not limited thereto.

The offline teaching device 5 measures a scan time, an idle running time, and the like in each effective scanning region based on a template of a current scanning operation to generate the statistical information STA1. In addition, the offline teaching device 5 constructs a virtual space (a three-dimensional space) as a visual element including a virtual production facility, the workpiece Wk, a welding line, an effective scanning region, and the like based on the template of the current scanning operation. The offline teaching device 5 uses the statistical information STA1 and the virtual space (the three-dimensional space) to generate the teaching auxiliary screens SC3 and SC4 that stereoscopically display the production facility, the workpiece Wk, the welding line, and the effective scanning region.

The offline teaching device 5 is capable of receiving an operator operation via the input device UI3, and generates the teaching auxiliary screens SC3 and SC4 in which a virtual space (three-dimensional space) constructed by the production facility, the workpiece Wk, the welding line, the effective scanning region, and the like is rotated based on the operator operation. That is, the offline teaching device 5 rotates a virtual space based on the operator operation to generate the teaching auxiliary screen SC3 in which the welding line and the effective scanning region are twodimensionally visualized or the teaching auxiliary screen SC4 in which the welding line and the effective scanning region are three-dimensionally visualized, and thus a positional relation between the welding line and the effective scanning region can be visually confirmed from any angle. Accordingly, the operator can confirm a positional relation of the production facility, the workpiece Wk, the welding line, or the effective scanning region at a glance.

<Division Process of Effective Scanning Region>

Figure 9:
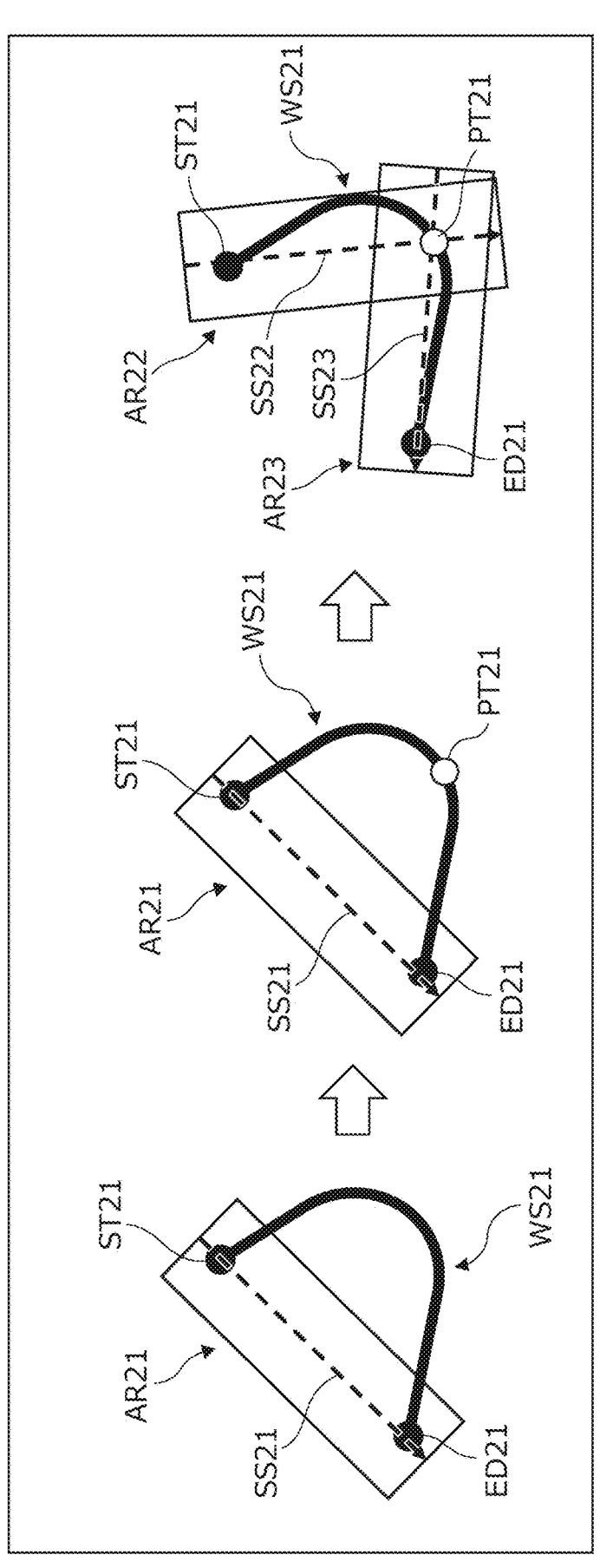
FIG. 9 is a diagram illustrating a division process example 1 of an effective scanning region.

Next, an example of a scanning operation editing process executed in the process of step St7 will be described with reference to FIG. 9. FIG. 9 is a diagram illustrating a division process example 1 of an effective scanning region.

For example, in the example illustrated in FIG. 9, a welding line WS21 indicates a welding section in which welding is executed from a start point ST21 to an end point ED21. For the welding line WS21, the offline teaching device 5 generates a scanning section SS21 passing through the start point ST21 and the end point ED21 of the welding line WS21, a scanning operation trajectory from the start point ST21 to the end point ED21 as a template of a scanning operation, and an effective scanning region AR21.

When the offline teaching device 5 receives a control command requesting editing of the template of the current scanning operation via the input device UI3, the offline teaching device 5 executes editing of the template of the scanning operation based on the operator operation.

When a division point PT21 for dividing the effective scanning region AR21 is input by an operator operation, the offline teaching device 5 generates each of two effective scanning regions AR22 and AR23 obtained by dividing the effective scanning region AR21 into two at the division point PT21. Specifically, the offline teaching device 5 generates the effective scanning region AR22 including the start point ST21 and the division point PT21 of the welding line WS21 and the effective scanning region AR23 including the end point ED21 and the division point PT21 of the welding line WS21. The offline teaching device 5 generates a scanning section SS22 corresponding to the effective scanning region AR22 and a scanning section SS23 corresponding to the effective scanning region AR23.

The offline teaching device 5 constructs, in a virtual space, the welding line WS21, the two effective scanning regions AR22 and AR23 generated by a division process, and the scanning sections SS22 and SS23 corresponding to the effective scanning regions AR22 and AR23, respectively, and generates and outputs a teaching auxiliary screen of the constructed 3D model.

As described above, the offline teaching device 5 can divide the scanning sections based on the operator operation. Accordingly, even when a scanning section (an effective scanning region) does not include the entire welding line (that is, the entire welding line cannot be scanned), the operator can create (teach) the scanning section including the entire welding line by performing an operation of specifying a division point. By receiving only a designation operation of a division point by the operator, the offline teaching device 5 can generate each of two scanning sections including a start point and an end point of a welding line without an operator operation of designating a start point or an end point of a scanning section.

Figure 10:
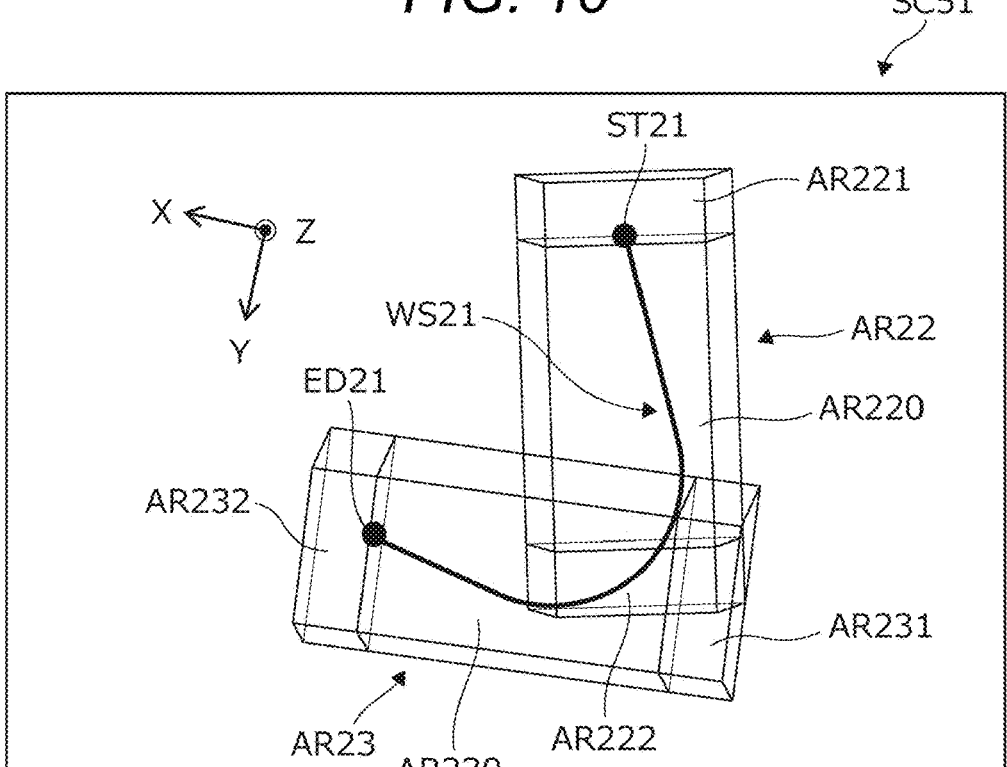
FIG. 10 is a diagram illustrating a stereoscopic display example of an effective scanning region.
Figure 11:
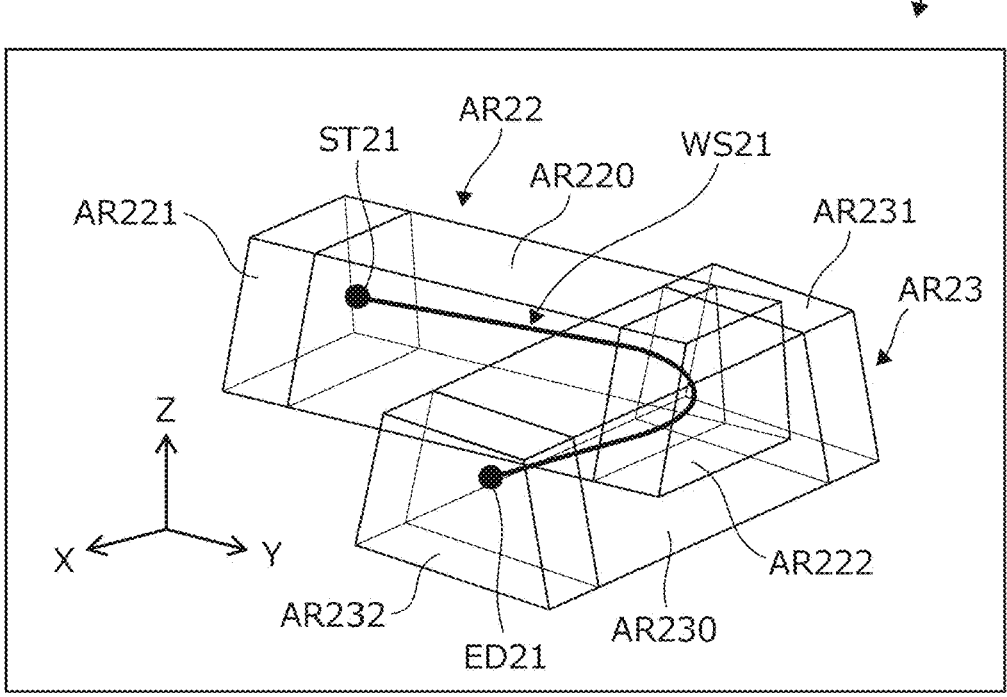
FIG. 11 is a diagram illustrating a stereoscopic display example of an effective scanning region.
Figures 12, 13:
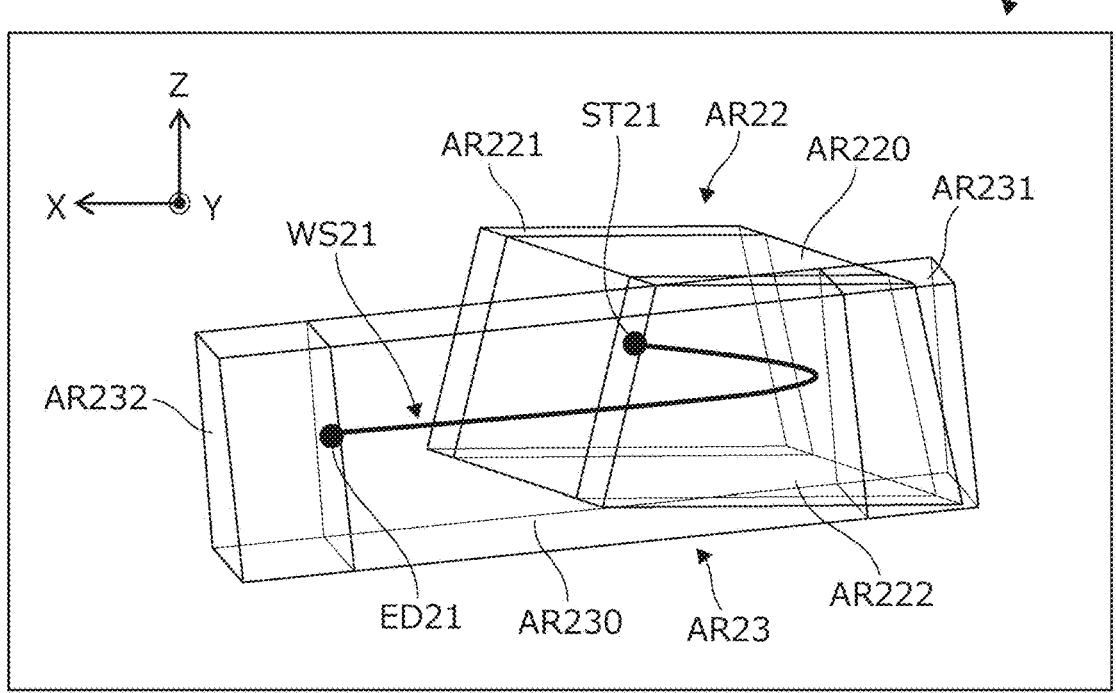
FIG. 12 is a diagram illustrating a stereoscopic display example of an effective scanning region.
FIG. 13 is a diagram illustrating a stereoscopic display example of an effective scanning region.

Next, display examples of the two scanning sections SS22 and SS23 on the teaching auxiliary screens will be described with reference to FIGS. 10 to 13. FIG. 10 is a diagram illustrating a stereoscopic display example of the effective scanning regions AR22 and AR23. FIG. 11 is a diagram illustrating a stereoscopic display example of the effective scanning regions AR22 and AR23. FIG. 12 is a diagram illustrating a stereoscopic display example of the effective scanning regions AR22 and AR23. FIG. 13 is a diagram illustrating a stereoscopic display example of the effective scanning regions AR22 and AR23.

Each of teaching auxiliary screens SC51, SC52, SC53, and SC54 is a screen in which a virtual space (a three-dimensional space) including the welding line WS21 and the effective scanning regions AR22 and AR23 corresponding to the two scanning sections SS22 and SS23 generated in the division process illustrated in FIG. 9, respectively, is viewed from a predetermined direction based on the operator operation.

The offline teaching device 5 rotates the constructed virtual space (the three-dimensional space) based on the operator operation. The offline teaching device 5 constructs a virtual space (a three-dimensional space) after rotation, reduction, and enlargement processes, and generates and outputs a teaching auxiliary screen in which the virtual space (the three-dimensional space) is viewed from a predetermined direction based on the operator operation.

The offline teaching device 5 may be able to distinguish an auxiliary scanning region, which is a scan allowance of an endpoint (a start point and an end point) of a welding line and is located before and after a scanning region in the generated effective scanning region, from a scanning region in which the sensor 4 performs scanning. For example, the effective scanning region AR21 in FIG. 9 is constructed and displayed such that a scanning region AR220 and two auxiliary scanning regions AR221 and AR222 corresponding to the scanning region AR220 illustrated in FIGS. 10 to 13 can be distinguished. For example, the offline teaching device 5 constructs the scanning region AR220 and the auxiliary scanning regions AR221 and AR222 as different parts, or constructs the scanning region AR220 and the auxiliary scanning regions AR221 and AR222 as parts of different colors such that the scanning region AR220 and the auxiliary scanning regions AR221 and AR222 can be displayed in an identifiable manner.

Similarly, the effective scanning region AR23 is constructed and displayed such that a scanning region AR230 and two auxiliary scanning regions AR231 and AR232 corresponding to the scanning region AR230 can be distinguished from each other.

Accordingly, the operator can more easily confirm whether the welding line is included in the scanning region or the auxiliary scanning region of the sensor 4.

Accordingly, the operator can confirm a positional relation between the welding line WS21 constructed in a virtual space and each of the effective scanning regions AR22 and AR23 from any angle based on the template of the scanning operation. Accordingly, the operator can easily confirm whether the effective scanning regions AR22 and AR23 corresponding to the two divided scanning sections SS22 and SS23 include the entire welding line WS21 (that is, whether the sensor 4 can scan a position of the welding line WS21).

Figure 14:
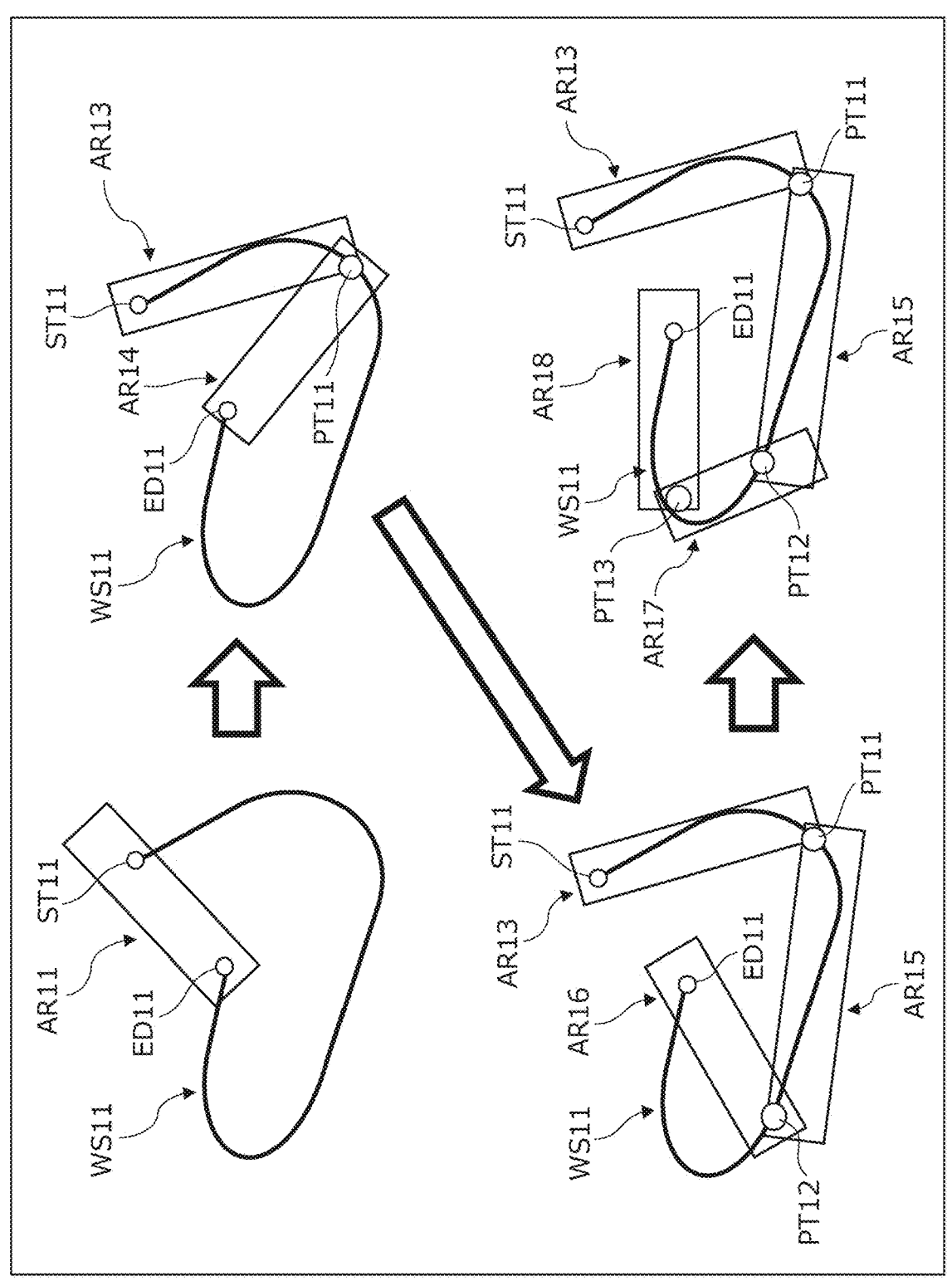
FIG. 14 is a diagram illustrating a division process example 2 of an effective scanning region.

Next, an example of the scanning operation editing process executed in the process of step St7 will be described with reference to FIG. 14. FIG. 14 is a diagram illustrating a division process example 2 of an effective scanning region.

For example, in the example illustrated in FIG. 14, the effective scanning region AR11 includes a start point ST11 and an end point ED11 of the welding line WS11. When the offline teaching device 5 receives a control command requesting editing of the template of the current scanning operation via the input device UI3, the offline teaching device 5 executes editing of the template of the scanning operation based on the operator operation.

When a division point PT11 for dividing the effective scanning region AR11 is input by an operator operation, the offline teaching device 5 generates each of two effective scanning regions AR13 and AR14 obtained by dividing the effective scanning region AR11 into two at the division point PT11. Specifically, the offline teaching device 5 generates the effective scanning region AR13 including the start point ST11 and the division point PT11 of the welding line WS11 and the effective scanning region AR14 including the end point ED11 and the division point PT11 of the welding line WS11.

The offline teaching device 5 constructs, in a virtual space, the welding line WS11 and the two effective scanning regions AR13 and AR14 generated by the division process, and generates and outputs a teaching auxiliary screen.

When the division point PT12 for further dividing the effective scanning region AR14 is input by an operator operation, the offline teaching device 5 generates each of two effective scanning regions AR15 and AR16 obtained by dividing the effective scanning region AR14 into two at the division point PT12. Specifically, the offline teaching device 5 generates the effective scanning region AR15 including the division point PT11 and the division point PT12 included in the effective scanning region AR14, and the effective scanning region AR16 including the division point PT12 and the end point ED11 of the welding line WS11.

The offline teaching device 5 constructs, in a virtual space, the welding line WS11 and three effective scanning regions AR13, AR15, and AR16 generated by the division process, and generates and outputs a teaching auxiliary screen.

When a division point PT13 for further dividing the effective scanning region AR16 is input by an operator operation, the offline teaching device 5 generates two effective scanning regions AR17 and AR18 obtained by dividing the effective scanning region AR16 into two at the division point PT13. Specifically, the offline teaching device 5 generates the effective scanning region AR17 including the division point PT12 and the division point PT13 included in the effective scanning region AR16, and the effective scanning region AR18 including the division point PT13 and the end point ED11 of the welding line WS11.

The offline teaching device 5 constructs, in a virtual space, the welding line WS11 and three effective scanning regions AR13, AR15, AR17, and AR18 generated by the division process, and generates and outputs a teaching auxiliary screen.

As described above, the offline teaching device 5 can generate a scanning operation including the entire welding line by dividing an effective scanning region a plurality of times based on an operator operation. In addition, the operator can more easily confirm whether the entire welding line is included in each of a plurality of effective scanning regions (that is, whether the entire welding line can be scanned) based on the teaching auxiliary screen. Further, the offline teaching device 5 can generate each of the plurality of effective scanning regions by receiving only a designation operation of a division point by the operator.

Figure 15:
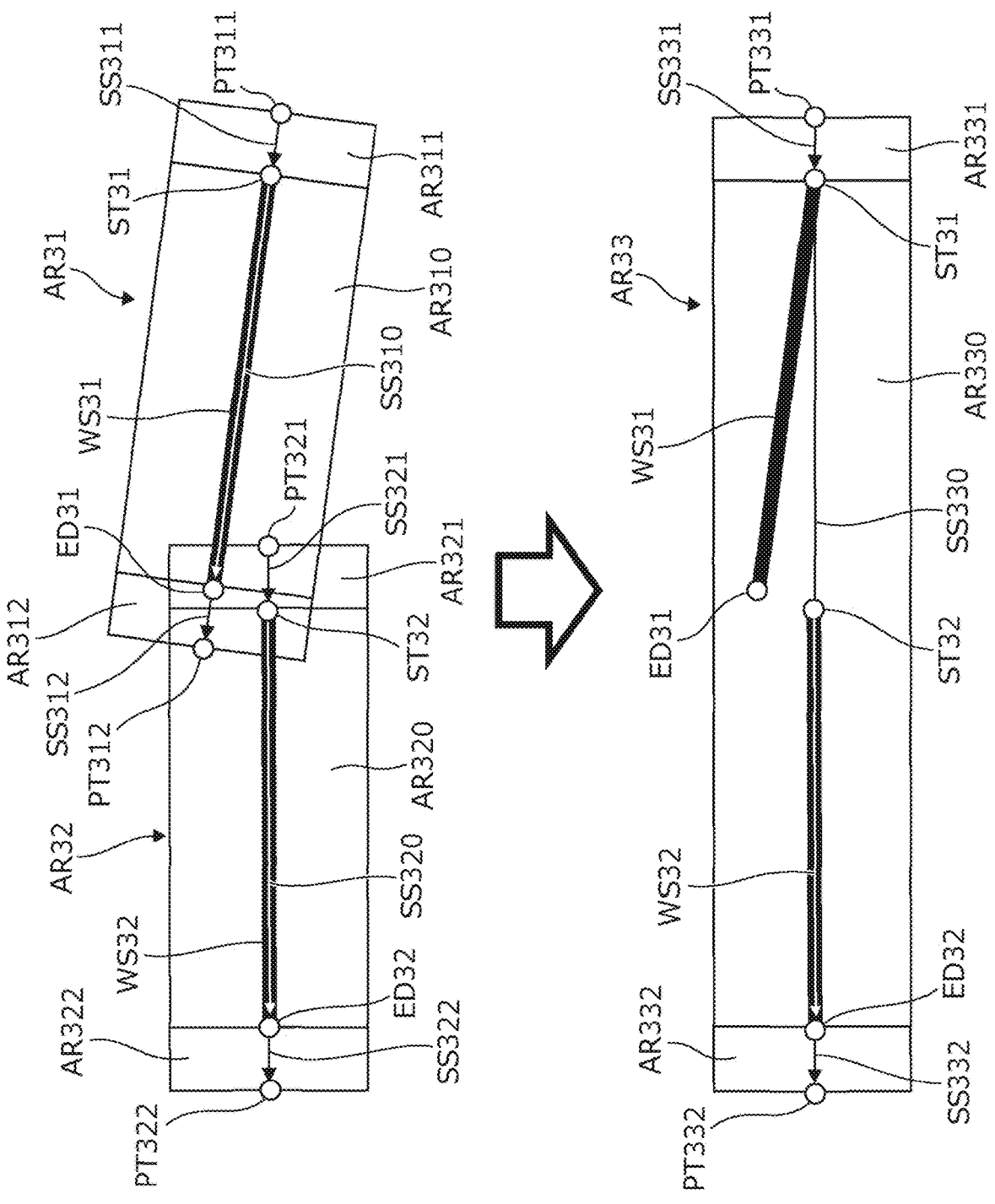
FIG. 15 is a diagram illustrating a combination process example 1 of effective scanning regions.

Next, an example of the scanning operation editing process executed in the process of step St7 will be described with reference to FIG. 15. FIG. 15 is a diagram illustrating a combination process example 1 of effective scanning regions. The combination process of the effective scanning regions described below is merely an example and is not limited thereto.

For example, in the example illustrated in FIG. 15, a welding line WS31 indicates a welding section in which welding is executed from a start point ST31 to an end point ED31. A welding line WS32 indicates a welding section in which welding is executed from a start point ST32 to an end point ED32.

The offline teaching device 5 generates an effective scanning region AR31 including the start point ST31 and the end point ED31 of the welding line WS31 and an effective scanning region AR32 including the start point ST32 and the end point ED32 of the welding line WS32 for the two welding lines WS31 and WS32.

The effective scanning region AR31 includes a scanning region AR310 corresponding to a scanning section SS310 connecting the start point ST31 and the end point ED31 of the welding line WS31, an auxiliary scanning region AR311 corresponding to an auxiliary scanning section SS311, and an auxiliary scanning region AR312 corresponding to an auxiliary scanning section SS312.

The auxiliary scanning section SS311 is an auxiliary scanning section before a scanning operation executed in the scanning section SS310, and is a section from an auxiliary scan start position PT311 to the start point ST31 of the welding line WS31. The auxiliary scanning section SS312 is an auxiliary scanning section after the scanning operation executed in the scanning section SS310, and is a section from the end point ED31 of the welding line WS31 to an auxiliary scan start position PT312.

The effective scanning region AR32 includes a scanning region AR320 corresponding to a scanning section SS320 connecting the start point ST32 and the end point ED32 of the welding line WS32, an auxiliary scanning region AR321 corresponding to an auxiliary scanning section SS321, and an auxiliary scanning region AR322 corresponding to an auxiliary scanning section SS322.

The auxiliary scanning section SS321 is an auxiliary scanning section before a scanning operation executed in the scanning section SS320, and is a section from an auxiliary scan start position PT321 to the start point ST32 of the welding line WS32. The auxiliary scanning section SS322 is an auxiliary scanning section after the scanning operation executed in the scanning section SS320, and is a section from the end point ED32 of the welding line WS32 to an auxiliary scan start position PT322.

When it is determined that each of the two welding lines WS31 and WS32 can be scanned in one effective scanning region, the offline teaching device 5 according to Embodiment 1 automatically generates an effective scanning region AR33 obtained by combining the two effective scanning regions AR31 and AR32, and generates a template of a scanning operation.

The effective scanning region AR33 includes a scanning region AR330 corresponding to a scanning section SS330 connecting the start point ST31 of the welding line WS31 and the end point ED32 of the welding line WS32, an auxiliary scanning region AR331 corresponding to an auxiliary scanning section SS331, and an auxiliary scanning region AR332 corresponding to an auxiliary scanning section SS332.

The auxiliary scanning section SS331 is an auxiliary scanning section before a scanning operation executed in the scanning section SS330, and is a section from an auxiliary scan start position PT331 to the start point ST31 of the welding line WS31. The auxiliary scanning section SS332 is an auxiliary scanning section after the scanning operation executed in the scanning section SS330, and is a section from the end point ED32 of the welding line WS32 to an auxiliary scan start position PT332.

The offline teaching device 5 constructs each of the welding lines WS31 and WS32, the combined scanning region AR330, and each of the auxiliary scanning regions AR331 and AR332 in a virtual space, and generates and outputs a teaching auxiliary screen of the constructed 3D model.

As described above, the offline teaching device 5 can generate an effective scanning region in which the time required for the scanning operation can be further shortened.

Figure 16:
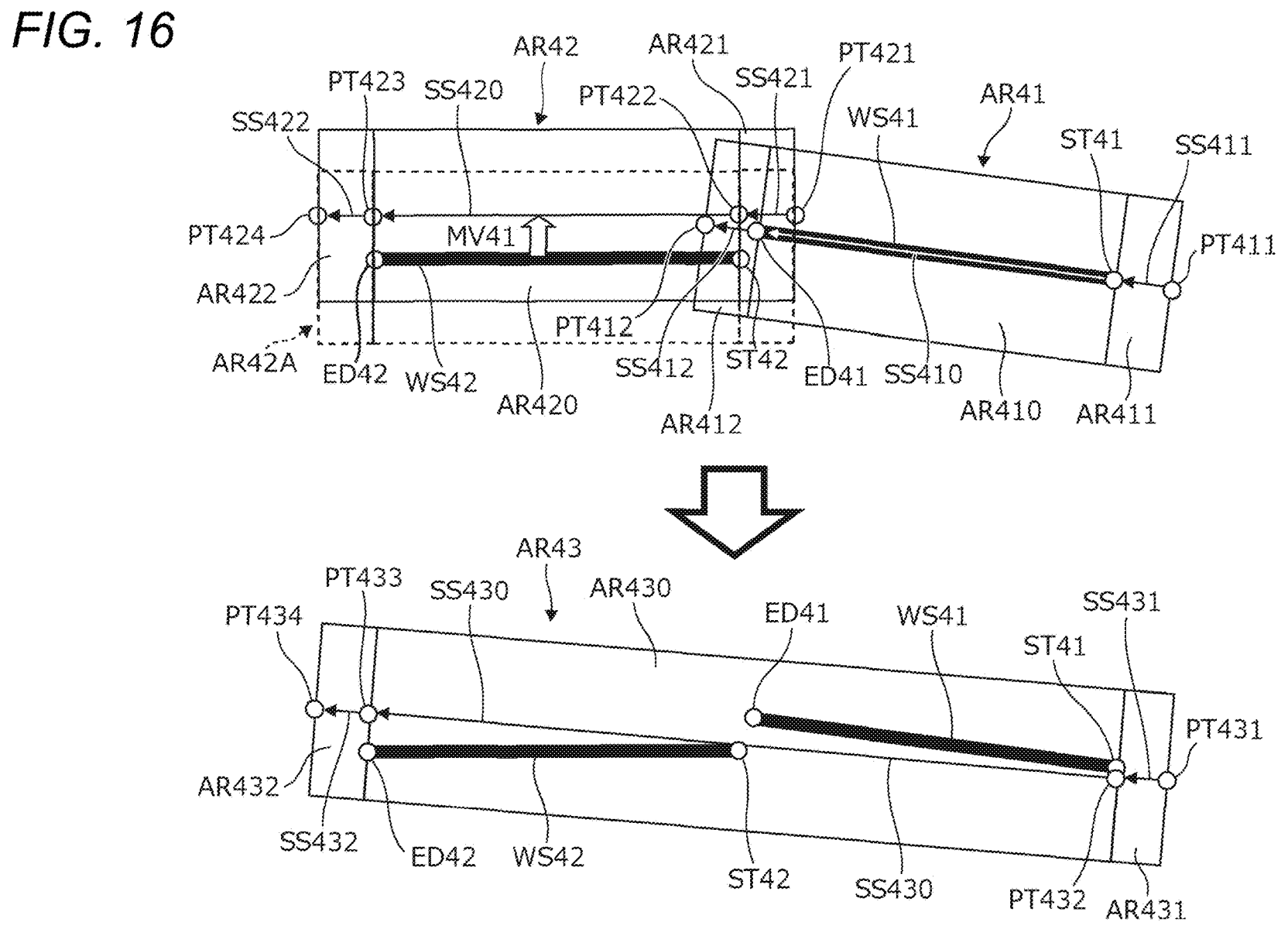

Next, an example of the scanning operation editing process executed in the process of step St7 will be described with reference to FIG. 16. FIG. 16 is a diagram illustrating a combination process example 2 of effective scanning regions. The combination process of the effective scanning regions described below is merely an example and is not limited thereto.

For example, in the example illustrated in FIG. 16, a welding line WS41 indicates a welding section in which welding is executed from a start point ST41 to an end point ED41. A welding line WS42 indicates a welding section in which welding is executed from a start point ST42 to an end point ED42.

The offline teaching device 5 generates an effective scanning region AR41 including the start point ST41 and the end point ED41 of the welding line WS41 for the two welding lines WS41 and WS42. After generating an effective scanning region AR42A including the start point ST42 and the end point ED42 of the welding line WS42, the offline teaching device 5 generates an effective scanning region AR42 obtained by moving an effective scanning region (not illustrated) including the start point ST42 and the end point ED42 of the welding line WS42 in a predetermined direction MV41.

The effective scanning region AR41 includes a scanning section SS410 connecting the start point ST41 and the end point ED41 of the welding line WS41. The effective scanning region AR41 includes a scanning region AR410 corresponding to the scanning section SS410, an auxiliary scanning region AR411 corresponding to an auxiliary scanning section SS411, and an auxiliary scanning region AR412 corresponding to an auxiliary scanning section SS412.

The auxiliary scanning section SS411 is an auxiliary scanning section before a scanning operation executed in the scanning section SS410, and is a section from an auxiliary scan start position PT411 of the scanning section SS410 to the start point ST41 of the welding line WS41. The auxiliary scanning section SS412 is an auxiliary scanning section after the scanning operation executed in the scanning section SS410, and is a section from the end point ED41 of the welding line WS41 to an auxiliary scan end position PT412 of the scanning section SS410.

The effective scanning region AR42A includes the welding line WS42 and includes a scanning section connecting the start point ST42 and the end point ED42 of the welding line WS42. The effective scanning region AR42A includes a scanning region corresponding to a scanning section and auxiliary scanning regions corresponding to two auxiliary scanning sections.

Here, one auxiliary scanning section is an auxiliary scanning section before a scanning operation executed in a scanning section, and is generated in a section including from an auxiliary scan start position of a scanning section SS420 to the start point ST42 of the welding line WS42. The other auxiliary scanning section is an auxiliary scanning section after a scanning operation executed in a scanning section, and is generated in a section including from the end point ED42 of the welding line WS42 to an idle running end position.

The offline teaching device 5 generates the effective scanning region AR42 obtained by translating the effective scanning region AR42A in the predetermined direction MV41. The effective scanning region AR42 includes the scanning section SS420 obtained by moving a scanning section (not illustrated) of the effective scanning region AR42A connecting the start point ST42 and the end point ED42 of the welding line WS42 in the predetermined direction MV41. The effective scanning region AR42 further includes a scanning region AR420 corresponding to the scanning section SS420, an auxiliary scanning region AR421 corresponding to an auxiliary scanning section SS421, and an auxiliary scanning region AR422 corresponding to an auxiliary scanning section SS422.

The auxiliary scanning section SS421 is an auxiliary scanning section before a scanning operation executed in the scanning section SS420, and is a section from an auxiliary scan start position PT421 to an auxiliary scan end position PT422 of the scanning section SS420. Here, the auxiliary scan end position PT422 is a position moved in the predetermined direction MV41 from a position of the start point ST42 of the welding line WS42.

Similarly, the auxiliary scanning section SS422 is an auxiliary scanning section after the scanning operation executed in the scanning section SS420, and is a section from an auxiliary scan start position PT423 to an auxiliary scan end position PT424. Here, the auxiliary scan start position PT423 is a position moved in the predetermined direction MV41 from a position of the end point ED42 of the welding line WS42.

When it is determined that each of the two welding lines WS41 and WS42 can be scanned in one effective scanning region, the offline teaching device 5 according to Embodiment 1 automatically generates an effective scanning region AR43 obtained by combining the two effective scanning regions AR41 and AR42, and generates a template of a scanning operation. Specifically, the offline teaching device 5 generates a scanning section SS430 connecting the start point ST41 of the welding line WS41 corresponding to a start point of the scanning section SS410 and the auxiliary scan start position PT423 corresponding to an end point of the scanning section SS420. The offline teaching device 5 determines a direction from the start point ST41 toward the auxiliary scan start position PT423 as an operation trajectory of the sensor 4 in the effective scanning region AR43, and generates the effective scanning region AR43 in which each of the welding lines WS41 and WS42 can be scanned.

The effective scanning region AR43 includes a scanning region AR430 corresponding to the scanning section SS430 from an auxiliary scan end position PT432 to an auxiliary scan start position PT433, an auxiliary scanning region AR431 corresponding to an auxiliary scanning section SS431, and an auxiliary scanning region AR432 corresponding to an auxiliary scanning section SS432.

The auxiliary scanning section SS431 is an auxiliary scanning section before a scanning operation executed in the scanning section SS430, and is a section from an auxiliary scan start position PT431 to the auxiliary scan end position PT432. The auxiliary scanning section SS432 is an auxiliary scanning section after the scanning operation executed in the scanning section SS430, and is a section from the auxiliary scan start position PT433 to an auxiliary scan start position PT434.

The offline teaching device 5 constructs each of the welding lines WS41 and WS42, the combined scanning region AR430, and each of the auxiliary scanning regions AR431 and AR432 in a virtual space, and generates and outputs a teaching auxiliary screen.

As described above, the offline teaching device 5 can generate an effective scanning region in which the time required for the scanning operation can be further shortened.

<Deletion Process of Effective Scanning Region>

Figure 17:
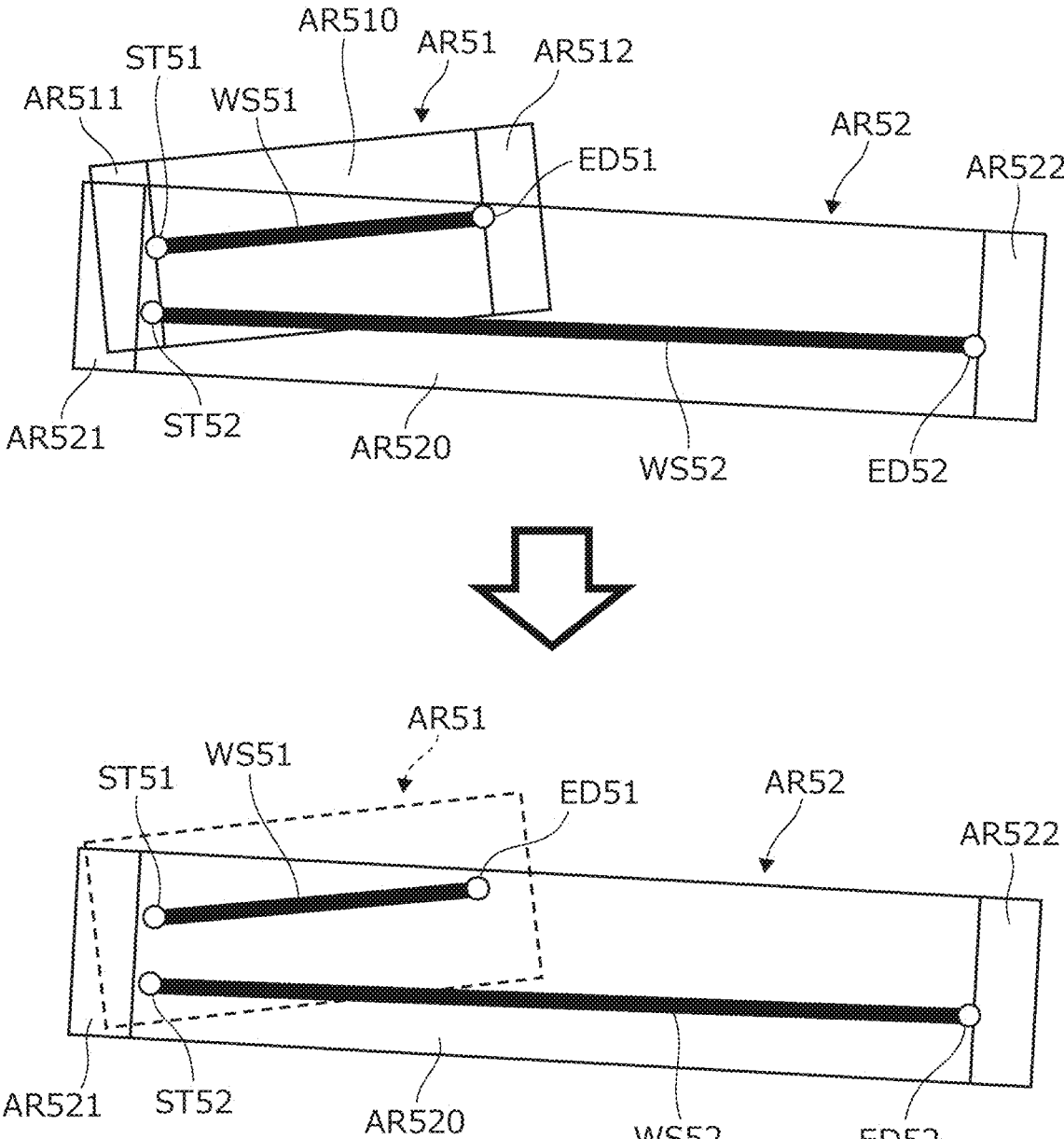
FIG. 17 is a diagram illustrating a deletion process example of an effective scanning region.

Next, an example of the scanning operation editing process executed in the process of step St7 will be described with reference to FIG. 17. FIG. 17 is a diagram illustrating a deletion process example of effective scanning regions. A deletion process of the effective scanning regions described below is merely an example and is not limited thereto. In addition, in the following description, in order to facilitate understanding of the description of an editing process of an effective scanning region, illustration of a scanning section and an operation trajectory of the sensor 4 is omitted.

For example, in the example illustrated in FIG. 17, a welding line WS51 indicates a welding section in which welding is executed from a start point ST51 to an end point ED51. A welding line WS52 indicates a welding section in which welding is executed from a start point ST52 to an end point ED52.

The offline teaching device 5 generates an effective scanning region AR51 including the start point ST51 and the end point ED51 of the welding line WS51 and an effective scanning region AR52 including the start point ST52 and the end point ED52 of the welding line WS52 for the two welding lines WS51 and WS52.

The effective scanning region AR51 includes a scanning region AR510 for scanning the welding line WS51, an auxiliary scanning region AR511, and an auxiliary scanning region AR512. The effective scanning region AR52 includes a scanning region AR520 for scanning the welding line WS52, an auxiliary scanning region AR521, and an auxiliary scanning region AR522.

When it is determined that each of the two welding lines WS51 and WS52 can be scanned in one effective scanning region AR52, the offline teaching device 5 according to Embodiment 1 deletes the effective scanning region AR51, automatically generates the effective scanning region AR52 for scanning each of the two welding lines WS51 and WS52, and generates a template of a scanning operation.

The offline teaching device 5 constructs each of the welding lines WS51 and WS52, the combined scanning region AR520, and each of the auxiliary scanning regions AR521 and AR522 in a virtual space, and generates and outputs a teaching auxiliary screen.

As described above, the offline teaching device 5 can generate an effective scanning region in which the time required for the scanning operation can be further shortened.

<Partial Deletion Process of Effective Scanning Region>

Figure 18:
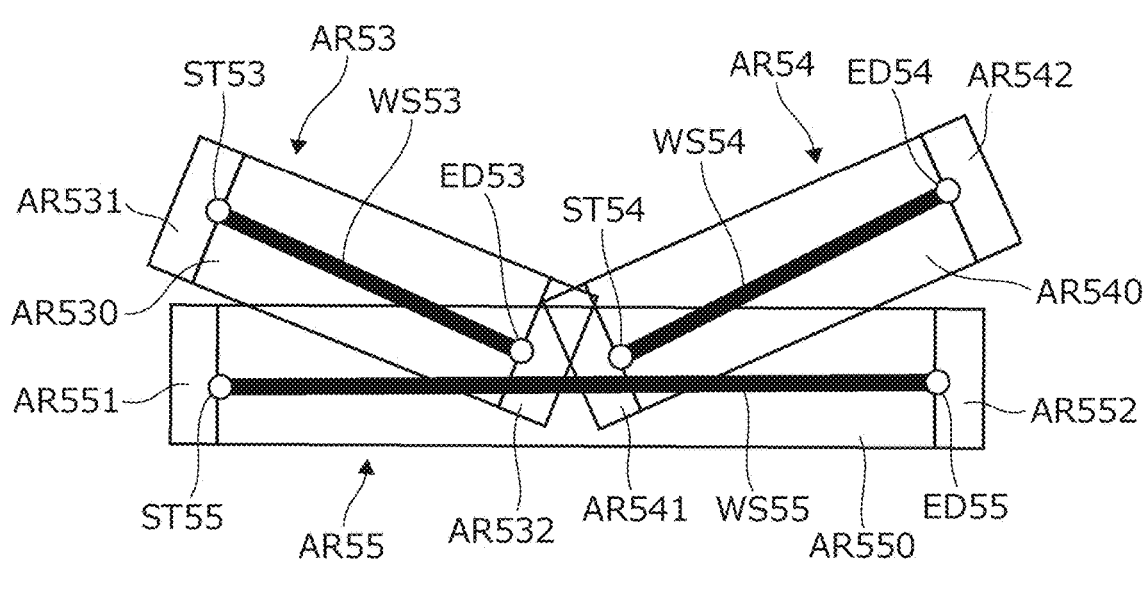
FIG. 18 is a diagram illustrating a partial deletion process example of an effective scanning region.
Figure 18:
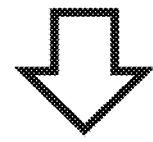
Figure 18:
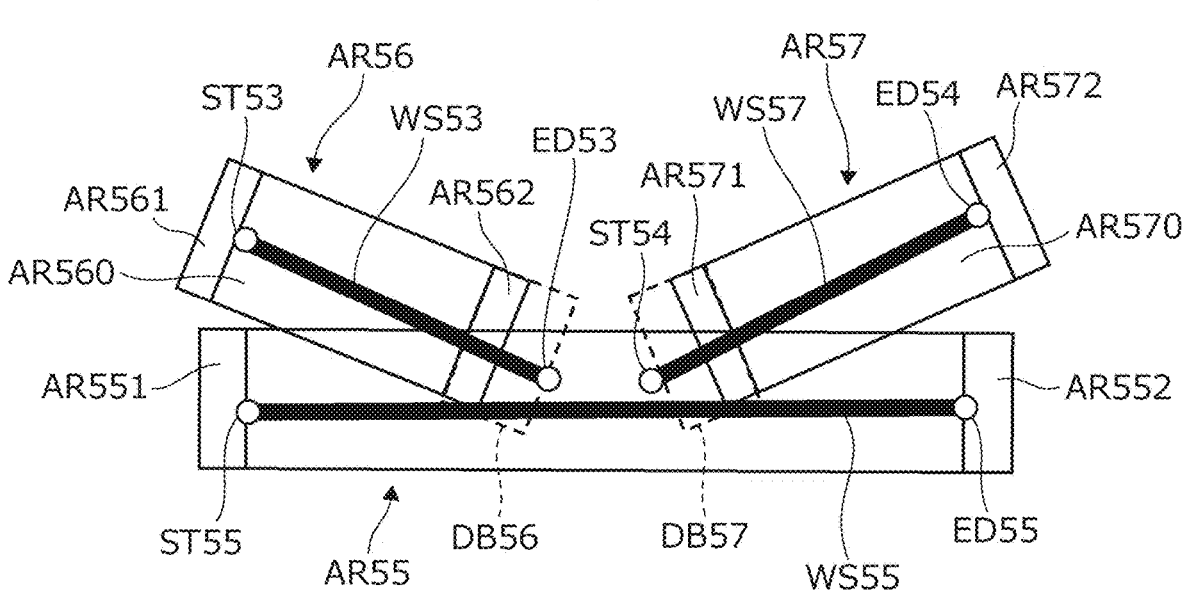

Next, an example of the scanning operation editing process executed in the process of step St7 will be described with reference to FIG. 18. FIG. 18 is a diagram illustrating a partial deletion process example of effective scanning regions. The partial deletion process of the effective scanning regions described below is merely an example and is not limited thereto.

For example, in the example illustrated in FIG. 18, a welding line WS53 indicates a welding section in which welding is executed from a start point ST53 to an end point ED53. A welding line WS54 indicates a welding section in which welding is executed from a start point ST54 to an end point ED54. A welding line WS55 indicates a welding section in which welding is executed from a start point ST55 to an end point ED55.

The offline teaching device 5 generates, for each of the three welding lines WS53, WS54, and WS55, an effective scanning region AR53 including the start point ST53 and the end point ED53 of the welding line WS53, an effective scanning region AR54 including the start point ST54 and the end point ED54 of the welding line WS54, and an effective scanning region AR55 including the start point ST55 and the end point ED55 of the welding line WS55.

The effective scanning region AR53 includes a scanning region AR530 for scanning the welding line WS53, and auxiliary scanning regions AR531 and AR532. The effective scanning region AR54 includes a scanning region AR540 for scanning the welding line WS54, and auxiliary scanning regions AR541 and AR542. The effective scanning region AR55 includes a scanning region AR550 for scanning the welding line WS55, and auxiliary scanning regions AR551 and AR552.

The offline teaching device 5 according to Embodiment 1 detects overlapping regions DB56 and DB57 in which the two effective scanning regions AR53 and AR54 overlap the effective scanning region AR55, respectively. The offline teaching device 5 generates a teaching auxiliary screen in which each of the detected overlapping regions DB56 and DB57 is highlighted, and outputs the teaching auxiliary screen to the monitor MN3. The highlighted here is a process of displaying an overlapping region in a different color or displaying the overlapping region by surrounding the overlapping region with a frame line, a broken line, or the like.

When an operator operation of deleting an overlapping region from the input device UI3 is received, the offline teaching device 5 generates an effective scanning region AR56 obtained by deleting the overlapping region DB56 from the effective scanning region AR53 and an effective scanning region AR57 obtained by deleting the overlapping region DB57 from the effective scanning region AR4.

The effective scanning region AR56 includes a scanning region AR560 and auxiliary scanning regions AR561 and AR562. The effective scanning region AR57 includes a scanning region AR570 and auxiliary scanning regions AR571 and AR572.

The offline teaching device 5 determines whether all of the three welding lines WS53, WS54, and WS55 can be scanned based on the effective scanning region AR56 and the effective scanning region AR57.

When it is determined that all of the three welding lines WS53, WS54, and WS55 can be scanned based on the effective scanning region AR55, the effective scanning region AR56, and the effective scanning region AR57, the offline teaching device 5 generates the effective scanning region AR56 obtained by partially deleting the overlapping region DB56 from the effective scanning region AR53 and the effective scanning region AR57 obtained by partially deleting, from the effective scanning region AR54, the overlapping region DB57 which is an overlapping effective scanning region. The offline teaching device 5 automatically generates the effective scanning regions AR55, AR56, and AR57 for scanning the three welding lines WS53, WS54, and WS55, respectively, and generates a template of a scanning operation.

The offline teaching device 5 constructs, in a virtual space, each of the welding lines WS53 to WS55, each of the three scanning regions AR550, AR560, and AR570 after the partial deletion process, and each of the auxiliary scanning regions AR551, AR552, AR561, AR562, AR571, and AR572 corresponding to each scanning region, and generates and outputs a teaching auxiliary screen.

As described above, the program creation unit 55 in the offline teaching device 5 can visualize and present an overlapping region of the scanning regions or the effective scanning regions to the operator. Accordingly, the operator can consider whether to reduce a time required for a scanning operation, a scan time, a non-scan time, or the like by deleting the overlapping region. Although not illustrated in FIG. 18, the offline teaching device 5 may generate and display statistical information (for example, the scan time, and the non-scan time) in a case where the overlapping region is deleted and statistical information in a case where the overlapping region is not deleted, thereby supporting the operator in determining whether to delete the overlapping region.

Although an example in which the overlapping region is deleted by an operator operation has been described, the offline teaching device 5 illustrated in FIG. 18 may automatically delete the overlapping region only when a total time of the scan time or the non-scan time which can be further reduced due to the deletion of the overlapping region is equal to or longer than a predetermined time (for example, 10 seconds or 20 seconds) by using the statistical information (for example, the scan time, or the non-scan time) in the case where the overlapping region is deleted and the statistical information in the case where the overlapping region is not deleted. Accordingly, when the scan time can be shortened for a predetermined time or more, the offline teaching device 5 can generate a scanning operation in which a scanning operation is more efficient without an operator operation.

<Editing Omission Process of Effective Scanning Region>

Figure 19:
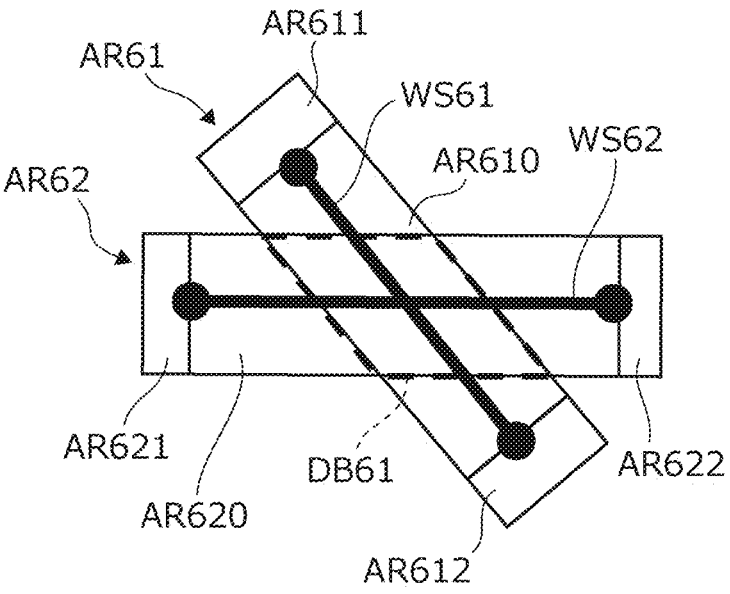
FIG. 19 is a diagram illustrating an example of omission of a division process and a deletion process of an effective scanning region.

Next, an example of the scanning operation editing process executed in the process of step St7 will be described with reference to FIG. 19. FIG. 19 is a diagram illustrating an example of omission of a division process and a partial deletion process of an effective scanning region. In the example described below, an example in which the division process and the partial deletion process of the effective region are omitted has been described, but the editing process to be omitted is not limited thereto, and another process may be omitted.

For example, in the example illustrated in FIG. 19, the effective scanning region AR61 includes a scanning region AR610 in which the welding line WS61 is scanned, and auxiliary scanning regions AR611 and AR612. The effective scanning region AR62 includes a scanning region AR620 for scanning the welding line WS62, and auxiliary scanning regions AR621 and AR622.

In such a case, the offline teaching device 5 detects the overlapping region DB61 in which the effective scanning region AR61 and the effective scanning region AR62 overlap each other. The offline teaching device 5 calculates and compares a total time required for a scanning operation in a case where the two welding lines WS61 and WS62 are scanned in the respective effective scanning regions AR61 and AR62 and a total time required for a scanning operation in a case where the two welding lines WS61 and WS62 are scanned in the respective effective scanning regions obtained by dividing the scanning region AR610 or the scanning region AR620 in the overlapping region DB61.

When it is determined that a total time required for a scanning operation in a case where the scanning region AR610 or the scanning region AR620 is divided in the overlapping region DB61 is longer than a total time required for a scanning operation in a case where the overlapping region DB61 is not divided, the offline teaching device 5 omits a division process of the overlapping region DB61.

In such a case, the offline teaching device 5 detects the overlapping region DB61 between the effective scanning region AR61 and the effective scanning region AR62. The offline teaching device 5 calculates and compares a total time required for a scanning operation in a case where the two welding lines WS61 and WS62 are scanned in the respective effective scanning regions AR61 and AR62 and a total time required for a scanning operation in a case where the two welding lines WS61 and WS62 are scanned in the respective effective scanning regions from which the overlapping region DB61 is partially deleted.

When it is determined that a total time required for a scanning operation in a case where the overlapping region DB61 is deleted is longer than a total time required for a scanning operation in a case where the overlapping region DB61 is not deleted, the offline teaching device 5 omits a deletion process of the overlapping region DB61.

As described above, when it is determined that various operations (for example, an approach operation, a retraction operation, and an avoidance operation) in a scanning operation of each new effective scanning region generated by executing the division process or the partial deletion process of the effective scanning region increase and a total time required for a scanning operation of all weld beads increases, the offline teaching device 5 omits the division process and the partial deletion process of the effective scanning region.

The offline teaching device 5 may omit the division process or the partial deletion process of the effective scanning region when a total time required for the scanning operation of all the weld beads in a case where the division process or the partial deletion process of the overlapping region DB61 is omitted is within a predetermined time set in advance. Accordingly, the offline teaching device 5 can prevent a scan teaching content from being complicated.

Figure 20:
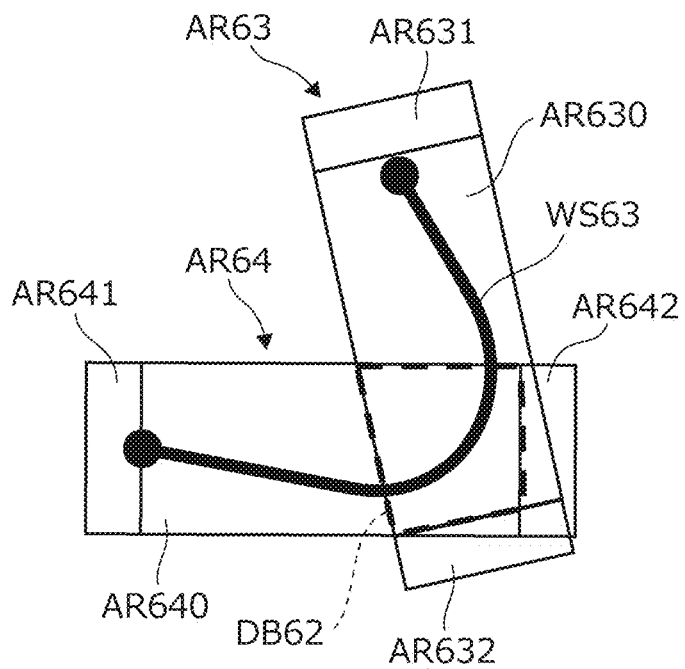
FIG. 20 is a diagram illustrating an example of omission of a division process and a deletion process of an effective scanning region.

Next, an example of the scanning operation editing process executed in the process of step St7 will be described with reference to FIG. 20. FIG. 20 is a diagram illustrating an example of omission of a division process and a partial deletion process of an effective scanning region. In the example described below, an example in which the division process and the partial deletion process of the effective region are omitted has been described, but the editing process to be omitted is not limited thereto, and another process may be omitted.

For example, FIG. 20 illustrates an example in which the welding line WS63 is scanned by two scanning operations. The effective scanning region AR63 includes a scanning region AR630 for scanning a part of the welding line WS63, and auxiliary scanning regions AR631 and AR632. The effective scanning region AR64 includes a scanning region AR640 for scanning a part of the welding line WS63, and auxiliary scanning regions AR641 and AR642.

In such a case, the offline teaching device 5 detects the overlapping region DB61 in which the effective scanning region AR63 and the effective scanning region AR64 overlap each other. The offline teaching device 5 calculates and compares a total time required for a scanning operation in a case where the welding line WS63 is scanned in each of the effective scanning regions AR63 and AR64 and a total time required for a scanning operation in a case where the welding line WS63 is scanned in each of the effective scanning regions obtained by dividing the scanning region AR630 or the scanning region AR640 in the overlapping region DB62.

When it is determined that a total time required for a scanning operation in a case where the scanning region AR630 or the scanning region AR640 is divided in the overlapping region DB62 is longer than a total time required for a scanning operation in a case where the overlapping region DB62 is not divided, the offline teaching device 5 omits a division process of the overlapping region DB62.

In such a case, the offline teaching device 5 detects the overlapping region DB62 between the effective scanning region AR63 and the effective scanning region AR64. The offline teaching device 5 calculates and compares a total time required for a scanning operation in a case where the welding line WS63 is scanned in each of the effective scanning regions AR63 and AR64 and a total time required for a scanning operation in a case where the welding line WS63 is scanned in each of the effective scanning regions from which the overlapping region DB62 is partially deleted.

When it is determined that a total time required for a scanning operation in a case where the overlapping region DB62 is deleted is longer than a total time required for a scanning operation in a case where the overlapping region DB62 is not deleted, the offline teaching device 5 omits a deletion process of the overlapping region DB62.

As described above, when it is determined that various operations (for example, an approach operation, a retraction operation, and an avoidance operation) in a scanning operation of each new effective scanning region generated by executing the division process or the partial deletion process of the effective scanning region increase and a total time required for a scanning operation of all weld beads increases, the offline teaching device 5 omits the division process and the partial deletion process of the effective scanning region.

The offline teaching device 5 may omit the division process or the partial deletion process of the effective scanning region when a total time required for the scanning operation of all the weld beads in a case where the division process or the partial deletion process of the overlapping region DB62 is omitted is within a predetermined time set in advance. Accordingly, the offline teaching device 5 can prevent a scan teaching content from being complicated.

Although an example in which an overlapping region is automatically divided or partially deleted without an operator operation has been described, the offline teaching device 5 illustrated in FIGS. 19 and 20 may generate a teaching auxiliary screen in which the overlapping region is highlighted, and may perform division or partial deletion of the overlapping region based on an operator operation as in the example illustrated in FIG. 18.

<Movement Process and Rotation Process of Effective Scanning Region>

Figure 21:
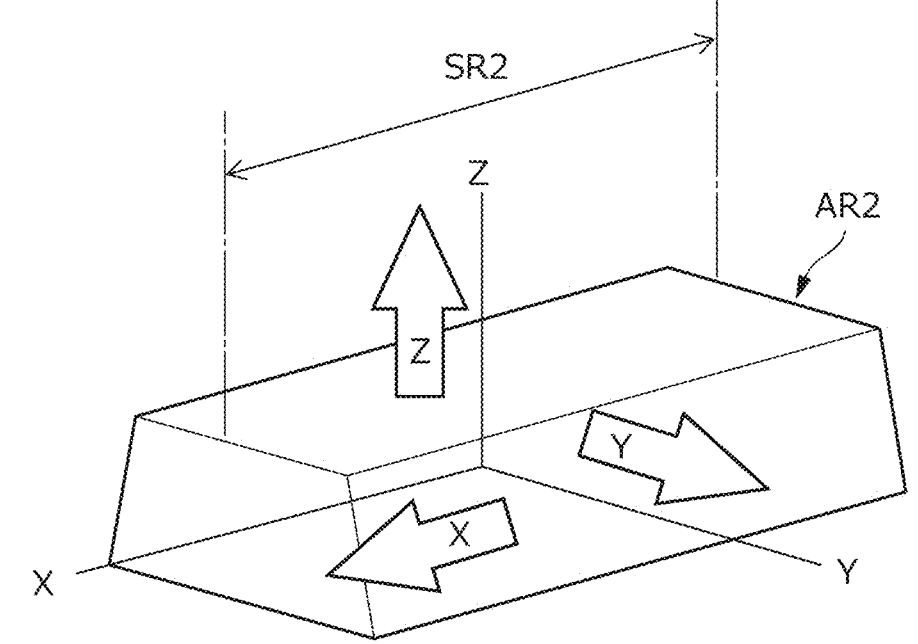
FIG. 21 is a diagram illustrating a movement process example of an effective scanning region.
Figure 22:
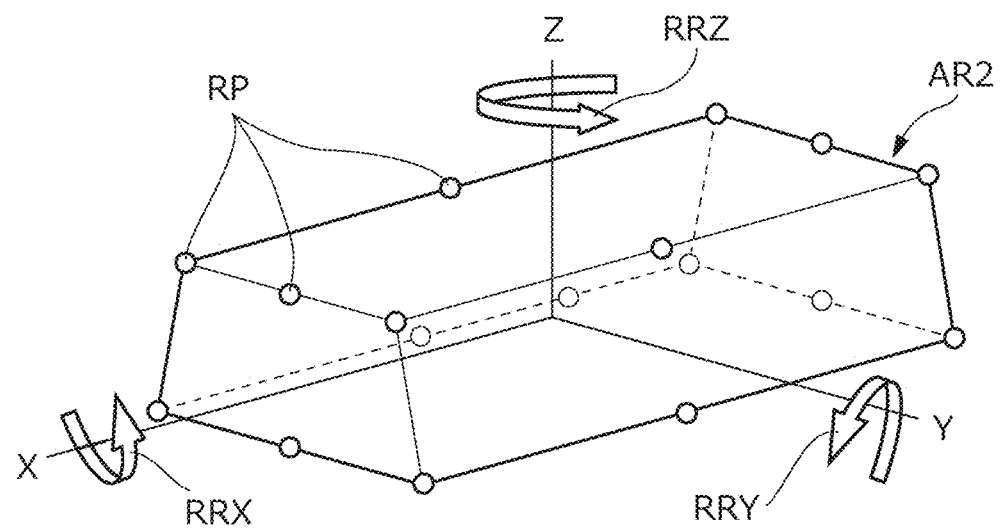
FIG. 22 is a diagram illustrating a rotation process example of an effective scanning region.

Next, a movement process and a rotation process of the effective scanning region AR1 of the offline teaching device 5 according to Embodiment 1 will be described with reference to FIGS. 21 and 22. FIG. 21 is a diagram illustrating a movement process example of the effective scanning region AR1. FIG. 22 is a diagram illustrating a rotation process example of the effective scanning region AR1.

The effective scanning region AR1 illustrated in FIGS. 21 and 22 corresponds to the scanning section SR1. The offline teaching device 5 moves a position of the effective scanning region AR1 in each of an X direction, a Y direction, and a Z direction based on an operator operation. Accordingly, the offline teaching device 5 can support the scan teaching performed by the operator operation by moving a position of an effective scanning region based on the operator operation.

The offline teaching device 5 receives a designation operation on the rotation reference point RP by an operator operation and a rotation operation in a rotation direction RRX around an X axis, a rotation direction RRY around a Y axis, or a rotation direction RRZ around a Z axis. The offline teaching device 5 executes a rotation process of rotating the effective scanning region AR2 in the rotation direction RRX, the rotation direction RRY, or the rotation direction RRZ with the designated rotation reference point RP as an origin based on an operator operation. Accordingly, the offline teaching device 5 can support the scan teaching performed by the operator operation by rotating a position of an effective scanning region based on the operator operation.

In FIG. 22, reference numerals are not given to all the rotation reference points RP. In addition, in the example shown in FIG. 22, each of 16 rotation reference points RP is illustrated, but positions and the number of rotation reference points for rotating the effective scanning region AR2 are not limited thereto.

Figure 23:
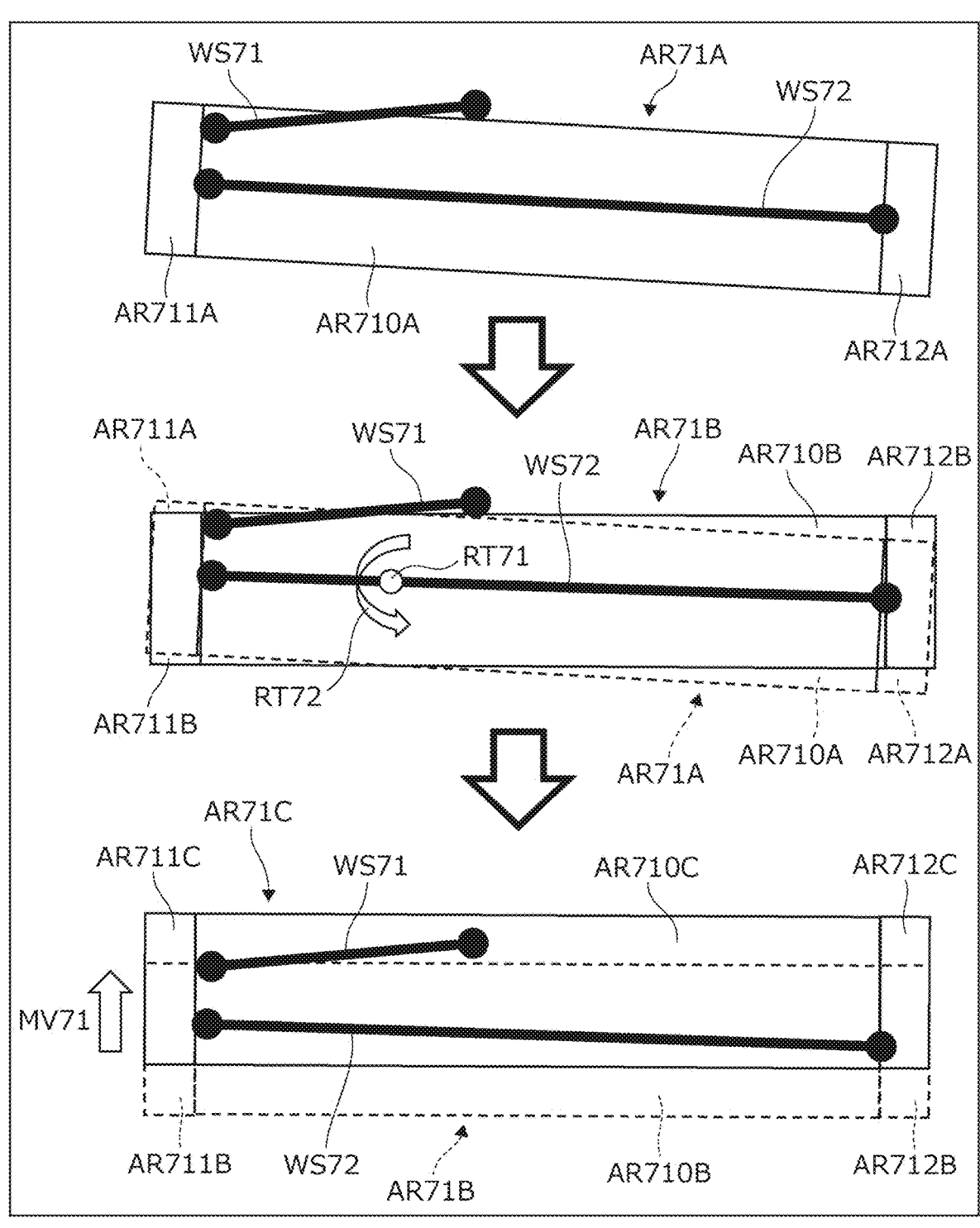
FIG. 23 is a diagram illustrating a rotation process example and a movement process example of an effective scanning region.

Next, a rotation process example and a movement process example of an effective scanning region will be described with reference to FIG. 23. FIG. 23 is a diagram illustrating a rotation process example and a movement process example of an effective scanning region. It is needless to say that the rotation process and the movement process of the effective scanning region illustrated in FIG. 23 are merely examples, and are not limited thereto.

The rotation process of the effective scanning region illustrated in FIG. 23 is a process of rotating the effective scanning region with any point designated on a welding line as an origin. The offline teaching device 5 rotates the effective scanning region with any point on a welding line designated by an operator operation as an origin (a rotation reference point).

For example, in the example illustrated in FIG. 23, the effective scanning region AR71A includes an effective scanning region AR710A for scanning a part of a welding line WS71 and an entire welding line WS72, and auxiliary scanning regions AR711A and AR712A.

In the example illustrated in FIG. 23, the offline teaching device 5 receives an operator operation of designating a point RT71 on the welding line WS72 as a rotation reference point of an effective scanning region. The offline teaching device 5 rotates the effective scanning region AR71A in a predetermined rotation direction RT72 around a point RT71 on the welding line WS72 as a rotation center based on an operator operation. After the rotation process, the offline teaching device 5 constructs an effective scanning region AR71B including an effective scanning region AR71B for scanning a part of the welding line WS71 and the entire welding line WS72 in a virtual space and auxiliary scanning regions AR711B and AR712B, and generates and outputs a teaching auxiliary screen.

The offline teaching device 5 receives an operator operation of moving the effective scanning region AR71B after the rotation process in a predetermined direction MV71. After the movement process, the offline teaching device 5 constructs an effective scanning region AR71C including an effective scanning region AR71C for scanning the entire welding line WS71 and the entire welding line WS72 in a virtual space and auxiliary scanning regions AR711C and AR712C, and generates and outputs a teaching auxiliary screen.

Accordingly, the offline teaching device 5 can rotate an effective scanning region using any position on a welding line designated by an operator operation as a rotation reference. The offline teaching device 5 makes an effective scanning region editable with reference to any point on a welding line in the work of editing the effective scanning region in a virtual space performed by an operator, and thus a degree of freedom of a rotation operation of the effective scanning region can be limited such that the effective scanning region after the rotation operation includes a welding line to be scanned. Accordingly, the operator can create an effective scanning region including a welding line without finely adjusting the effective scanning region in a virtual space, and can perform the scan teaching work.

<Copy Process of Effective Scanning Region>

Figure 24:
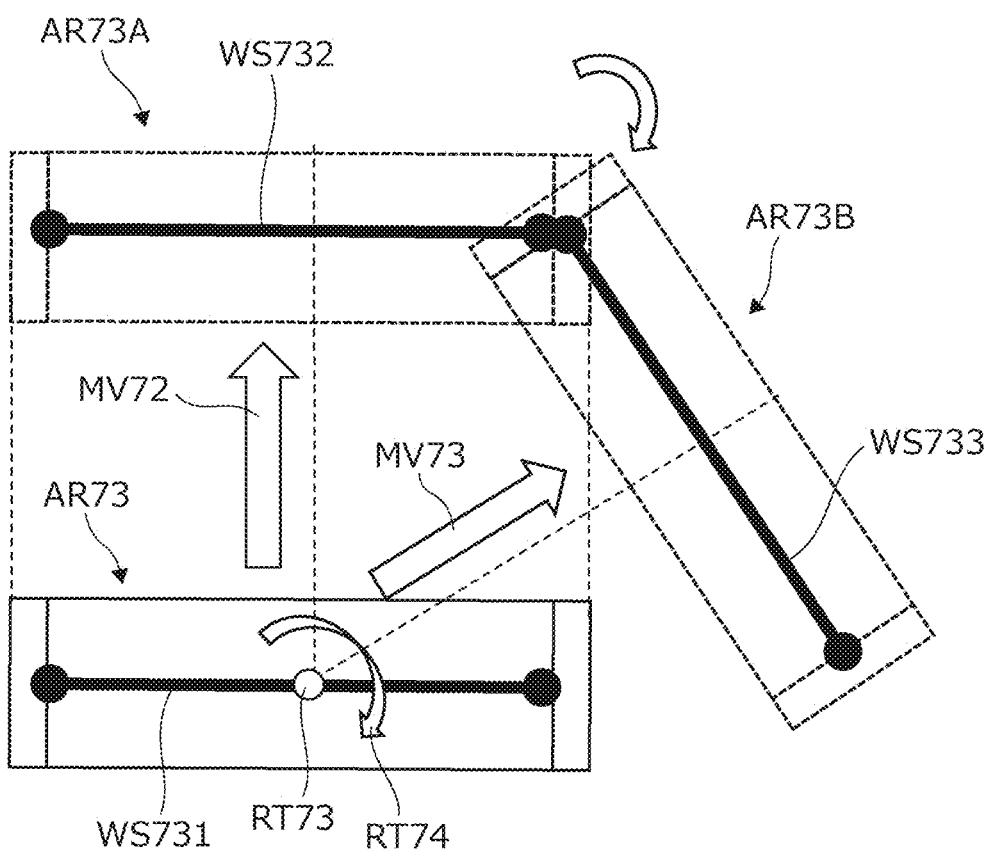
FIG. 24 is a diagram illustrating a copy process example, a rotation process example, and a movement process example of an effective scanning region.

Next, an example of a copy process of an effective scanning region will be described with reference to FIG. 24. FIG. 24 is a diagram illustrating a copy process example, a rotation process example, and a movement process example of an effective scanning region. It is needless to say that the copy process, the rotation process, and the movement process of the effective scanning region illustrated in FIG. 24 are merely examples, and are not limited thereto.

The rotation process of the effective scanning region illustrated in FIG. 24 is a process of rotating the effective scanning region with any point on a welding line as an origin. The offline teaching device 5 rotates the effective scanning region with any point on a welding line designated by an operator operation as an origin (a rotation reference point).

For example, in the example illustrated in FIG. 24, the offline teaching device 5 generates two effective scanning regions AR73A and AR73B obtained by copying (duplicating) the effective scanning region AR73 based on an operator operation via the input device UI3.

The offline teaching device 5 generates the effective scanning region AR73A including the welding line WS732 by translating the effective scanning region AR73A in a direction MV72 with respect to a welding line WS731 based on an operator operation.

Based on an operator operation, the offline teaching device 5 rotates an effective scanning region AR73B in a direction RT74 with a point RT73 on the welding line WS731 as a center axis, and then moves the effective scanning region AR73B toward a radially outer side (a direction MV73) centered on the point RT73 to generate the effective scanning region AR73B including the welding line WS733.

The offline teaching device 5 may further copy the effective scanning region AR 73A based on an operator operation and rotate the effective scanning region AR73A in the direction MV74 with the point RT73 on the welding line WS731 as a center axis to generate the effective scanning region AR73B including the welding line WS733.

The offline teaching device 5 constructs three effective scanning regions AR73 to AR73B for scanning the entire three welding lines WS731 to WS733 in a virtual space, and generates and outputs a teaching auxiliary screen.

Accordingly, the offline teaching device 5 can support teaching of an effective scanning region for scanning a plurality of welding lines formed on the same plane performed by an operator.

Figure 25:
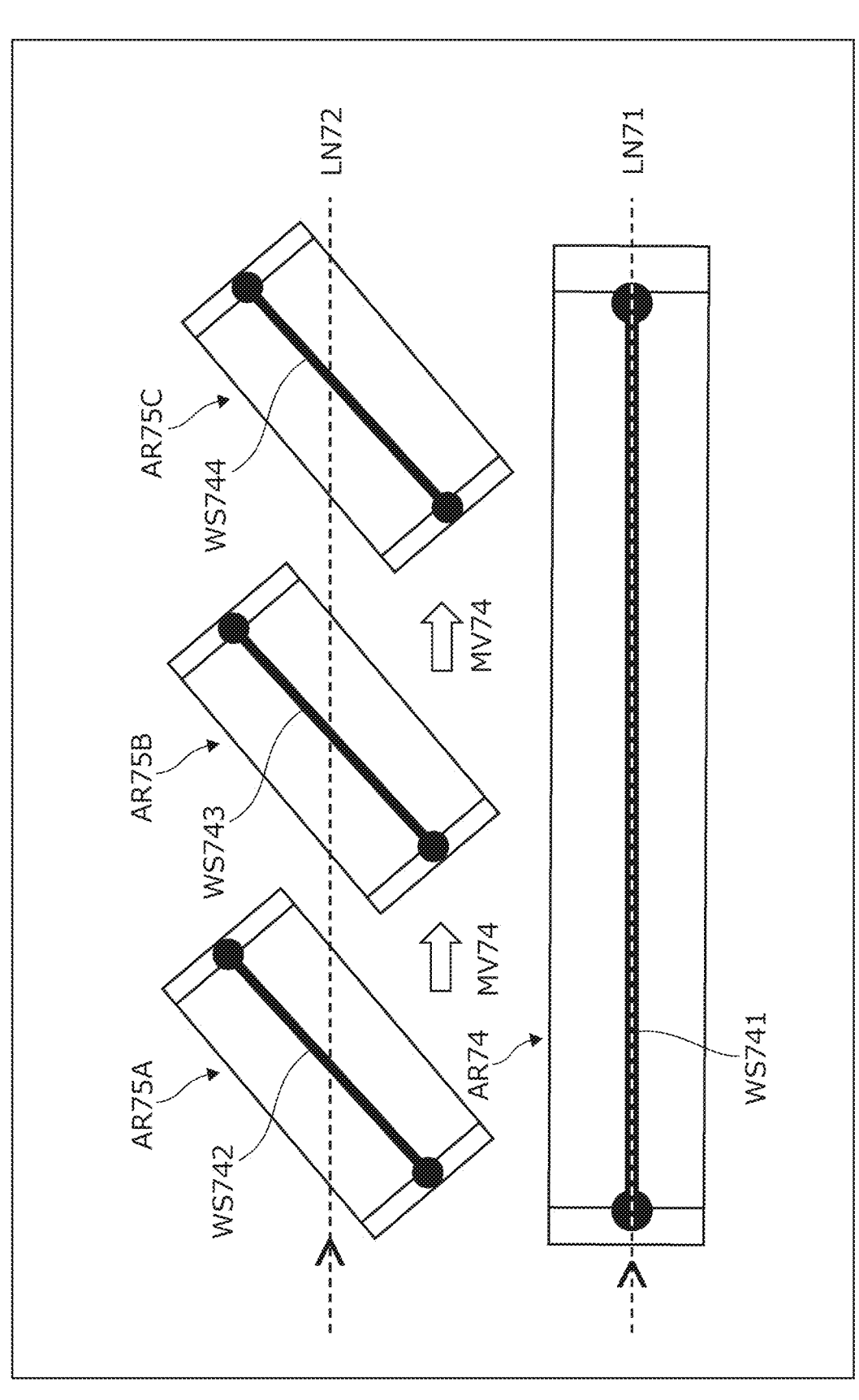
FIG. 25 is a diagram illustrating a copy process example and a movement process example of an effective scanning region.

Next, an example of a copy process of an effective scanning region will be described with reference to FIG. 25. FIG. 25 is a diagram illustrating a copy process example and a movement process example of an effective scanning region. It is needless to say that the copy process and the movement processing rotation of the effective scanning region illustrated in FIG. 25 are merely examples, and are not limited thereto. An extending direction LN71 of a welding line WS741 illustrated in FIG. 25 is parallel to a moving direction LN72 of effective scanning regions AR75B and AR75C (LN71//LN72).

For example, in the example illustrated in FIG. 25, the offline teaching device 5 generates two effective scanning regions AR75B and AR75C obtained by copying (duplicating) an effective scanning region AR75A based on an operator operation via the input device UI3.

The offline teaching device 5 translates each of the two effective scanning regions AR75B and AR75C in a direction MV74 along the welding line WS741 based on an operator operation to generate the effective scanning region AR75B including a welding line WS743 and the effective scanning region AR75C including a welding line WS744.

Based on an operator operation, the offline teaching device 5 rotates the effective scanning region AR73B in the direction MV74 with the point RT73 on the welding line WS731 as a center axis, and then moves the effective scanning region AR73B toward the radially outer side (the direction MV73) centered on the point RT73 to generate the effective scanning region AR73B including the welding line WS733.

The offline teaching device 5 constructs four effective scanning regions AR74 and AR75A to AR75C for teaching a scanning operation of the three welding lines WS741 to WS744 in a virtual space, and generates and outputs a teaching auxiliary screen.

Accordingly, the offline teaching device 5 can support teaching of an effective scanning region for scanning a plurality of welding lines formed on the same plane performed by an operator.

As described above, the offline teaching device 5 according to Embodiment 1 includes: the input and output unit 53 (an example of the input unit) capable of receiving an operator operation; the input and output unit 53 (an example of an acquisition unit) that acquires position information of a welding line of the workpiece Wk produced by welding and the effective scanning range AR0 (an example of a scanning range) of the sensor 4 that scans an appearance shape of a weld bead formed on the workpiece Wk; the 3D calculation unit 54 (an example of a generation unit) that generates a three-dimensional region scanned by the sensor 4 based on the acquired position information of the welding line and the effective scanning range AR0; and the program creation unit 55 (an example of a control unit) that generates and outputs a teaching auxiliary screen (an example of an auxiliary screen) in which the welding line and an effective scanning region (an example of the three-dimensional region) are disposed in a virtual space, and generates and outputs a teaching program for causing the welding robot MC1 (an example of a robot) that drives the sensor 4 to scan an effective scanning region shown in the teaching auxiliary screen based on an operator operation input to the input and output unit 53.

Accordingly, the offline teaching device 5 according to Embodiment 1 can support the operator in determining whether the entire welding line can be scanned (inspected) based on an effective scanning region constructed as a template of a scanning operation by using a teaching auxiliary screen for visualizing a positional relation between the welding line and the effective scanning region (a scanning region). In addition, when the operator determines that the entire welding line can be scanned (inspected) based on the effective scanning region which is shown on the teaching auxiliary screen and is constructed as a template of a scanning operation, the operator can easily create a scanning operation teaching program only by performing an operation of requesting the creation of the scanning operation teaching program using the input device UI3. Accordingly, the offline teaching device 5 can more effectively support the creation of a scanning operation teaching program by an operator who does not have a higher skill to create the teaching program.

In Embodiment 1, an effective scanning region (for example, the effective scanning region AR22 illustrated in FIGS. 10 to 13) includes each of two auxiliary scanning regions (for example, the auxiliary scanning regions AR221 and AR222 illustrated in FIGS. 10 to 13) of a sensor. Accordingly, the offline teaching device 5 according to Embodiment 1 can visualize two auxiliary scanning regions corresponding to the respective effective scanning regions. Accordingly, the operator can visually confirm whether the welding line is included in the auxiliary scanning region using the teaching auxiliary screen.

The 3D calculation unit 54 according to Embodiment 1 generates an effective scanning region (for example, the effective scanning region AR 12 illustrated in FIG. 8) including one end (for example, the start point ST12 illustrated in FIG. 8) and the other end (for example, the end point ED12 illustrated in FIG. 8) of a welding line. Accordingly, the offline teaching device 5 according to Embodiment 1 can generate an effective scanning region even when only position information of a start point and an end point of a welding line is acquired.

In addition, the 3D calculation unit 54 according to Embodiment 1 further generates an operation trajectory of the sensor 4 (for example, a direction indicated by an arrow in the scanning section SS11 illustrated in FIG. 7) for each effective scanning region based on a start position and an end position of a welding line. The program creation unit 55 generates and outputs a teaching auxiliary screen in which a welding line, an effective scanning region, and an operation trajectory of the sensor 4 are disposed in a virtual space. Accordingly, the offline teaching device 5 according to Embodiment 1 can generate an effective scanning region based on each of a start position (a start point) and an end position (an end point) of a welding line, and can determine (set) an operation trajectory of the sensor 4 based on each of the start position (the start point) and the end position (the end point) of the welding line.

The input and output unit 53 according to Embodiment 1 further acquires position information of a production facility (for example, a welding robot, an inspection robot, the workpiece Wk, a stage, or a jig) that executes welding. The program creation unit 55 generates and outputs a teaching auxiliary screen in which a welding line, an effective scanning region, and a production facility are arranged in a virtual space. Accordingly, the offline teaching device 5 according to Embodiment 1 can support various determinations necessary for a scanning operation, such as whether the entire welding line can be scanned (inspected) by an effective scanning region, whether a production facility and the sensor 4 do not interfere (collide) with each other during the scanning operation, and whether the effective scanning region is shielded by the production facility or the workpiece Wk, which are performed by an operator using a teaching auxiliary screen that visualizes a positional relation among the production facility, the welding line, and the effective scanning region (the scanning region). Accordingly, the offline teaching device 5 can more effectively support the creation of a scanning operation teaching program by an operator who does not have a higher skill to create the teaching program.

The program creation unit 55 according to Embodiment 1 calculates and outputs a time required for the scanning operation of the workpiece Wk by the sensor 4 (for example, the scan time, and the idle running time illustrated in FIG. 8) based on the acquired effective scanning region. Accordingly, the offline teaching device 5 according to Embodiment 1 can present to the operator the time required for the scanning operation when a scanning operation teaching program corresponding to a scanning operation indicated by a teaching auxiliary screen is executed. Accordingly, the offline teaching device 5 can use the time required for the scanning operation as an index of productivity, and can support the determination of whether the scanning operation indicated by the teaching auxiliary screen is a scanning operation desired by the operator.

As described above, in Embodiment 1, an offline teaching method performed by the operator operating the input device UI3 and using the offline teaching device 5 including one or more computers communicably connected to the input device UI3 includes: inputting, to the computer, position information of a welding line of the workpiece Wk produced by welding and the effective scanning range AR0 (an example of a scanning range) of the sensor 4 that scans an appearance shape of a weld bead formed on the workpiece Wk; and creating a teaching program for causing the welding robot MC1 that drives the sensor 4 to scan an effective scanning region indicated by a teaching auxiliary screen in which the welding line and the effective scanning region scanned by the sensor 4 are disposed in a virtual space.

Accordingly, the offline teaching device 5 according to Embodiment 1 generates a teaching auxiliary screen that visualizes a positional relation between a welding line and an effective scanning region (a scanning region) based on the input of the position information of the welding line and the effective scanning range AR0 of the sensor 4. The offline teaching device 5 generates a scanning operation teaching program for causing the sensor 4 to scan an effective scanning region as a scanning operation indicated by the generated teaching auxiliary screen based on an operator operation. Accordingly, the offline teaching device 5 can more effectively support the creation of a scanning operation teaching program by an operator who does not have a higher skill to create the teaching program.

As described above, the offline teaching device 5 according to Embodiment 1 includes: the input and output unit 53 (an example of an input unit) capable of acquiring an operator operation; the input and output unit 53 (an example of an acquisition unit) that acquires the position information of the welding line of the workpiece Wk produced by welding and the effective scanning range AR0 of the sensor 4 that scans the appearance shape of the weld bead formed on the workpiece Wk; the 3D calculation unit 54 (an example of a generation unit) that generates an effective scanning region (an example of a three-dimensional region) to be scanned by the sensor 4 based on the acquired position information of the welding line and the effective scanning range AR0 (an example of a scanning range); and the program creation unit 55 (an example of a control unit) that generates and outputs a teaching auxiliary screen (an example of an auxiliary screen) in which the welding line and the effective scanning region are disposed in a virtual space, and generates and outputs a teaching program for causing the welding robot MC1 (an example of a robot) that drives the sensor to scan an effective scanning region shown in the teaching auxiliary screen based on an operator operation. The 3D calculation unit 54 divides an effective scanning region based on an operator operation input to the input and output unit 53. The program creation unit 55 generates and outputs a new teaching auxiliary screen in which a welding line and a plurality of effective scanning regions including divided effective scanning regions are disposed in a virtual space, and generates and outputs a teaching program for scanning the plurality of effective scanning regions shown in the new teaching auxiliary screen based on an operator operation.

Accordingly, the offline teaching device 5 according to Embodiment 1 can support the operator in determining whether the entire welding line can be scanned (inspected) based on an effective scanning region constructed as a template of a scanning operation by using a teaching auxiliary screen for visualizing a positional relation between the welding line and the effective scanning region (a scanning region). Based on an operator operation requesting division of any effective scanning region which is shown on the teaching auxiliary screen and is constructed as a template of a scanning operation, the offline teaching device 5 divides the effective scanning region. That is, the offline teaching device 5 can realize division of the effective scanning region without complicated operator operations such as adjustment of a scanning section of an effective scanning region, an arrangement process (that is, a rotation and movement process) of the effective scanning region in a virtual space, and a recreation process. Accordingly, the offline teaching device 5 can more effectively support the creation of a scanning operation teaching program by an operator who does not have a higher skill to create the teaching program.

In the offline teaching device 5 according to Embodiment 1, an effective scanning region (for example, the effective scanning region AR22 illustrated in FIGS. 10 to 13) includes each of two auxiliary scanning regions (for example, the auxiliary scanning regions AR221 and AR222 illustrated in FIGS. 10 to 13) of a sensor. Accordingly, the offline teaching device 5 according to Embodiment 1 can visualize two auxiliary scanning regions corresponding to the respective effective scanning regions. Accordingly, the operator can visually confirm whether the welding line is included in the auxiliary scanning region using the teaching auxiliary screen.

The 3D calculation unit 54 according to Embodiment 1 generates an effective scanning region (for example, the effective scanning region AR21 illustrated in FIG. 9) including one end (for example, the start point ST21 illustrated in FIG. 9) and the other end (for example, the end point ED21 illustrated in FIG. 9) of a welding line, and generates a first effective scanning region (for example, the effective scanning region AR22 illustrated in FIG. 9, which is an example of a first three-dimensional region) including a division point (for example, the division point PT21 illustrated in FIG. 9) designated by an operator operation and one end of the welding line, and a second effective scanning region (for example, the effective scanning region AR23 illustrated in FIG. 9, which is an example of a second three-dimensional region) including the division point and the other end of the welding line. Accordingly, the offline teaching device 5 according to Embodiment I can generate, in a virtual space, each of two effective scanning regions including a start point and an end point of a welding line and including a division point designated by an operator operation only by an operator operation of designating a division point. That is, the offline teaching device 5 can realize division of the effective scanning region without complicated operator operations such as adjustment of a scanning section of the divided effective scanning region, an arrangement process (that is, a rotation and movement process) of the effective scanning region in a virtual space, and a recreation process.

In addition, when M (M is an integer of 2 or more) division points (for example, the division points PT11, PT12, and PT13 illustrated in FIG. 14) are designated by an operator operation, the 3D calculation unit 54 according to Embodiment 1 generates (M+1) effective scanning regions by dividing an effective scanning region at the M division points. A first effective scanning region (for example, the effective scanning region AR13) is generated to include one end (for example, the start point ST11) of a welding line and a first division point (for example, the division point PT11), a kth (k: an integer of 2 or more) effective scanning region (for example, the effective scanning region AR15) is generated to include a (k–1) th division point (for example, the division point PT11) and a kth division point (for example, the division point PT12), and a (M+1) th effective scanning region (for example, the effective scanning region AR18) is generated to include a Mth division point (for example, the division point PT13) and the other end (for example, the end point ED11) of the welding line. Accordingly, the offline teaching device 5 according to Embodiment 1 can generate each of the plurality of effective scanning regions including a start point and an end point of a welding line and a division point designated by an operator operation even when the welding line is not a straight line and is complicated and one effective scanning region is divided a plurality of times.

As described above, in Embodiment 1, the offline teaching method performed by the operator operating the input device UI3 and using the offline teaching device 5 including one or more computers communicably connected to the input device UI3 includes: inputting, to the computer, position information of the welding line of the workpiece Wk produced by welding and the effective scanning range AR0 (an example of a scanning range) of the sensor 4 that scans an appearance shape of a weld bead formed on the workpiece Wk; inputting, to the computer, a division point of at least one effective scanning region (for example, the division point PT21 of the effective scanning region AR21 illustrated in FIG. 9) on a teaching auxiliary screen in which a welding line and an effective scanning region scanned by the sensor 4 are disposed in a virtual space; and creating a teaching program for causing the welding robot MC1 (an example of a robot) that drives the sensor 4 to scan a plurality of effective scanning regions (for example, two effective scanning regions AR22 and AR23 illustrated in FIG. 9) indicated by a teaching auxiliary screen in which a welding line and a plurality of divided effective scanning regions are disposed in the virtual space.

Accordingly, the offline teaching device 5 according to Embodiment 1 generates a teaching auxiliary screen that visualizes a positional relation between a welding line and an effective scanning region (a scanning region) based on the input of the position information of the welding line and the effective scanning range AR0 of the sensor 4. The offline teaching device 5 divides an effective scanning region to be scanned by the sensor 4 based on an input of a division point for dividing any effective scanning region on the generated teaching auxiliary screen. The offline teaching device 5 generates a scanning operation teaching program for causing the sensor 4 to scan an effective scanning region as a scanning operation indicated by a teaching auxiliary screen on which each of the effective scanning regions after division is disposed (constructed). Accordingly, the offline teaching device 5 can more effectively support the creation of a scanning operation teaching program by an operator who does not have a higher skill to create the teaching program.

As described above, the offline teaching device 5 according to Embodiment 1 includes: the input and output unit 53 (an example of an input unit) capable of acquiring an operator operation; the input and output unit 53 (an example of an acquisition unit) that acquires position information of a plurality of welding lines of the workpiece Wk produced by welding and the effective scanning range AR0 (an example of a scanning range) of the sensor 4 that scans an appearance shape of a weld bead formed on the workpiece Wk; the 3D calculation unit 54 (an example of a generation unit) that generates a plurality of effective scanning regions (an example of a three-dimensional region) scanned by the sensor 4 based on the acquired position information of the plurality of welding lines and the effective scanning range AR0; and the program creation unit 55 that generates and outputs a teaching auxiliary screen in which the plurality of welding lines and the plurality of effective scanning regions are disposed in a virtual space and generates and outputs a teaching program for causing the welding robot MC1 (an example of a robot) that drives the sensor 4 to scan an effective scanning region shown in the teaching auxiliary screen based on an operator operation. The 3D calculation unit 54 combines the two effective scanning regions selected by the operator operation. The program creation unit 55 generates and outputs a new teaching auxiliary screen in which a plurality of welding lines and at least one effective scanning region including the combined effective scanning regions are disposed in a virtual space, and generates and outputs a teaching program for scanning at least one effective scanning region shown in the new teaching auxiliary screen based on an operator operation.

Accordingly, the offline teaching device 5 according to Embodiment 1 can support the operator in determining whether the entire welding line can be scanned (inspected) based on an effective scanning region constructed as a template of a scanning operation by using a teaching auxiliary screen for visualizing a positional relation between the welding line and the effective scanning region (a scanning region). Based on an operator operation requesting combining of a plurality of effective scanning regions which are shown on the teaching auxiliary screen and are constructed as a template of a scanning operation, the offline teaching device 5 combines each of the plurality of effective scanning regions. That is, the offline teaching device 5 can realize the combination of the plurality of effective scanning regions without complicated operator operations such as adjustment of a scanning section of an effective scanning region, an arrangement process (that is, a rotation and movement process) of the effective scanning region in a virtual space, and a recreation process. Accordingly, the offline teaching device 5 can more effectively support the creation of a scanning operation teaching program by an operator who does not have a higher skill to create the teaching program.

In the offline teaching device 5 according to Embodiment 1, an effective scanning region (for example, the effective scanning region AR22 illustrated in FIGS. 10 to 13) includes each of two auxiliary scanning regions (for example, the auxiliary scanning regions AR221 and AR222 illustrated in FIGS. 10 to 13) of the sensor 4. Accordingly, the offline teaching device 5 according to Embodiment 1 can visualize two auxiliary scanning regions corresponding to the respective effective scanning regions. Accordingly, the operator can visually confirm whether the welding line is included in the auxiliary scanning region using the teaching auxiliary screen.

Further, the 3D calculation unit 54 according to Embodiment 1 generates an effective scanning region for scanning from a scan start point (for example, the start point ST31 illustrated in FIG. 15) of one effective scanning region (for example, the effective scanning region AR31 illustrated in FIG. 15) of the two selected effective scanning regions to a scan end point (for example, the end point ED32 illustrated in FIG. 15) of the other effective scanning region (for example, the effective scanning region AR32 illustrated in FIG. 15). Accordingly, the offline teaching device 5 according to Embodiment 1 can generate, in a virtual space, each of the two effective scanning regions including a start point and an end point of a welding line and a division point designated by an operator operation only by an operator operation of selecting two or more effective scanning regions to be combined.

In addition, the 3D calculation unit 54 according to Embodiment 1 determines a scanning direction of the sensor 4 (for example, directions of arrows indicated by the scanning sections SS410 and SS420 illustrated in FIG. 16) for each effective scanning region based on the position information of the welding line (for example, a start point and an end point of each of the welding lines WS41 and WS42 illustrated in FIG. 16), and generates a combined effective scanning region based on a scanning section and a scanning direction of each of the selected two or more effective scanning regions. Accordingly, the offline teaching device 5 according to Embodiment 1 can generate an effective scanning region capable of efficiently scanning a plurality of welding lines by generating an effective scanning region to be scanned by a total scanning section of each of a plurality of effective scanning regions in a scanning direction obtained by combining scanning directions of the plurality of effective scanning regions selected by an operator operation.

Specifically, the offline teaching device 5 in the example illustrated in FIG. 16 determines, as an operation trajectory (a scanning direction) of the sensor 4 in the effective scanning region AR43, a direction obtained by combining a vector having the start point ST41 of the welding line WS41 as a start point and the end point ED41 as an end point and a vector having the start point ST42 of the welding line WS42 as a start point and the end point ED42 as an end point. The offline teaching device 5 determines a total scanning section of each of the two selected effective scanning regions AR41 and AR as the operation trajectory (the scanning direction) of the sensor 4 in the effective scanning region AR43, thereby generating the effective scanning region AR43 in which each of the welding lines WS41 and WS42 can be scanned.

As described above, in Embodiment 1, the offline teaching method performed by the operator operating the input device UI3 and using the offline teaching device 5 including one or more computers communicably connected to the input device UI3 includes: inputting, to the computer, position information of a plurality of welding lines of the workpiece Wk produced by welding and the effective scanning range AR0 (an example of a scanning range) of the sensor 4 that scans an appearance shape of a weld bead formed on the workpiece Wk; inputting, to the computer, at least two effective scanning regions to be combined on a teaching auxiliary screen in which the plurality of welding lines and a plurality of effective scanning regions scanned by the sensor 4 are disposed in a virtual space; and creating a teaching program for causing a welding robot that drives the sensor 4 to scan at least one effective scanning region indicated by a new teaching auxiliary screen in which a plurality of welding lines and at least one effective scanning region after at least two input effective scanning regions are combined are disposed in a virtual space.

Accordingly, the offline teaching device 5 according to Embodiment 1 can support the operator in determining whether the entire welding line can be scanned (inspected) based on an effective scanning region constructed as a scanning operation by using a teaching auxiliary screen for visualizing a positional relation between the welding line and the effective scanning region (a scanning region). Based on an operator operation requesting combining of a plurality of effective scanning regions which are shown on the teaching auxiliary screen and are constructed as a scanning operation, the offline teaching device 5 combines each of the plurality of effective scanning regions. That is, the offline teaching device 5 can realize the combination of the plurality of effective scanning regions without complicated operator operations such as adjustment of a scanning section of an effective scanning region, an arrangement process (that is, a rotation and movement process) of the effective scanning region in a virtual space, and a recreation process. Accordingly, the offline teaching device 5 can more effectively support the creation of a scanning operation teaching program by an operator who does not have a higher skill to create the teaching program.

As described above, the offline teaching device 5 according to Embodiment 1 includes: the input and output unit 53 (an example of an input unit) capable of acquiring an operator operation; the input and output unit 53 (an example of an acquisition unit) that acquires position information of a plurality of welding lines of the workpiece Wk produced by welding and the effective scanning range AR0 (an example of a scanning range) of the sensor 4 that scans an appearance shape of a weld bead formed on the workpiece Wk; the 3D calculation unit 54 (an example of a generation unit) that generates a plurality of effective scanning regions (an example of a three-dimensional region) scanned by the sensor 4 based on the acquired position information of the plurality of welding lines and the effective scanning range AR0; and the program creation unit 55 that generates and outputs a teaching auxiliary screen in which the plurality of welding lines and the plurality of effective scanning regions are disposed in a virtual space and an overlapping region (for example, the overlapping region DB61 illustrated in FIG. 19) of each of the plurality of effective scanning regions is highlighted. The 3D calculation unit 54 deletes an overlapping region based on an operator operation. The program creation unit 55 generates and outputs a new teaching auxiliary screen in which a plurality of welding lines and at least one effective scanning region after deletion of the overlapping region are disposed in a virtual space, and generates and outputs a teaching program for causing the welding robot MC1 (an example of a robot) that drives the sensor to scan at least one effective scanning region based on an operator operation.

Accordingly, the offline teaching device 5 according to Embodiment 1 can support the operator in determining whether to delete an overlapping region by highlighting the overlapping region between the effective scanning regions constructed as a template of a scanning operation on a teaching auxiliary screen that visualizes a positional relation between a welding line and an effective scanning region (a scanning region). The offline teaching device 5 deletes the overlapping region from the plurality of effective scanning regions constructed as a template of a scanning operation based on an operator operation requesting the deletion of the overlapping region shown on the teaching auxiliary screen. Accordingly, the operator can confirm the overlapping region at a glance without confirming whether each effective scanning region overlaps by rotating a three-dimensional space (a virtual space) indicated by the teaching auxiliary screen. Since the operator can confirm a positional relation among the welding line, each effective scanning region, and the overlapping region on the teaching auxiliary screen, the operator can confirm at a glance which welding line corresponds to the overlapping region. Accordingly, the offline teaching device 5 can more effectively support the creation of a scanning operation teaching program by an operator who does not have a higher skill to create the teaching program.

An effective scanning region (for example, the effective scanning region AR22 illustrated in FIGS. 10 to 13) according to Embodiment 1 includes each of two auxiliary scanning regions (for example, the auxiliary scanning regions AR221 and AR222 illustrated in FIGS. 10 to 13) of the sensor 4. Accordingly, the offline teaching device 5 according to Embodiment 1 can visualize two auxiliary scanning regions corresponding to the respective effective scanning regions. Therefore, the operator can visually confirm whether the welding line is included in the auxiliary scanning region using the teaching auxiliary screen.

The 3D calculation unit 54 according to Embodiment 1 deletes an overlapping region (for example, the overlapping region DB61 illustrated in FIG. 19) from at least one effective scanning region based on an operator operation. Accordingly, the offline teaching device 5 according to Embodiment 1 can delete the overlapping region from a scanning operation based on an operator operation of designating the overlapping region to be deleted by an operator.

The offline teaching device 5 according to Embodiment 1 further includes the program creation unit 55 (an example of a calculation unit) that calculates a first scan time for scanning a plurality of effective scanning regions before the deletion of the overlapping region and a second scan time for scanning the plurality of effective scanning regions after the deletion of the overlapping region. When it is determined that a time difference between the first scan time and the second scan time is less than a predetermined time, the program creation unit 55 omits highlighting of the overlapping region. Accordingly, when it is determined that a time required for a scanning operation executed by the sensor 4 is increased due to the deletion of the overlapping region and the reducible time is short, the offline teaching device 5 according to Embodiment 1 can eliminate the determination of the deletion of the overlapping region by the operator by omitting a highlighting process of the overlapping region.

When it is determined that the time difference is not less than the predetermined time, the program creation unit 55 according to Embodiment 1 highlights the overlapping region. Accordingly, when it is determined that the time required for the scanning operation executed by the sensor 4 due to the deletion of the overlapping region is equal to or longer than the predetermined time, the offline teaching device 5 according to Embodiment 1 can support the operator in determining the deletion of the overlapping region by performing the highlighting process of the overlapping region.

When it is determined that there are a first effective scanning region (for example, the effective scanning region AR51 illustrated in FIG. 17) including a first welding line (for example, the welding line WS51 illustrated in FIG. 17) and a second effective scanning region (for example, the effective scanning region AR52 illustrated in FIG. 17) including at least a part of the first welding line and a second welding line (for example, the welding line WS52 illustrated in FIG. 17), the program creation unit 55 according to Embodiment 1 deletes the first effective scanning region. Accordingly, when a welding line included in the first effective scanning region is also included in the second effective scanning region, the offline teaching device 5 according to Embodiment 1 can prevent the occurrence of unnecessary scanning operation by deleting the first effective scanning region. In addition, the offline teaching device 5 can support the creation of a scanning operation teaching program in which a scanning operation of the sensor 4 is more efficiently performed by preferentially leaving only an effective scanning region including a welding line of the longer section or more.

As described above, in Embodiment 1, the offline teaching method performed by the operator operating the input device UI3 and using the offline teaching device 5 including one or more computers communicably connected to the input device UI3 includes: inputting, to the computer, position information of a plurality of welding lines of the workpiece Wk produced by welding and the effective scanning range AR0 (an example of a scanning range) of the sensor 4 that scans an appearance shape of a weld bead formed on the workpiece Wk; inputting, to the computer, an overlapping region to be deleted on a teaching auxiliary screen in which the plurality of welding lines and an effective scanning region scanned by the sensor 4 are disposed in a virtual space and an overlapping region of each of the plurality of effective scanning regions are highlighted; and creating a teaching program for causing a robot that drives the sensor 4 to scan at least one effective scanning region indicated by a new teaching auxiliary screen in which the plurality of welding lines and at least one effective scanning region after deletion of the input overlapping region are disposed in a virtual space.

Accordingly, the offline teaching device 5 according to Embodiment 1 can support the operator in determining whether to delete an overlapping region by highlighting the overlapping region between the effective scanning regions constructed as a scanning operation on a teaching auxiliary screen that visualizes a positional relation between a welding line and an effective scanning region (a scanning region). The offline teaching device 5 deletes the overlapping region from the plurality of effective scanning regions constructed as a scanning operation based on an operator operation requesting the deletion of the overlapping region shown on the teaching auxiliary screen. Accordingly, the operator can confirm the overlapping region at a glance without confirming whether each effective scanning region overlaps by rotating a three-dimensional space (a virtual space) indicated by the teaching auxiliary screen. Since the operator can confirm a positional relation among the welding line, each effective scanning region, and the overlapping region on the teaching auxiliary screen, the operator can confirm at a glance which welding line corresponds to the overlapping region. Accordingly, the offline teaching device 5 can more effectively support the creation of a scanning operation teaching program by an operator who does not have a higher skill to create the teaching program.

As described above, the offline teaching device 5 according to Embodiment 1 includes: the input and output unit 53 (an example of an input unit) capable of acquiring an operator operation; the input and output unit 53 that acquires position information of a welding line of the workpiece Wk produced by welding and the effective scanning range AR0 (an example of a scanning range) of the sensor 4 that scans an appearance shape of a weld bead formed on the workpiece Wk; the 3D calculation unit 54 (an example of a generation unit) that generates an effective scanning region (an example of a three-dimensional region) scanned by the sensor 4 based on the acquired position information of the welding line and the effective scanning range AR0; and the program creation unit 55 (an example of a control unit) that generates and outputs a teaching auxiliary screen in which the welding line and the effective scanning region are disposed in a virtual space. The 3D calculation unit 54 moves or rotates the effective scanning region based on the operator operation. The program creation unit 55 generates and outputs a new teaching auxiliary screen in which a welding line and at least one effective scanning region including a moved or rotated effective scanning region are disposed in a virtual space, and generates and outputs a teaching program for causing the welding robot MC1 (an example of a robot) that drives the sensor 4 to scan at least one effective scanning region based on an operator operation.

Accordingly, the offline teaching device 5 according to Embodiment 1 can support the scanning operation teaching work desired by the operator by receiving an operator operation such as movement and rotation of an effective scanning region constructed as a template of a scanning operation on a teaching auxiliary screen that visualizes a positional relation between a welding line and an effective scanning region (a scanning region). Since the offline teaching device 5 can visualize a positional relation between each of the effective scanning regions moved and rotated by the operator operation and the welding line in a three-dimensional space (a virtual space), it is possible to confirm at a glance whether each of the effective scanning regions after movement and rotation includes the welding line. Accordingly, the offline teaching device 5 can more effectively support the creation of a scanning operation teaching program by an operator who does not have a higher skill to create the teaching program.

An effective scanning region (for example, the effective scanning region AR22 illustrated in FIGS. 10 to 13) according to Embodiment 1 includes each of two auxiliary scanning regions (for example, the auxiliary scanning regions AR221 and AR222 illustrated in FIGS. 10 to 13) of a sensor. Accordingly, the offline teaching device 5 according to Embodiment 1 can visualize two auxiliary scanning regions corresponding to the respective effective scanning regions. Accordingly, the operator can visually confirm whether the welding line is included in the auxiliary scanning region using the teaching auxiliary screen.

In addition, the 3D calculation unit 54 according to Embodiment 1 moves an effective scanning region (for example, each of the effective scanning regions AR75B and AR75C) selected by an operator operation based on a welding line (for example, the welding line WS741 illustrated in FIG. 25) selected by an operator operation. Accordingly, the offline teaching device 5 according to Embodiment 1 can set a reference of a movement and rotation operation of an effective scanning region on a three-dimensional space (a virtual space) as a welding line to be scanned. Accordingly, in the offline teaching device 5, since a degree of freedom of a movement and rotation operation of an effective scanning region in a three-dimensional space (a virtual space) can be limited based on a welding line, it is possible to more effectively prevent the occurrence of the deviation between a scanning direction of a scanning operation indicated by the effective scanning region after the movement and rotation and a welding direction of the welding line (for example, a direction from a start point to an end point of the welding line). Accordingly, the operator can move and rotate each effective scanning region without finely adjusting the effective scanning region in a virtual space, and can perform the scan teaching work.

In addition, the 3D calculation unit 54 according to Embodiment 1 moves an effective scanning region along an extending direction of a welding line selected by an operator operation (that is, the direction from the start point to the end point of the welding line, a direction indicated by an operation trajectory of welding corresponding to the welding line, or the like) based on an operator operation. Accordingly, the offline teaching device 5 according to Embodiment 1 can limit a moving direction of an effective scanning region based on an operator operation to a direction parallel to the welding line.

In addition, the 3D calculation unit 54 according to Embodiment 1 rotates an effective scanning region with a predetermined position (for example, the point RT73 illustrated in FIG. 24) on a welding line designated by an operator operation as a rotation center based on the operator operation. Accordingly, the offline teaching device 5 according to Embodiment 1 can limit a rotation reference point of an effective scanning region based on the operator operation to a point on a predetermined welding line designated by the operator operation. Specifically, the operator can rotate the effective scanning region in a virtual space with a predetermined position designated by the operator operation as a rotation center.

In addition, the 3D calculation unit 54 according to Embodiment 1 moves the effective scanning region in a radial direction centered on the predetermined position (for example, the point RT73 illustrated in FIG. 24) on the welding line designated by the operator operation based on the operator operation. Accordingly, the offline teaching device 5 according to Embodiment 1 can limit the movement of the effective scanning region based on the operator operation in a direction based on the predetermined position on the welding line. Specifically, the operator can cause the effective scanning region to approach a predetermined position on the designated welding line or to separate the effective scanning region from the predetermined position on the designated welding line.

The 3D calculation unit 54 according to Embodiment 1 copies the effective scanning region based on the operator operation, and moves or rotates the copied effective scanning region (for example, the effective scanning region AR73B illustrated in FIG. 24 and the effective scanning regions AR75B and AR75C illustrated in FIG. 25) based on the operator operation. Accordingly, the offline teaching device 5 according to Embodiment 1 can copy the generated effective scanning region, and move and rotate the copied effective scanning region based on a movement reference and a rotation reference of the effective scanning region in a virtual space designated by the operator operation.

As described above, in Embodiment 1, the offline teaching method performed by the operator operating the input device UI3 and using the offline teaching device 5 including one or more computers communicably connected to the input device UI3 includes: inputting, to the computer, position information of a plurality of welding lines of the workpiece Wk produced by welding and the effective scanning range AR0 (an example of a scanning range) of the sensor 4 that scans an appearance shape of a weld bead formed on the workpiece Wk; inputting, to the computer, an operation of moving and rotating any one of the effective scanning regions on a teaching auxiliary screen in which the plurality of welding lines and a plurality of effective scanning regions scanned by the sensor 4 are disposed in a virtual space; creating a teaching program for causing the welding robot MC1 (an example of a robot) that drives the sensor 4 to scan at least one effective scanning region indicated by a new teaching auxiliary screen in which the plurality of welding lines and at least one effective scanning region including the moved or rotated effective scanning region are disposed in a virtual space.

Accordingly, the offline teaching device 5 according to Embodiment 1 can support the scanning operation teaching work desired by the operator by receiving an operator operation such as movement and rotation of an effective scanning region constructed as a scanning operation on a teaching auxiliary screen that visualizes a positional relation between a welding line and an effective scanning region (a scanning region). Since the offline teaching device 5 can visualize a positional relation between each of the effective scanning regions moved and rotated by the operator operation and the welding line in a three-dimensional space (a virtual space), it is possible to confirm at a glance whether each of the effective scanning regions after movement and rotation includes the welding line. Accordingly, the offline teaching device 5 can more effectively support the creation of a scanning operation teaching program by an operator who does not have a higher skill to create the teaching program.

Although various embodiments are described above with reference to the drawings, it is needless to say that the present disclosure is not limited to such examples. It is apparent to those skilled in the art that various changes, corrections, substitutions, additions, deletions, and equivalents can be conceived within the scope of the claims, and it should be understood that such changes, corrections, substitutions, additions, deletions, and equivalents also fall within the technical scope of the present disclosure. In addition, components in the various embodiments described above may be combined freely in a range without deviating from the spirit of the disclosure.

The present application is based on Japanese Patent Application No. 2021-199683 filed on Dec. 8, 2021, the contents of which are incorporated herein by reference.

The present disclosure is useful as an offline teaching device and an offline teaching method that support creation of a scanning operation teaching program performed by an operator.

What is claimed is:

1. An offline teaching device comprising:

an input unit capable of acquiring an operator operation;

an acquisition unit configured to acquire position information of a plurality of welding lines of a workpiece produced by welding and a scanning range of a sensor that scans an appearance shape of a weld bead formed on the workpiece;

a generation unit configured to generate a plurality of three-dimensional regions to be scanned by the sensor, based on the acquired position information of the plurality of welding lines and the acquired scanning range; and a control unit configured to generate and output an auxiliary screen in which the plurality of welding lines and the plurality of three-dimensional regions are disposed in a virtual space and an overlapping region of each of the plurality of three-dimensional regions is highlighted, wherein the generation unit deletes the overlapping region based on the operator operation, and the control unit generates and outputs a new auxiliary screen in which the plurality of welding lines and at least one three-dimensional region after the overlapping region is deleted are disposed in the virtual space, and creates and outputs a teaching program for causing a robot that drives the sensor to scan the at least one three-dimensional region, based on the operator operation.

2. The offline teaching device according to claim 1, wherein the three-dimensional region includes each of two auxiliary scanning regions of the sensor.

3. The offline teaching device according to claim 1, wherein the generation unit deletes the overlapping region from at least one three-dimensional region based on the operator operation.

4. The offline teaching device according to claim 1, further comprising:

a calculation unit configured to calculate a first scan time for scanning the plurality of three-dimensional regions before the overlapping region is deleted and a second scan time for scanning the plurality of three-dimensional regions after the overlapping region is deleted, wherein the control unit omits highlighting of the overlapping region, when determining that a time difference between the first scan time and the second scan time is less than a predetermined time.

5. The offline teaching device according to claim 4, wherein the control unit highlights the overlapping region, when determining that the time difference is not less than the predetermined time.

6. The offline teaching device according to claim 1, wherein when the generation unit determines that there are a first three-dimensional region including a first welding line and a second three-dimensional region including at least a part of the first welding line and the second welding line, the generation unit deletes the first three-dimensional region.

7. An offline teaching method performed by an offline teaching device including one or more computers communicably connected to an input device capable of receiving an operator operation, the offline teaching method comprising:

acquiring position information of a plurality of welding lines of a workpiece produced by welding and a scanning range of a sensor that scans an appearance shape of a weld bead formed on the workpiece;

generating a plurality of three-dimensional regions to be scanned by the sensor, based on the acquired position information of the plurality of welding lines and the acquired scanning range;

generating and outputting an auxiliary screen in which the plurality of welding lines and the plurality of three-dimensional regions are disposed in a virtual space and an overlapping region of each of the plurality of three-dimensional regions is highlighted;

deleting the overlapping region based on the operator operation;

generating and outputting a new auxiliary screen in which the plurality of welding lines and at least one three-dimensional region after the overlapping region is deleted are disposed in the virtual space; and creating and outputting a teaching program for causing a robot that drives the sensor to scan the at least one three-dimensional region, based on the operator operation.

8. An offline teaching method performed by an operator operating an input device and using an offline teaching device including one or more computers communicably connected to the input device, the offline teaching method comprising:

inputting, to the computer, position information of a plurality of welding lines of a workpiece produced by welding and a scanning range of a sensor that scans an appearance shape of a weld bead formed on the workpiece;

inputting, to the computer, the overlapping region to be deleted on an auxiliary screen in which the plurality of welding lines and a three-dimensional region to be scanned by the sensor are disposed in a virtual space and an overlapping region of each of the plurality of three-dimensional regions is highlighted; and creating a teaching program for causing a robot that drives the sensor to scan at least one three-dimensional region after deleting the input overlapping region indicated by a new auxiliary screen in which the plurality of welding lines and the at least one three-dimensional region are disposed in the virtual space.

* * * * *